United States Patent
Rotenstreich et al.

(10) Patent No.: US 12,521,056 B2
(45) Date of Patent: Jan. 13, 2026

(54) SYSTEM, DEVICE AND METHOD FOR DETERMINING AND/OR ASSESSING BRAIN RELATED CONDITIONS BASED ON PUPIL LIGHT RESPONSE

(71) Applicant: TEL HASHOMER MEDICAL RESEARCH INFRASTRUCTURE AND SERVICES LTD., Ramat Gan (IL)

(72) Inventors: Ygal Rotenstreich, Kfar Bilu (IL); Ifat Sher, Shoham (IL)

(73) Assignee: TEL HASHOMER MEDICAL RESEARCH INFRASTRUCTURE AND SERVICES LTD., Ramat Gan (IL)

( * ) Notice: Subject to any disclaimer, the term of this patent is extended or adjusted under 35 U.S.C. 154(b) by 584 days.

(21) Appl. No.: 17/885,812

(22) Filed: Aug. 11, 2022

(65) Prior Publication Data
US 2023/0050186 A1 Feb. 16, 2023

Related U.S. Application Data

(63) Continuation-in-part of application No. PCT/IL2021/050170, filed on Feb. 11, 2021.
(Continued)

(51) Int. Cl.
*A61B 5/00* (2006.01)
*A61B 3/00* (2006.01)
*A61B 3/11* (2006.01)

(52) U.S. Cl.
CPC .......... *A61B 5/4064* (2013.01); *A61B 3/0008* (2013.01); *A61B 3/112* (2013.01); *A61B 5/7267* (2013.01)

(58) Field of Classification Search
CPC ..... A61B 5/4064; A61B 3/0008; A61B 3/112; A61B 5/7267; A61B 5/162
See application file for complete search history.

(56) References Cited

U.S. PATENT DOCUMENTS

| 6,669,651 B1 | 12/2003 | Fukushima et al. |
| 2015/0245766 A1 | 9/2015 | Rennaker et al. |

(Continued)

FOREIGN PATENT DOCUMENTS

| EP | 1127534 A2 | 8/2001 |
| WO | 2017123710 A1 | 7/2017 |
| WO | 2018203828 A1 | 11/2018 |

OTHER PUBLICATIONS

Berman, G. et al., "Decreased retinal sensitivity in depressive disorder: a controlled study", Acta Psychiatrica Scandinavica, vol. 137(3):231-240. Jan. 15, 2018. Munksgaard, Copenhagen, Denmark. doi: 10.1111/acps.12851.

(Continued)

*Primary Examiner* — Eric F Winakur
*Assistant Examiner* — Sienna C Pyle
(74) *Attorney, Agent, or Firm* — The Roy Gross Law Firm, LLC; Roy D. Gross

(57) ABSTRACT

Provided herein are systems, devices and methods for monitoring the progression of, determining and/or assessing brain related conditions in a subject based on pupil light responses (PLRs) to focal central and peripheral chromatic light stimuli, in particular, by classifying the PLR based on one or more PLR parameter values, wherein the classifying allows monitoring the progression of, determining and/or assessing the brain related condition.

27 Claims, 45 Drawing Sheets
(40 of 45 Drawing Sheet(s) Filed in Color)

Related U.S. Application Data

(60) Provisional application No. 63/232,279, filed on Aug. 12, 2021, provisional application No. 62/972,668, filed on Feb. 11, 2020.

(56) References Cited

U.S. PATENT DOCUMENTS

| | | | |
|---|---|---|---|
| 2016/0262611 | A1 | 9/2016 | Rotenstreich |
| 2017/0347878 | A1 | 12/2017 | Milea et al. |
| 2018/0249904 | A1 | 9/2018 | Rotenstreich et al. |
| 2019/0191995 | A1* | 6/2019 | Giovinazzo ............ A61B 3/113 |
| 2020/0337556 | A1* | 10/2020 | Uys ........................ A61B 3/145 |
| 2021/0393122 | A1* | 12/2021 | Milea ...................... A61B 3/04 |

OTHER PUBLICATIONS

Palanca-Castan, N. et al., "Chromatic pupillometry for the characterization of the pupillary light reflex in Octodon degus", Experimental Eye Research, Academic Press Ltd., London, vol. 190:107866., Nov. 2, 2019. doi: 10.1016/i.exer.2019.107866.
Wimo et al (2013) The worldwide economic impact of dementia, Alzheimers Dement 9:1-11.e3; http://dx.doi.org/10.1016/j.jalz.2012.11.006.
Hsu et al (2017) Primary and Secondary Prevention Trials in Alzheimer Disease: Looking Back, Moving Forward, Curr Alzheimer Res., 14(4):426-440; doi:10.2174/1567205013666160930112125.
Cummings et al (2007) Disease-modifying therapies for Alzheimer disease: challenges to early intervention, Neurology, 69:1622-1634; DOI: 10.1212/01.wnl.0000295996.54210.69.
Payami et al (1997) A prospective study of cognitive health in the elderly (Oregon Brain Aging Study): effects of family history and apolipoprotein E genotype, Am J Hum Genet, 60:948-956; PMID: 9106542.
VanDuijn et al (1991) Familial aggregation of Alxheimer's disease and related disorder: a collaborative re-analysis of case-control studies, Int J Epidemiol, 20 Suppl2:S13-20; https://doi.org/10.1093/ije/20.Supplement_2.S13.
Green et al (2002) Risk of dementia among white and African American relatives of patients with Alzheimer disease, JAMA, 287:329-336; DOI: 10.1001/jama.287.3.329.
Bendlin et al (2010) Midlife predictors of Alzheimer's disease, Maturitas, 65:131-137; doi:10.1016/j.maturitas.2009.12.014.
Scarabino et al (2016) Influence of family history of dementia in the development and progression of late-onset Alzheimer's disease, Am J Med Genet B, Neuropsychiatr Genet, 171(2):250-256; DOI 10.1002/ajmg.b.32399.
Bondareff et al (1987) Neuronal degeneration in locus ceruleus and cortical correlates of Alzheimer disease, Alzheimer Dis Assoc Disord, 1:256-262; DOI: 10.1097/00002093-198701040-00005.
Den Haan et al (2018) Amyloid-beta and phosphorylated tau in post-mortem Alzheimer's disease retinas, Acta Neuropathol Commun, 6:147; https://doi.org/10.1186/s40478-018-0650-x.
La Morgia et al (2016) Melanopsin retinal ganglion cell loss in Alzheimer disease, Ann Neurol, 79:90-109; DOI: 10.1002/ana.24548.
Scinto et al (1999) Focal pathology in the Edinger-Westphal nucleus explains pupillary hypersensitivity in Alzheimer's disease, Acta Neuropathol, 97:557-564; DOI: 10.1007/s004010051031.
Munch et al (2013) Intrinsically photosensitive retinal ganglion cells: classification, function and clinical implications, Curr Opin Neurol, 26:45-51; DOI:10.1097/WCO.0b013e32835c5e78.
Schmidt et al (2011) Melanopsin-positive intrinsically photosensitive retinal ganglion cells: from form to function, J Neurosci, 31:16094-16101; DOI:10.1523/JNEUROSCI.4132-11.2011.
Guler et al (2008) Melanopsin cells are the principal conduits for rod-cone input to non-image-forming vision, Nature, 452:102-105; doi:10.1038/nature06829.
Chougule et al (2019) Light-Inducted Pupillary Responses in Alzheimer's Disease, Front Neurol, 10:360; doi:10.3389/fneur.2019.00360.
Prettyman et al (1997) Altered pupillary size and darkness and light reflexes in Alzheimer's disease, J Neurol Neurosurg Psychiatry, 62:665-668; DOI: 10.1136/jnnp.62.6.665 Free PMC article.
Frost et al (2013) Pupil Response Biomarkers for Early Detection and Monitoring of Alzheimers Disease, Current Alzheimer Research, 10:931-939; DOI: 10.2174/15672050113106660163.
Ferrario et al (1998) Is videopupillography useful in the diagnosis of Alzheimer's disease?, Neurology, 50:642-644; DOI: 10.1212/wnl.50.3.642.
Bittner et al (2014) Repetitive pupil light reflex: potential marker in Alzheimer's disease?, J Alzheimers Dis, 12:1469-1477; DOI: 10.3233/JAD-140969.
Granholm et al (2003) Tropicamide effects on pupil size and pupillary light reflexes in Alzheimer's and Parkinson's disease, Int J Psychophysiol, 47:95-115; DOI: 10.1016/s0167-8760(02)00122-8.
Fotiou et al (2007) Pupil reaction to light in Alzheimer's disease: evaluation of pupil size changes and mobility, Aging Clin Exp Res, 19: 364-371; DOI: 10.1007/BF03324716.
Fotiou et al (2009) Cholinergic deficiency in Alzheimer's and Parkinson's disease: evaluation with pupillometry, Int J Psychophysiol, 73: 143-149; doi:10.1016/j.ijpsycho.2009.01.011.
The Europe PMC Consorium (2014) Europe Pmc: A full text literature database for the life sciences and platform for innovation, Nucleic Acids Research, vol. 43 Database Issue, D1042-D1048; doi: 10.1093/nar/gku1061.
Frost et al (2013) Pupil response biomarkers distinguish amyloid precursor protein mutation carriers from non-carriers, Curr Alzheimer Res 10:790-796; doi: 10.2174/15672050113109990154.
Frost et al (2017) Evaluation of cholinergic deficiency in preclinical alzheimer's disease using pupillometry, J Ophthalmol, 7935406; https://doi.org/10.1155/2017/7935406.
Fotiou et al (2015) Evaluation of the cholinergic hypothesis in Alzheimer's disease with neuropsychological methods, Aging Clin Ex Res, 27:727-733; doi: 10.1007/s40520-015-0321-8.
Van Stavern et al (2019) Pupillary light reaction in preclinical Alzheimer's disease subjects compared with normal ageing controls, Br J Ophthalmol, 103:971-975; doi:10.1136/bjophthalmol-2018-312425.
Kardon et al (2009) Chromatic pupil responses: preferential activation of the melanopsin-mediated versus outer photoreceptor-mediated pupil light reflex, Ophthalmology, 116:1564-1573; doi:10.1016/j.ophtha.2009.02.007.
Park et al (2011) Toward a clinical protocol for assessing rod, cone, and melanopsin contributions to the human pupil response, Visual Neurophysiology, 52:6624-6635; DOI:10.1167/iovs.11-7586.
Gooley et al (2012) Melanopsin and rod-cone photoreceptors play different roles in mediating pupillary light responses during exposure to continuous light in humans, J Neurosci, 32:14242-14253; DOI:10.1523/JNEUROSCI.1321-12.2012.
Rukmini et al (2019) Chromatic pupillometry methods for assessing photoreceptor health in retinal and optic nerve diseases, Front Neurol, 10:76; doi: 10.3389/fneur.2019.00076.
Romagnoli et al (2020) Chromatic pupillometry findings in alzheimer's disease, Front Neurosci, 14:780; doi:10.3389/fnins.2020.00780.
Kawasaki et al (2020) Early-Stage Alzheimer's Disease Does Not Alter Pupil Responses to Colored Light Stimuli, J Alzheimers Dis, 75:1273-1282; DOI 10.3233/JAD-200120.
Oh et al (2019) Pupillometry evaluation of melanopsin retinal ganglion cell function and sleep-awake activity in pre-symptomatic Alzheimer's disease, PLoS One, 14:e0226197; https://doi.org/10.1371/journal.pone.0226197.
Chibel et al (2016) Chromatic Multifocal Pupillometry for Objective Perimetry and Diagnosis of Patients with Retinitis Pigmentosa, Ophthalmology, 123:1898-1911; http://dx.doi.org/10.1016/j.ophtha.2016.05.038.
Ben Ner et al (2019) Chromatic pupilloperimetry for objective diagnosis of Best vitelliform macular dystrophy, Clin Ophthalmol, 13:465-475; DOI: 10.2147/OPTH.S191486.
Sher et al (2020) Chromatic pupillometry measures correlate with visual acuity and visual field defects in retinitis pigmentosa patients, Trans Vis Sci Tech, 9:10; https://doi.org/10.1167/tvst.9.8.10.

(56) References Cited

OTHER PUBLICATIONS

Yahia et al (2018) Effect of Stimulus Intensity and Visual Field Location on Rod- and-Cone-Mediated Pupil Response to Focal Light Stimuli, Invest Ophthalmol Vis Sci, 59:6027-6035; https://doi.org/10.1167/iovs.18-23767.
Skaat et al (2013) Pupillometer-based objective chromatic perimetry in normal eyes and patients with retinal photoreceptor dystrophies, Invest Ophthalmol Vis Sci, 54: 2761-2770; DOI:10.1167/iovs.12-11127.
Freund et al (1997) A Decision-Theoretic Generalization of On-Line Learning and an Application to Boosting, Journal of Comuter and System Sciences, 55:119-139; https://doi.org/10.1006/jcss.1997.1504.
Kalton, G (1986) The treatment of missing survey data, Surv Methodol; available online at: https://www150.statcan.gc.ca/n1/en/pub/12-001-x/1986001/article/14404-eng.pdf?st=n_FL89o.
Kalton et al (1982) Imputing for missing survey responses, Proceedings of the section on survey research, pp. 22-31; available online at: https://www.istat.it/en/files/2014/05/1982-004-ASA.pdf.
Diciccio et al (1996) Bootstrap confidence intervals, Statistical Science vol. 11, No. 3 pp. 189-228; http://www.jstor.org/stable/2246110.
Ferreira-Vieira et al (2016) Alzheimer's disease: Targeting the Cholinergic System, Curr Neuropharmacol, 14:101-115; doi: 10.2174/1570159X13666150716165726.
Scinto et al (2001) Selective cell loss in Edinger-Westphal in asymtomatic elders and Alzheimer's patients, Neurobiol Aging, 22:729-736; DOI: 10.1016/s0197-4580(01)00235-4.
McAnany et al (2021) Rod pathway and cone pathway retinal dysfunction in the 5xFAD mouse model of Alzheimer's disease, Sci Rep, 11:4824; https://doi.org/10.1038/s41598-021-84318-2.
Do et al (2019) Elovanoids counteract oligomeric β-amyloid-induced gene expression and protect photoreceptors, Proc Natl Acad Sci USA, 116:24317-24325; www.pnas.org/cgi/doi/10.1073/pnas.1912959116.
Fan et al (2009) Weak gender effects on transient pupillary light reflex, Auton Neurosci, 147:9-13; doi:10.1016/j.autneu.2008.12.010.
Hattar et al (2002) Melanopsin-containing retinal ganglion cells: architecture, projectins, and instrinsic photosensitivity, Science, 295(5557):1065-1070; doi:10.1126/science.1069609.
Lucas et al (2003) Diminished pupillary light reflex at high irradiances in melanopsin-knockout mice, Sciences, 299 (5604):245-247; DOI: 10.1126/science.1077293.
McDougal, DH (2008) The role of melanopsin containing retinal ganglion cells in the pupillary responses of human and non-human primates, The University of Alabama at Birmingham.
Dacey et al (2005) Melanopsin-expressing ganglion cells in primate retina signal colour and irradiance and project to the LGN, Nature, 433(7027):749-754; https://doi.org/10.1038/nature03387.
Remington, LA (1998) Clinical anatomy of the visual system, Newton, MA: Butterworth-Heinemann.
Belliveau et al (2020) Pupillary Light Reflex, in StatPearls, Treasure Island (FL): StatPearls Publishing.
Thompson et al (1991) Asymmetry of pupillomotor input, Eye 5 (Pt 1):36-39; https://doi.org/10.1038/eye.1991.7.
Wilhelm et at (2002) Pupil response components: studies in patients with Parinaud's syndrome, Brain, vol. 125, Issue 10, Oct. 2002, pp. 2296-2307, https://doi.org/10.1093/brain/awf232.
Skorkovska et al (2009) How sensitive is pupil campimetry in hemifield loss? Graefes Arch. Clin. Exp. Ophthalmol., 247(7):947-953; DOI 10.1007/s00417-009-1040-7.
Kawasaki et al (2010) Pupillographic investigation of the reletive afferent pupillary defect associated with a midbrain lesion, Ophthalmology, 117(1):175-179; doi:10.1016/j.ophtha.2009.06.053.
Chen et al (2011) Pupillary reactivity as an early indicator of increased intracranial pressure: The introduction of the Neurological Pupil index, Surg Neurol Int, 2:82; DOI: 10.4103/2152-7806.82248.
Kim et al (2018) Implication of neurological pupil index for monitoring of brain edema, Acute Crit. Care, 33(1):57-60; https://doi.org/10.4266/acc.2017.00213.
Park et al (2016) The pupillary light reflex in idiopathic intracranial hypertension, Invest. Ophthalmol. Vis. Sci., 57(1):23-29; DOI:10.1167/iovs.15-18181.
Papangelou et al (2018) Automated pupillometry and detection of clinical transtentorial brain herniation: A case series, Mil. Med., 183(1-2):e113-e121; DOI:10.1093/milmed/usx018.
Chen et al (2014) Infrared pupillometry, the Neurological Pupil index and unilateral pupillary dilation after traumatic brain injury: implications for treatment paradigms, Springerplus, 3:548; http://www.springerplus.com/content/3/1/548.
Master et al (2020) Utility of Pupillary Light Reflex Metrics as a Physiologic Biomarker for Adolescent Sport-Related Concussion, JAMA Ophthalmol. [published online ahead of print: Sep. 24, 2020] doi:10.1001/iamaophthalmol.2020.3466.
Paulus et al (2013) Pupillary reflex measurement predict insufficient analgesia before endotracheal sunctioning in critically ill patients, Crit. Care, 17(4):R161; http://ccforum.com/content/17/4/R161.
Aissou et al (2012)Objective assessment of the immediate postoperative analgesia using pupillary reflex measurement: a prospective and observational study, Anesthesiology, 116(5):1006-1012; DOI: 10.1097/ALN.0b013e318251d1fb.
Park et al (2015) Effect of stimulus size and luminance on the rod-, cone-, and melanopsin-mediated pupillary light reflex, J. Vis. 15(3). Doi:10.1167/15.3.13.
Sharpe, JA (1985) Visual dysfunction with basal skull tumours, Can J Neurol Sci, 12(4):332-335; DOI: 10.1017/s0317167100035472.
Repka et al (1989) Visual outcome after surgical removal of craniopharyngiomas, Ophthalmology, 96(2):195-199; doi: 10.1016/s0161-6420(89)32914-9.
Lustig et al (2022) Machine learning for comprehensive prediction of high risk for Alzheimer's diseased based on chromatic pupilloperimetry, Scientific Reports, 12; https://doi.org/10.1038/s41598-022-13999-0.
PCT International Search Report for International Application No. PCT/IL2021/050170, mailed Apr. 26, 2021, 3pp.
PCT Written Opinion for International Application No. PCT/IL2021/050170, mailed Apr. 26, 2021, 8pp.

\* cited by examiner

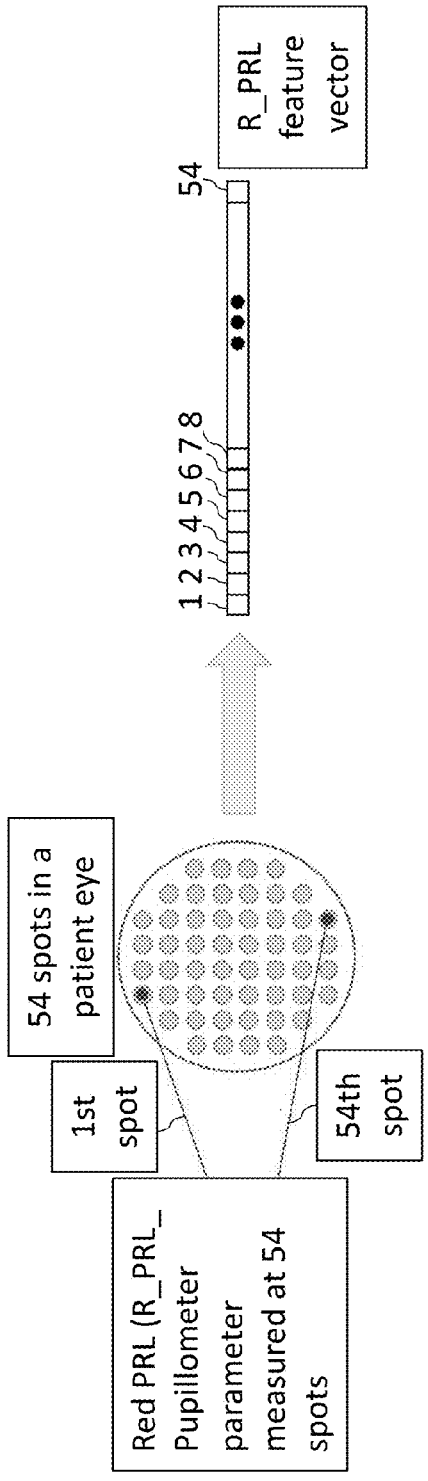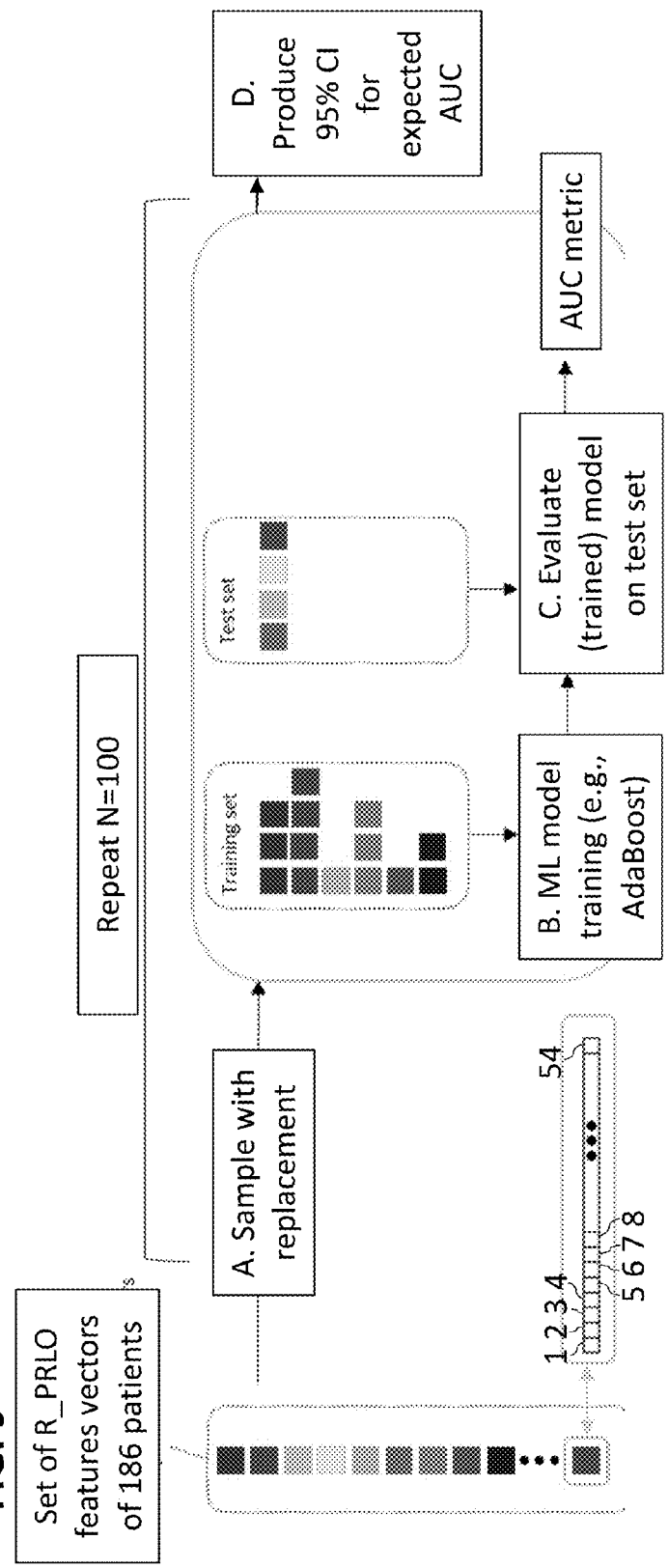
FIG. 8
FIG. 9

Left eye          Right eye

| Left eye | | Controls | Patients | p- value |
|---|---|---|---|---|
| Number of subjects | | 28 | 16 | |
| Central retina | Point 33 | 15.9± 6.92 | 10.86± 4.94 | .034 |
| | Point 43 | 12.95± 5.49 | 9.04± 4.21 | .031 |
| | Point 44 | 13.01± 6.00 | 6.59± 3.93 | .000 |
| Peripheral retina | Point 12 | 9.80± 6.13 | 5.79± 4.46 | .027 |
| | Point 60 | 9.10± 5.09 | 5.07± 3.21 | .007 |
| | Point 65 | 7.33± 4.95 | 4.96± 4.97 *N=15 | .020 |

|  | Mean ± SD | | |
|---|---|---|---|
|  | Control (n=23) | ON (n=8) | p |
| Periphery | 0.69±0.09 | 0.833±0.02 | 0.00015 |
| Center | 0.6±0.07 | 0.8±0.1 | 0.05 |

ROC AUC=91.3%, p=0.001

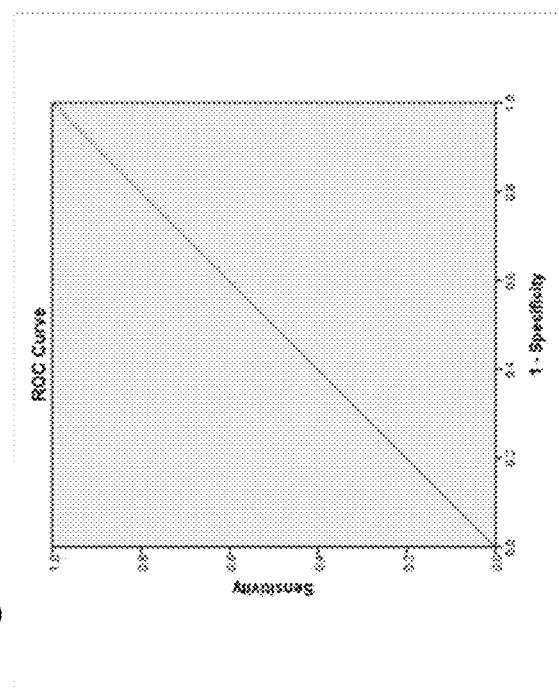
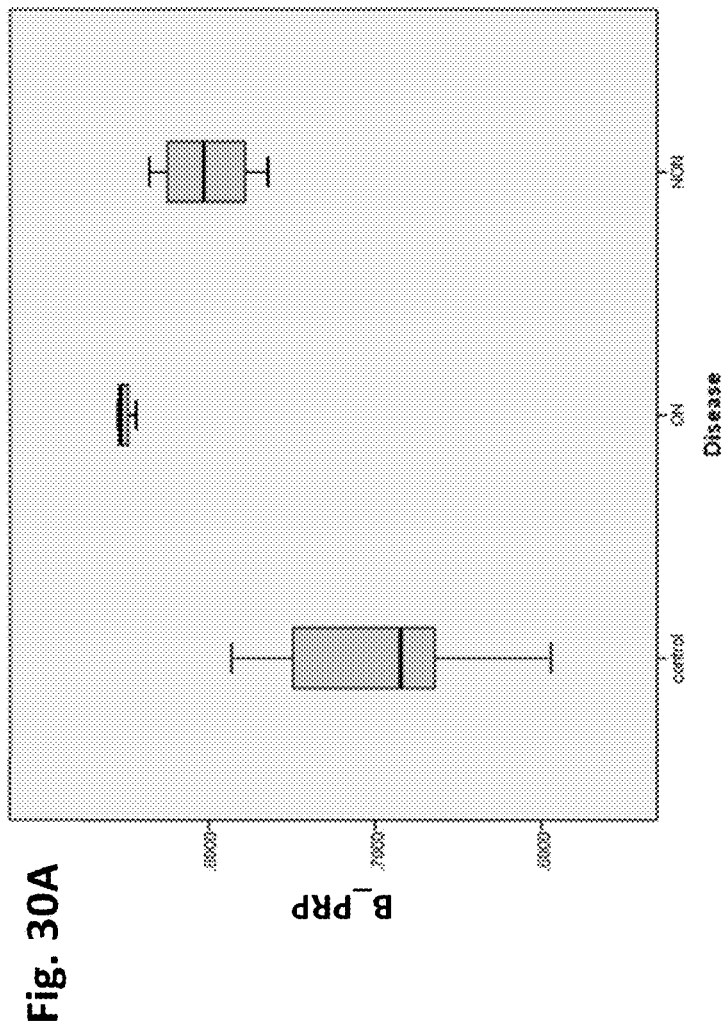
Fig. 30A
Fig. 30B

1-Specificity

SYSTEM, DEVICE AND METHOD FOR DETERMINING AND/OR ASSESSING BRAIN RELATED CONDITIONS BASED ON PUPIL LIGHT RESPONSE

CROSS REFERENCE TO RELATED APPLICATIONS

This application is a Continuation in part of PCT Patent Application No. PCT/IL2021/050170, having International filing date of Feb. 11, 2021, which claims the benefit of priority of U.S. Provisional Patent Application No. 62/972,668, filed Feb. 11, 2020. This application also claims the benefit of priority of U.S. Provisional Patent Application No. 63/232,279, filed Aug. 12, 2021, the contents of which are all incorporated herein by reference in their entirety.

FIELD OF INVENTION

Provided herein are systems, devices and methods for monitoring the progression of, determining and/or assessing brain related conditions in a subject based on pupil light responses (PLRs) to chromatic light stimuli.

BACKGROUND

The Pupil Light Reflex (PLR) controls the amount of light that enters the eye by pupil constriction and dilation in response to light. The pupil light reflex, which constricts the iris in response to light, reflects the function of the retina and the retinal ganglion cells (RGCs). The afferent arm of the PLR is mediated by intrinsically photosensitive retinal ganglion cells (ipRGCs) that account for about 1% of the total RGCs. The ipRGCs regulate pupil size through the integration of extrinsic signals from rods and cones and intrinsic signals from melanopsin phototransduction. The axons of ipRGC reach the Pretectal nucleus where they synapse with Pretectal neurons that project to the Edinger-Westphal nucleus. From there, the pre-ganglionic parasympathetic fibers travel with the oculomotor, and synapse at the ciliary ganglion cells. The post-ganglionic parasympathetic neurons innervate the iris sphincter muscle, release acetylcholine at the neuromuscular junction, leading to pupil constriction. The re-dilation of the pupil is mediated by the suppression of the parasympathetic innervation of the pupil sphincter and contraction of the iris dilator muscle. The retina is an extension of the brain, as the axons of RGCs that form the optic nerve, synapse directly with neurons at several brain regions. Unlike the brain, due to the transparency of the eye, the retina is easily accessible for direct and noninvasive imaging with high resolution and sensitivity. Retinal measurements are commonly used in clinical practice for assessment of degenerative and vascular changes in several clinical settings, such as diabetes, hypertension and neurological diseases.

Chromatic pupilloperimeter, utilizing a chromatic multifocal pupillometer can be used to assess the PLR for various irradiation stimuli presented at various location of the visual field (VF). Such methods can used in the diagnosis of various ocular diseases, such as, for example, retinitis pigmentosa (RP). For example, International Application Publication No. WO 2017/123710 is directed to System and method for performing objective perimetry and diagnosis of patients with retinitis pigmentosa and other ocular diseases.

Currently, there are no objective and reliable tests for continuous sensitive assessment of brain function in neurological conditions, nor are such tests available to early detect various types of brain related conditions. In some cases, PLR is used as a prognostic indicator in neurocritical care units, general intensive care units and coma patients to try and at least partially detect neurological impairment. However, such manual pupillary examination is challenged by uncontrolled background light, over simplified light responses recording (i.e., only very few parameters are detected), inter-observer discrepancies, use of white light stimulus only, lack of control of light source intensity or size, and moreover, a relative pupil defect is not applicable when both eyes pupil responses are affected.

Thus, there is a need in the art for methods, devices and systems which are non-invasive, cost effective, safe, reliable, accurate and objective and which can be continuously performed in real time to allow early detection and/or assessment of the progression of various brain related conditions.

SUMMARY

According to some embodiments, provided herein are methods, devices and systems that allow early detection and/or assessing the progression of various brain related conditions, based on various analyses of pupil light reflex (PLR). In some embodiments, the systems, devices and methods utilize highly sensitive measurement of the PLR using chromatic pupilloperimetry, at various conditions (for example, utilizing various wavelengths (such as, red and blue light), various intensities (for example, dim light and bright light), various irradiating locations in the field of view (for example, central and/or peripheral), and the like), and processing obtained or selected PLR measurements (utilizing, for example, various PLR parameters, values of the parameters and/or features derived therefrom), to allow determining a brain related condition and/or the progression thereof in the subject. In some embodiments, processing the selected PLR measurement utilize various machine learning algorithms and artificial intelligence (AI) tools, for determining the possibility of the subject having a brain related condition and/or to assess the state or progression of the brain related condition. Thus, according to some embodiments, the systems, devices and methods allow a non-invasive, reliable and sensitive early detection (diagnosis) of chronic or acute brain related (neurological) condition(s) as well as continues objective monitoring of brain function in such subjects.

According to some embodiments, the systems, devices and methods disclosed herein are advantageous as they allow non-invasive, objective means for detection and assessment of the progression of various brain related conditions, while being accurate, reliable, precise, reproducible, cost effective and capable of being performed continuously and in real time. The disclosed systems, device and methods can thus advantageously operate without subjective input, allow early detection or diagnosis of neuro-pathologies, provide high diagnostic accuracy (for example, over about 95%), allows detection of acute brain related conditions (neuro-conditions), can allow precise and accurate monitoring or assessment of progression (or recovery) of the brain related condition, does not relay on binocular differences and are readily accessible for constant monitoring.

According to some embodiments, the disclosed systems, device and methods are further advantageous as they can provide stimulation at various lights (such as red and blue), various intensities (such as, dim blue and bright blue), various focal regions/points of the visual field, to thereby obtain PLR related measurements by stimulating various types of photoreceptor cells, for example, by targeting red or blue visual pathways (including, for example, cones (stimulated by red light, for example, at a wave length of about 624 nm), rods (stimulated by dim blue light, for example, at a wave length of about 485 nm) and/or melanopsin (also referred to as iPRGC, stimulated by bright blue light, for example, at a wave length of about 485 nm).

In further embodiments, the systems, devices and methods disclosed herein are advantageous, as they can be used to accurately and objectively identify and/or assess a wide range of brain related conditions, including acute or choric conditions, such as, but not limited to: accurate diagnostic for brain tumors and related elevation in intra cranial pressure (ICP), sensitive detection of neurologic deterioration, elevated ICP under various conditions, brain swelling, herniation, stroke, cerebral ischemia, acute and chronic brain injury (such as TBI), neurodegenerative conditions (such as, Alzheimer's disease (AD), Parkinson's disease (PD), Multiple sclerosis (MS), cognitive deterioration (for example, in fragile-X carriers), and the like, or combinations thereof. According to some embodiments, the systems, devices and methods are further advantageous, as they allow the adjustment of the analysis to various general parameters, such as, for example, patient specific parameters (for example, age, gender, medications, medical history, and the like) to thereby increase their accuracy. According to some embodiments, changes in the PLR identified and manipulated by the systems, devices and methods, can provide important indication for acute neurologic deterioration in various conditions, such as, for example, elevated intracranial pressure (ICP), brain swelling, herniation, cerebral ischemia, and the like.

According to some embodiments, by utilizing the systems, devices and methods provided herein to accurately and objectively determine a brain related condition and/or assess or monitor the progression or state thereof, a suitable treatment may be provided to the subject, thereby improving the subject outcome. For example, the early detection of brain related conditions, and accurate continuous monitoring of subjects with neurological conditions such as, for example, AD, PD, MS, TBI, brain tumors, ICP, stroke, PTC, and the like, are of highest importance to increase the chances of favorable outcome of the subject, by early as possible interventions (such as medications or other types of suitable treatments). According to some exemplary embodiments, early diagnosis and accurate continuous monitoring of patients with acute neurological conditions, such as stroke, is critical in increasing the chances of favorable outcome by early intervention.

According to some embodiments, the systems, devices and methods can further be used to identify, predict, assess or monitor response to various treatments. In some embodiments, monitoring disease progression, and assessing treatment response is essential for selecting the best treatment for each patient as well as for developing or identifying additional treatments.

According to some embodiments, there are thus provided herein systems, devices and methods that allow an objective and reliable test for continuous sensitive assessment of brain function in various neurological related conditions. In some embodiments, a reliable early diagnosis and accurate continuous monitoring of patients with acute neurological conditions and triage is provided.

According to some embodiments, there is provided a non-invasive method for monitoring the progression of, determining and/or assessing a brain related condition of a subject, based on pupil light response (PLR) to chromatic light stimuli, the method includes:

determining a baseline pupil size of an eye of the subject;
applying blue and/or red light stimuli to one or more regions of visual field of the eye, the light stimuli configured to induce a response in the pupil;
obtaining a value for one or more parameters related to induced changes in the pupil size in response to the light stimuli;
normalizing, based on the baseline pupil size, the value of the one or more parameter; and
classifying the PLR based on the one or more parameter values, wherein said classifying allows monitoring the progression of, determining, and/or assessing the brain related condition.

According to some embodiments, the brain related condition may be selected from: brain tumor, optic neuritis, neurodegenerative conditions, traumatic brain injury, stroke, intracranial lesions, intracranial pressure and pseudotumor cerebri.

According to some embodiments, the neurodegenerative conditions may be selected from: Alzheimer's disease (AD), Multiple Sclerosis (MS), Parkinson disease (PD), and fragile-X related cognitive decline.

According to some embodiments, the one or more parameters may be selected from: Percent of Pupil Contraction (PPC), Pupil Response Latency (PRL), Maximal Contraction Velocity (MCV), Latency of MCV (LMCV), Percentage of Pupil Relaxation (PPR), Maximal Relaxation Velocity (MRV), Latency of MRV (LMRV), Maximal Contraction Acceleration (MCA), Latency of MCA (LMCA), Maximal Relaxation Acceleration (MRA), Latency of MRA (LMRA), Maximal Relaxation Deceleration (MRD), Latency of Maximal Relaxation Deceleration (LMRD), Area of Curve (AC), Latency of Maximal Pupil Contraction (LMP), Maximal Contraction Deceleration (MCD), Latency of MCD (LMCD), Max Pupil Size (Max_PS), Min Pupil Size (Min_PS), and any combination thereof. Each possibility is a separate embodiment.

According to some embodiments, the method may further include applying a curve fitting to data associated with pupil size in response to light stimulation.

According to some embodiments, the classification may include applying at least one algorithm to one or more selected parameter values and obtaining a brain related condition.

According to some embodiments, the classification may include applying one or more selected parameter values to one or more machine learning algorithms, wherein the selected parameter is associated with a selected brain related condition.

According to some embodiments, the light stimuli may include between 1 and 228 individual light stimuli, each may be applied to a different location of the visual field.

According to some embodiments, the light stimuli may be in wavelengths ranging from about 410 nm to about 520 nm and/or about 550 nm to about 700 nm.

According to some embodiments, wherein the light stimuli may include a high intensity and/or a low intensity light.

According to some embodiments, the light stimuli may be presented for a period of time of between about 0.1 to about 10 seconds.

According to some embodiments, the regions of the visual field may include a central visual field ranging between about 0-10 degrees.

According to some embodiments, the regions of the visual field may include a peripheral visual field greater than about 10 degrees.

According to some embodiments, the method may further include providing an initial pre-determined light stimuli at an initial illumination, duration and visual field locations, configured to determine a possibility of the subject having a brain related condition, and wherein applying blue and/or red light stimuli to one or more regions of visual field of the eye is based, at least in part, on the determined possibility in the initial illumination.

According to some embodiments, applying blue and/or red light stimuli to one or more regions of visual field of the eye may include selecting a subset of light stimuli based on a location of the light stimuli in relation to the visual field.

According to some embodiments, applying blue and/or red light stimuli to one or more regions of visual field of the eye may include one or more of: selecting the wavelength of each individual light of the light stimuli, selecting the intensity of each individual light of the light stimuli, selecting the ratio of blue to red light stimuli, selecting the duration of illumination of each individual light of the light stimuli, or any combinations thereof.

According to some embodiments, applying blue and/or red light stimuli to one or more regions of visual field of the eye may include applying blue and/or red light stimuli in at least two intervals.

According to some embodiments, the at least two intervals may be about 2 to about 120 second apart.

According to some embodiments, each interval may include a different subset of light stimuli, different wavelengths of light stimuli, and/or different intensities of light stimuli.

According to some embodiments, the baseline pupil size may be determined for each individual stimulation.

According to some embodiments, the method may further include positioning a subject eye at an ocular fixture such that a non-tested eye of the subject is occluded.

According to some embodiments, the method may include determining AD or risk for developing Alzheimer's disease, and the calculated value may be determined based at least on: the MCV parameter in the central region of the visual field in response to a high intensity blue light stimuli, the PRL parameter in response to low intensity blue light in the periphery, the PRL parameter in response to blue light, the PRL parameter in response to red light, the LMCA parameter in response to blue light, the LMCA parameter is response to red light, the LMCD parameter in response to blue light, the LMCD parameter in response to red light, the LMP parameter in response to blue light, the LMP parameter in response to red light, the MCV parameter in response to blue light, or any combination thereof.

According to some embodiments, the condition may be Parkinson's disease (PD), and the calculated value may be determined based at least on one of: the PPR parameter in the central region of the visual field in response to a high intensity blue light stimuli, the PPC parameter in the central region of the visual field in response to a low intensity blue light stimuli, the MCA parameter in the central region of the visual field in response to a low intensity blue light stimuli, the PPC parameter in the peripheral region of the visual field in response to a low intensity blue light stimuli, the MCA parameter in the peripheral region of the visual field in response to a low intensity blue light stimuli, and the PPC parameter in the central region of the visual field in response to a red light stimuli.

According to some embodiments, the condition may be a brain tumor, and the calculated value may be determined based at least on one of: the PPR parameter in the peripheral region of the visual field in response to a high intensity blue light stimuli and the PPC parameter in the peripheral region of the visual field in response to a low intensity blue light stimuli.

According to some embodiments, the condition may be a fragile-X carrier, and the calculated value may be determined based at least on one of: the PPR parameter in the peripheral region of the visual field in response to a high intensity blue light stimuli, the LMCA parameter in the peripheral region of the visual field in response to a low intensity blue light stimuli, and the LMCA parameter in the central region of the visual field in response to red light stimuli.

According to some embodiments, the condition may be Multiple Sclerosis (MS), and the calculated value may be determined based at least on one of: the PPC parameter in the peripheral region of the visual field in response to red light stimuli, the PPC parameter in the peripheral region of the visual field in response to low intensity blue light stimuli, the MRV parameter in the peripheral region of the visual field in response to red light stimuli, the MRV parameter in the peripheral region of the visual field in response to low intensity blue light stimuli, and the MCV parameter in the peripheral region and/or the central region of the visual field in response to red and/or blue light stimuli and PPR at central and/or peripheral locations in response to strong and long duration blue light.

According to some embodiments, the condition may be optic neuritis, and the calculated value may be determined based at least on one of: the PPC parameter in the peripheral region and/or the central region of the visual field in response to red and/or bright blue light stimuli and the PPR parameter in the peripheral region of the visual field in response to blue light stimuli and/or the calculated value is the number of test targets with aberrant PPC in response to blue and red light.

According to some embodiments, the condition may be intracranial lesion, and the calculated value may be determined based on at least one of: a PLR parameter in the peripheral region and/or the central region of the visual field in response to high intensity blue light stimuli, the PPC parameter in the nasal region of the visual field in response to low intensity blue light, the PPR parameter in the nasal region of the visual field in response to low intensity blue light.

According to some embodiments, the condition may be pseudotumor cerebri, and the calculated value may be determined based at least on one of: the PPC parameter in the peripheral region and/or the central region of the visual field in response to red and/or blue light stimuli, and the MRV parameter in the peripheral region and/or the central region of the visual field in response to red and/or blue light stimuli.

According to some embodiments, the condition may be stroke, and the calculated value may be determined based on at least one of: the PPR parameter in the peripheral region and/or the central region of the visual field in response to high intensity blue light stimuli, the PPC parameter in the peripheral region of the visual field in response to low intensity blue light stimuli, and the MRV parameter in the peripheral region of the visual field in response to low intensity blue light stimuli.

According to some embodiments, the method may further include controlling the emission wavelength, intensity, and duration of individual light stimuli or subsets of the light stimuli.

According to some embodiments, the method, when obtaining the values for more than one parameter, the steps of determining a baseline pupil size, applying blue and/or red light stimuli and obtaining a value, are repeated for obtaining the value for each parameter.

According to some embodiments, the method may further include imputing (applying) one or more selected values of at least one of the one or more parameters to a machine learning algorithm(s) configured to classify the subject as having a brain related condition or not having a brain related condition.

According to some embodiments, the method may further include classifying, using the machine learning algorithm, the brain related condition into types and/or levels of severity and/or progression of the condition based, at least in part, on selected values of at least one of the parameters.

According to some embodiments, there is provided a pupillometer device for monitoring the progression of, determining and/or assessing a brain related condition of a subject, based on pupil light response to chromatic light stimuli, the pupilometer device includes:
  a plurality of chromatic beam emitters configured to generate red and/or blue light stimuli at predetermined locations of the visual field;
  at least one camera configured to detect pupil response; and
  a control unit in communication with the plurality of chromatic beam emitters and the at least one camera, wherein the control unit configured to:
    determine a baseline pupil size of an eye of the subject;
    obtain a value for one or more parameters related to induced changes in the pupil size in response to the light stimuli;
    normalize, based on the baseline pupil size, the value of the one or more parameters; and
    classify the PLR based on the one or more parameter values, wherein said classifying results in monitoring the progression of, determining and/or assessing the brain related condition.

According to some embodiments, the control unit may be in communication with a server or memory module comprising instructions for monitoring the progression of, identifying and/or assessing a brain related condition.

According to some embodiments, the control unit may be configured to classify, based on a machine learning algorithm, one or more selected values of at least one of the one or more parameters as being associated with a brain related condition and/or a progression of a brain related condition.

According to some embodiments, there is provided a system for monitoring the progression of, determining and/or assessing a brain related condition of a subject, based on pupil light response to chromatic light stimuli, the system includes:
  at least one hardware processor; and
  a non-transitory computer-readable storage medium having stored thereon program code, the program code executable by the at least one hardware processor to:
    receive data associated with red and/or blue light stimuli generated at predetermined locations of the visual field of the subject;
    receive data associated with the pupil size of the subject;
    determine a value of one or more parameters related to induced changes in the pupil size in response to the light stimuli;
    normalize, based on the baseline pupil size, a value of the one or more parameters; and
    input (apply) one or more of selected values of at least one of the one or more parameters to an algorithm configured to classify the subject as having a brain related condition or not having a brain related condition based, at least in part, on at least one value of one or more parameters.

According to some embodiments, the algorithm is a machine learning algorithm configured to classify the brain related condition into types and/or levels of severity and/or progression of the condition based, at least in part, on the value of the one or more parameters.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

BRIEF DESCRIPTION OF THE FIGURES

The patent or application file contains at least one drawing executed in color. Copies of this patent or patent application publication with color drawing(s) will be provided by the Office upon request and payment of the necessary fee.

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In block diagrams and flowcharts, optional elements/components and optional stages may be included within dashed boxes.

Figure 1A:
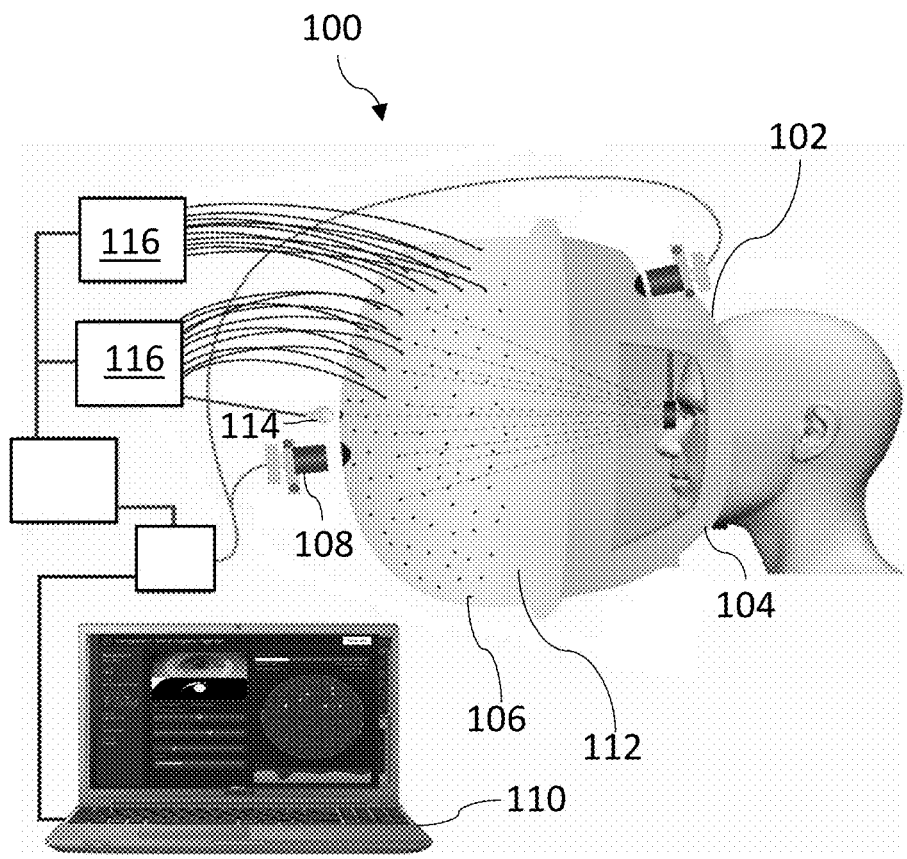
Figure 1B:
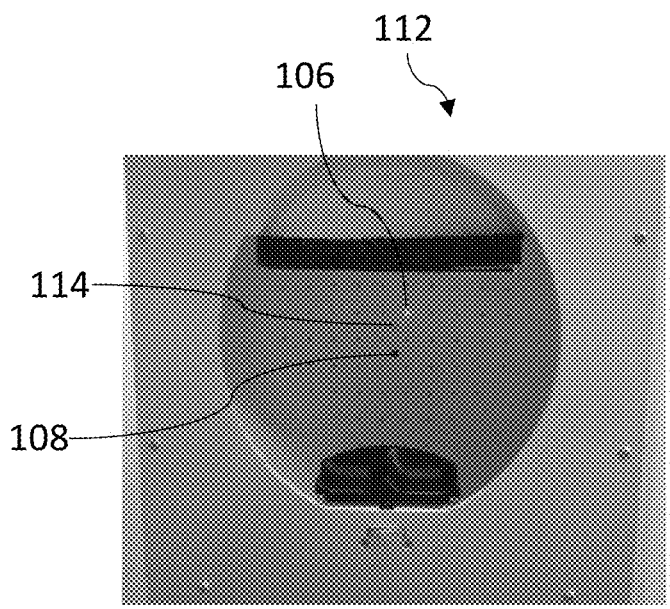
Figure 1C:
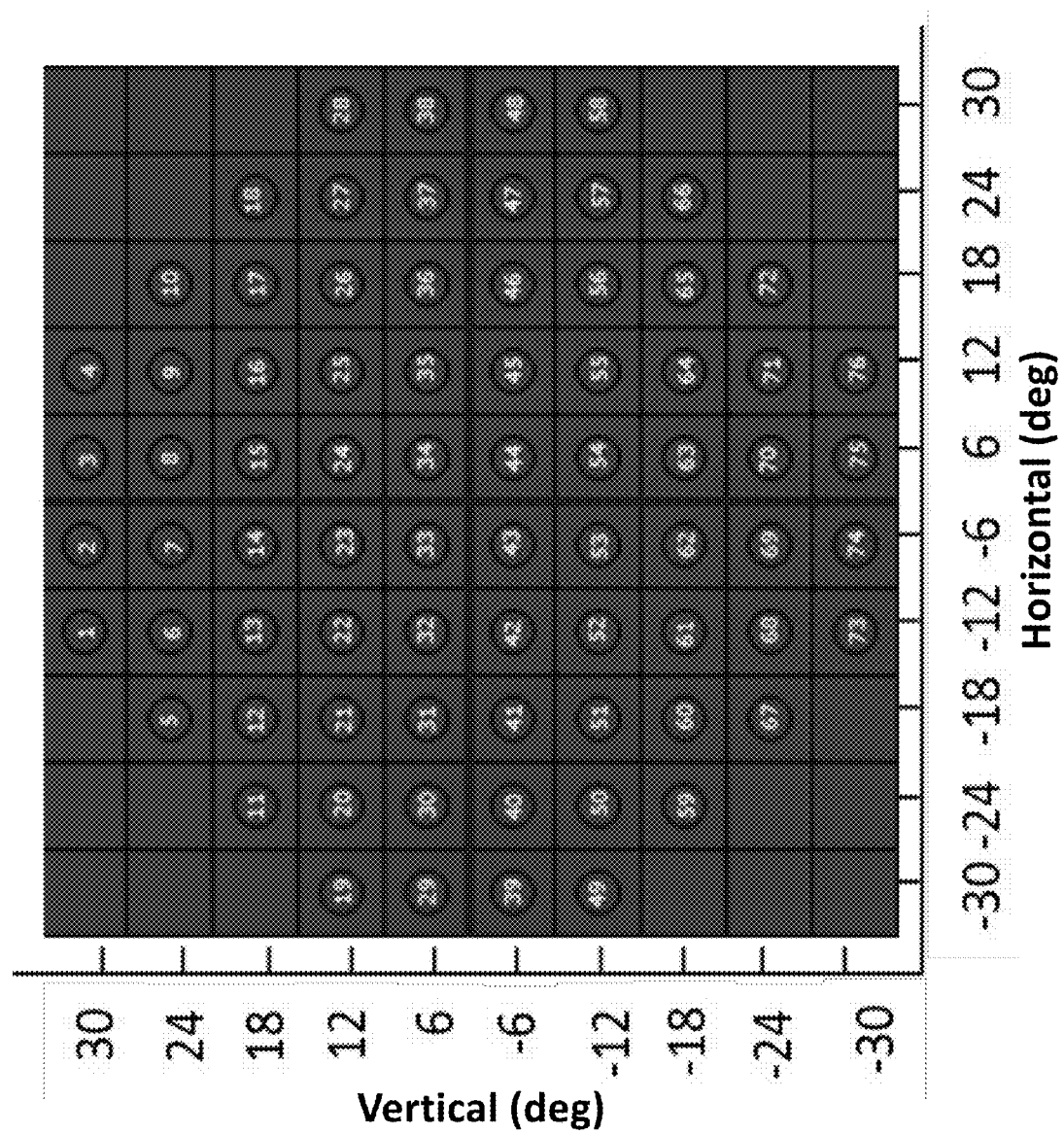
Figure 2:
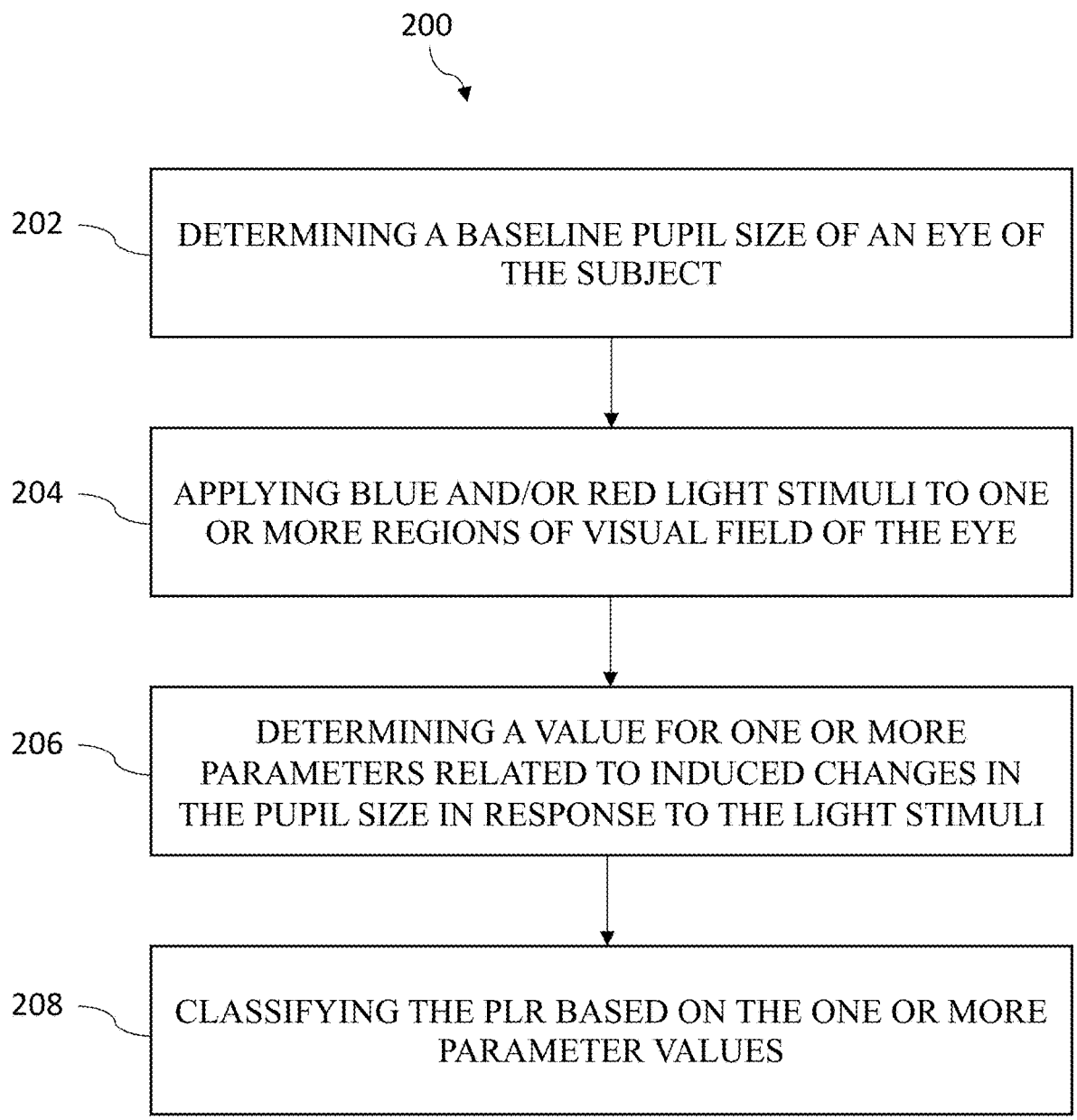
Figure 4A:
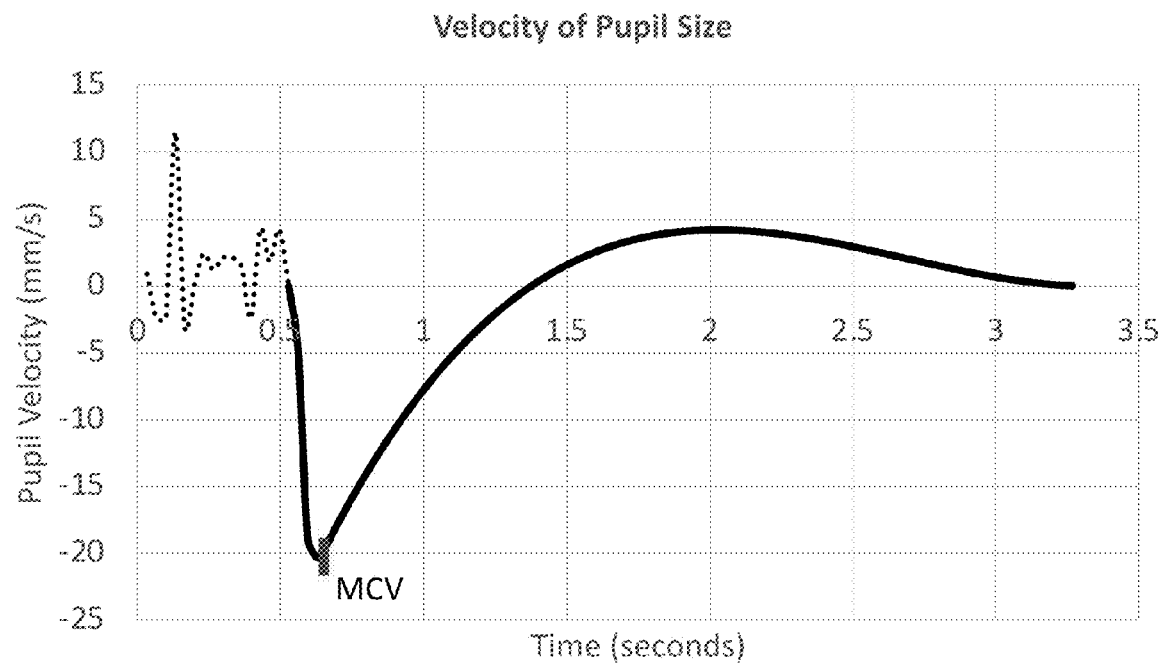
Figure 4B:
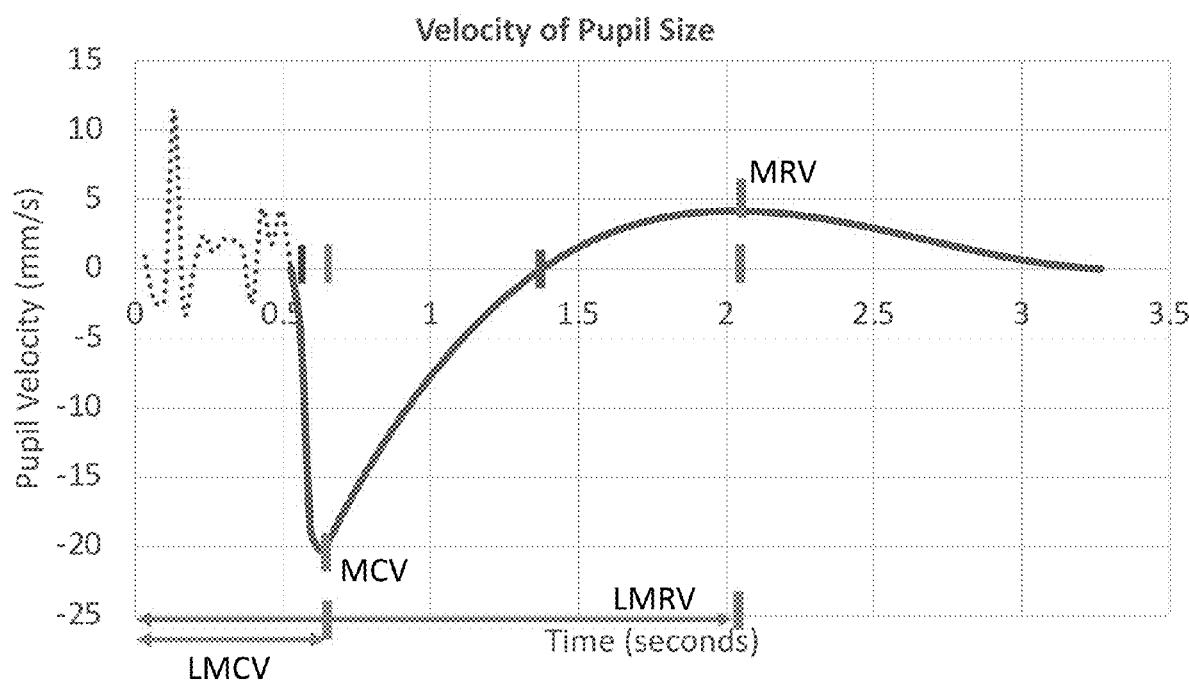
Figure 5A:
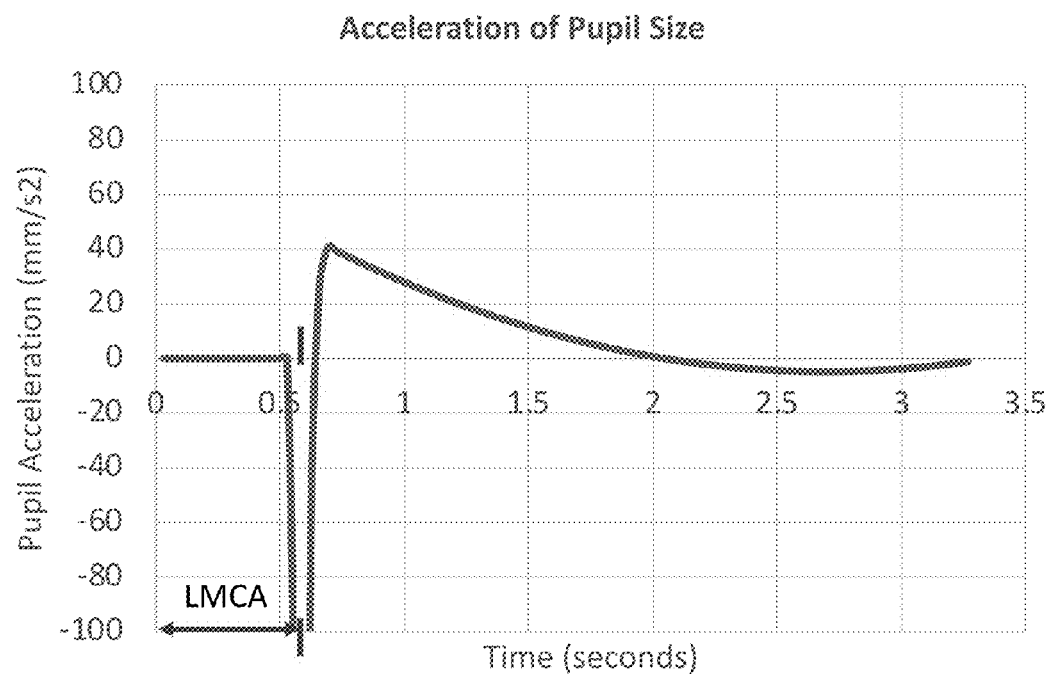
Figure 5B:
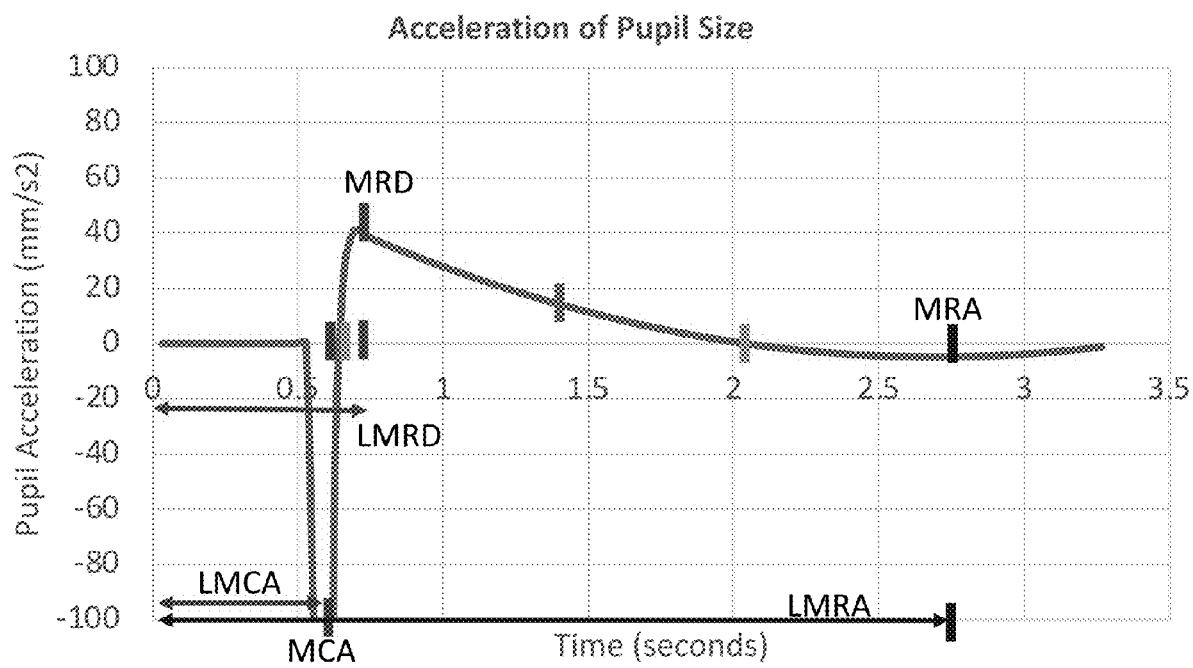
Figure 6:
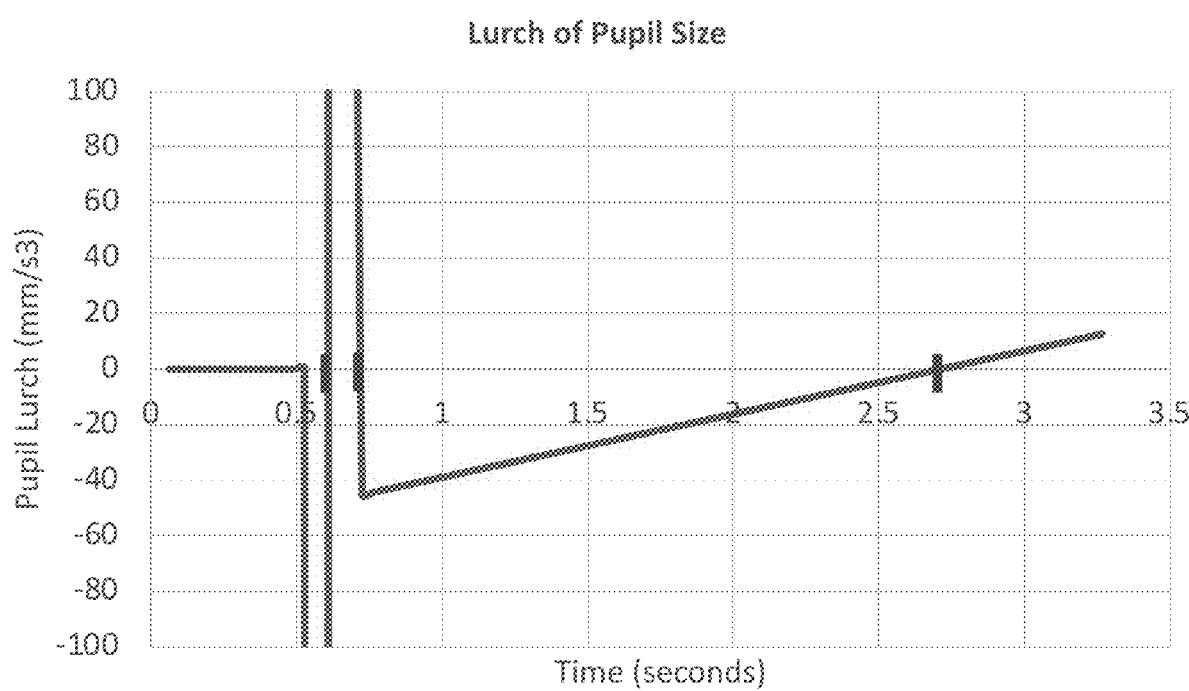
Figure 7:
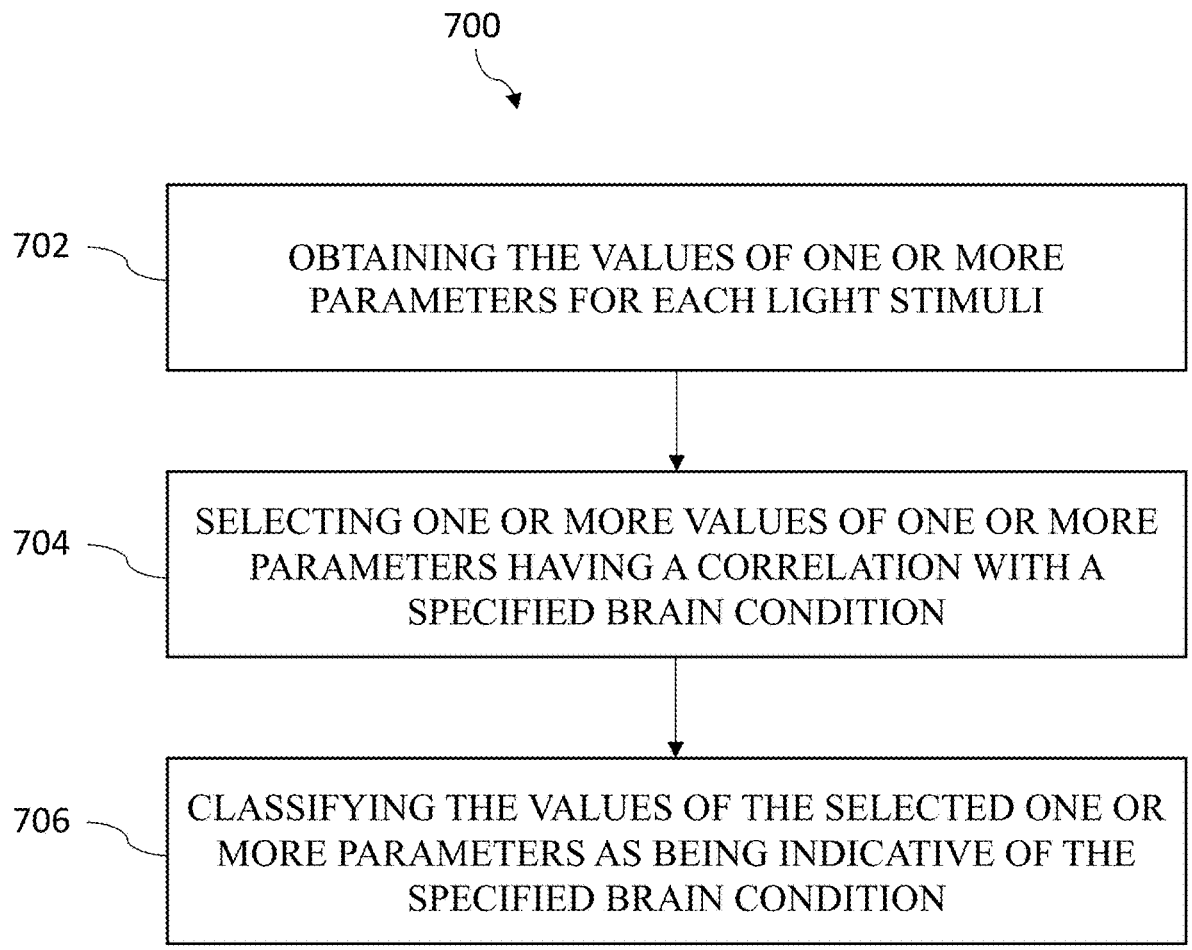
Figure 10A:
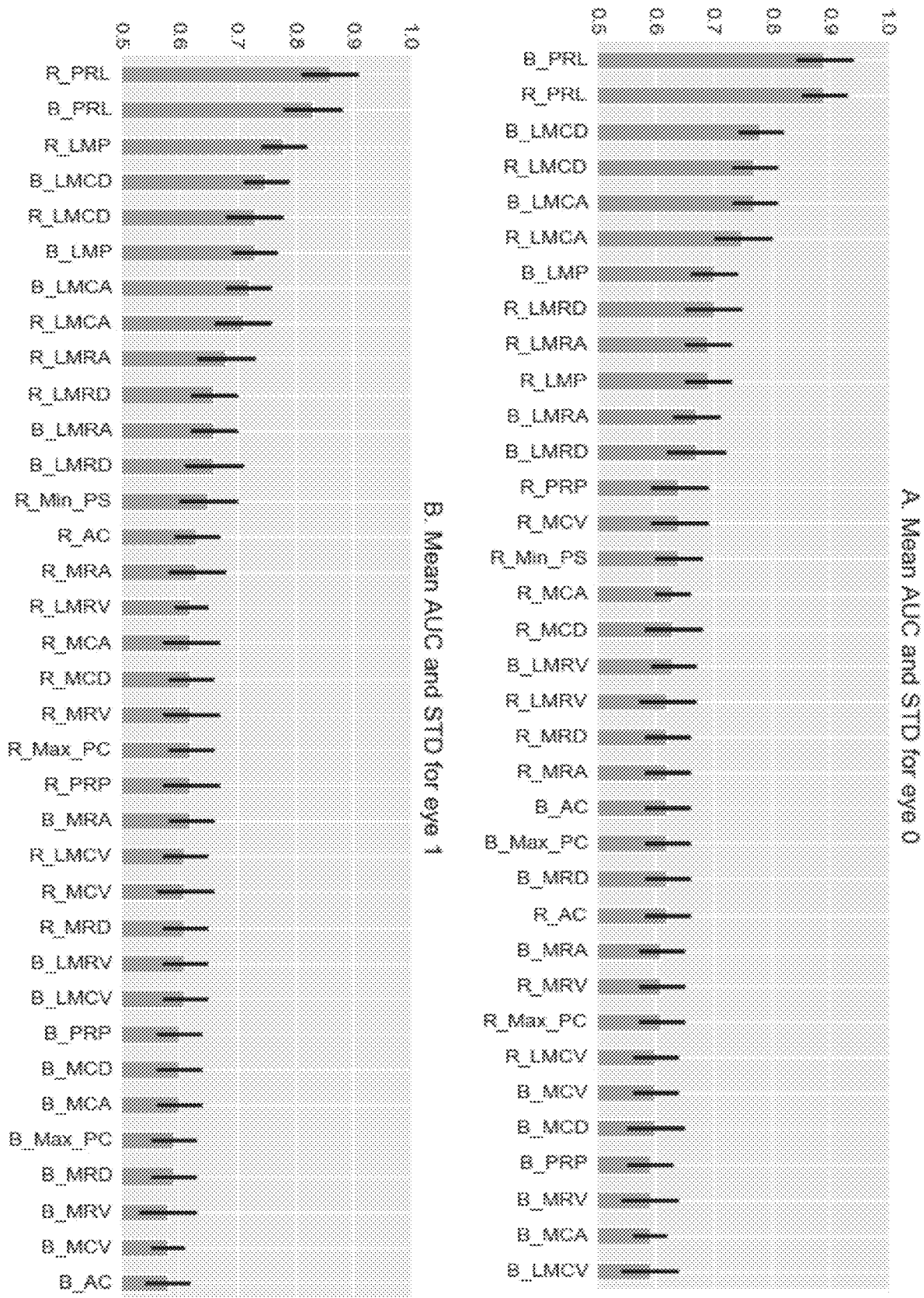
Figure 10B:
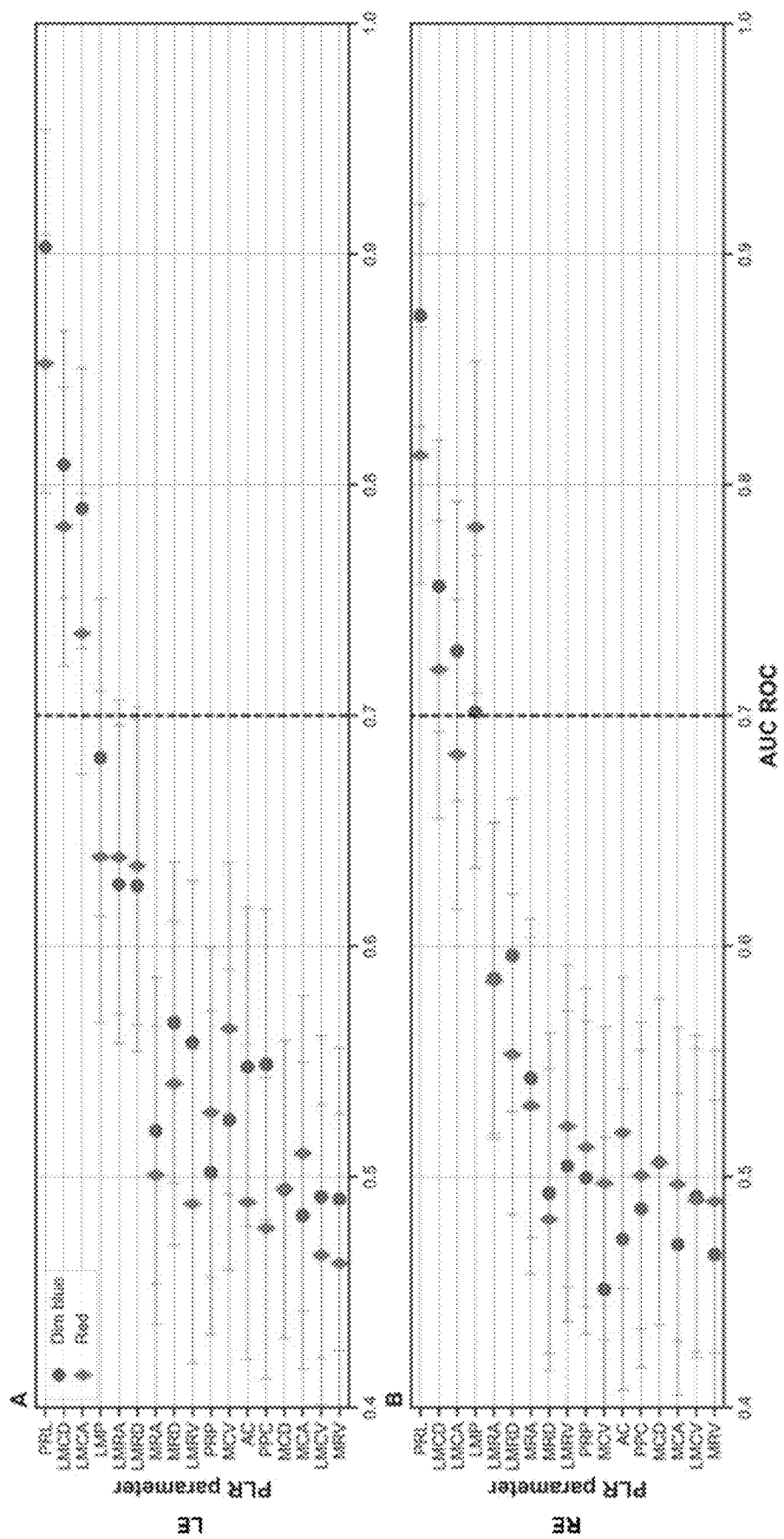

In the figures:

FIG. 1A shows a schematic illustration of a system for monitoring the progression of, determining and/or assessing a brain related condition of a subject, in accordance with some embodiments of the present invention;

FIG. 1B shows a front view of a pupilometer device, in accordance with some embodiments of the present invention;

FIG. 1C shows a graph of an exemplary distribution of positions of light stimuli of a pupilometer device, in accordance with some embodiments of the present invention;

FIG. 2 shows a flow chart of functional steps in a non-invasive method for monitoring the progression of, determining and/or assessing a brain related condition of a subject, in accordance with some embodiments of the present invention;

FIG. 3A, FIG. 3B, FIG. 3C, and FIG. 3D show graphs of exemplary parameters and value calculations, in accordance with some embodiments of the present invention;

FIG. 4A and FIG. 4B show graphs of velocity of pupil size as a function of time, in accordance with some embodiments of the present invention;

FIG. 5A and FIG. 5B show graphs of acceleration of pupil size as a function of time, in accordance with some embodiments of the present invention;

FIG. 6 shows a graph of the lurch of pupil size as a function of time, in accordance with some embodiments of the present invention;

FIG. 7 shows a flow chart of functional steps in a non-invasive method for monitoring the progression of, determining and/or assessing a brain related condition of a subject, using a machine learning algorithm, in accordance with some embodiments of the present invention;

FIG. 8 shows a schematic illustration of a process of extraction of a feature vector of an exemplary parameter measured from a patient's eye, in accordance with some embodiments of the present invention;

FIG. 9 shows an illustration of producing a 95% confidence interval (CI) for an AUC for a single pupilometer parameter (in this case, R_PRL). Given the full set of samples, an exemplary training set is generated by sampling with replacement, whereas the test set is comprised of samples that were not included in the training set, in accordance with some embodiments of the present invention;

FIG. 10A shows two bar graphs of the mean AUC for each pupilometer parameter (bars) and the STD values (black lines) for each one of the pupilometer parameters for eye-0 (top graph) and eye-1 (bottom graph), generated using the exemplary bootstrapping process (depicted in FIG. 9), in accordance with some embodiments of the present invention;

FIG. 10B shows the mean Area Under the Receiver's Operating Curve (AUC-ROC) for each PLR parameter for dim red (red diamond) and blue (blue circle) light stimuli in the left (A, LE) and right (B, RE) eyes as was measured using the bootstrapping process (depicted in FIG. 9). Error bars represent the Standard Deviation for each parameter. The black dashed lines highlight the cutoff of AUC-ROC=0.7.

Figure 11A:
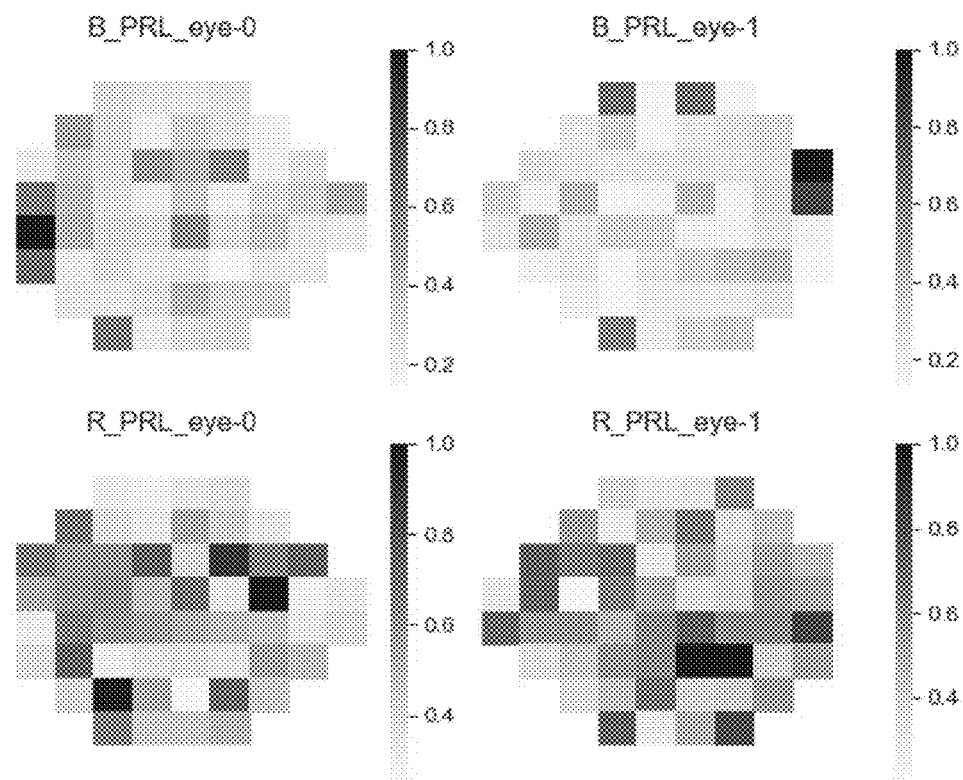
Figure 11B:
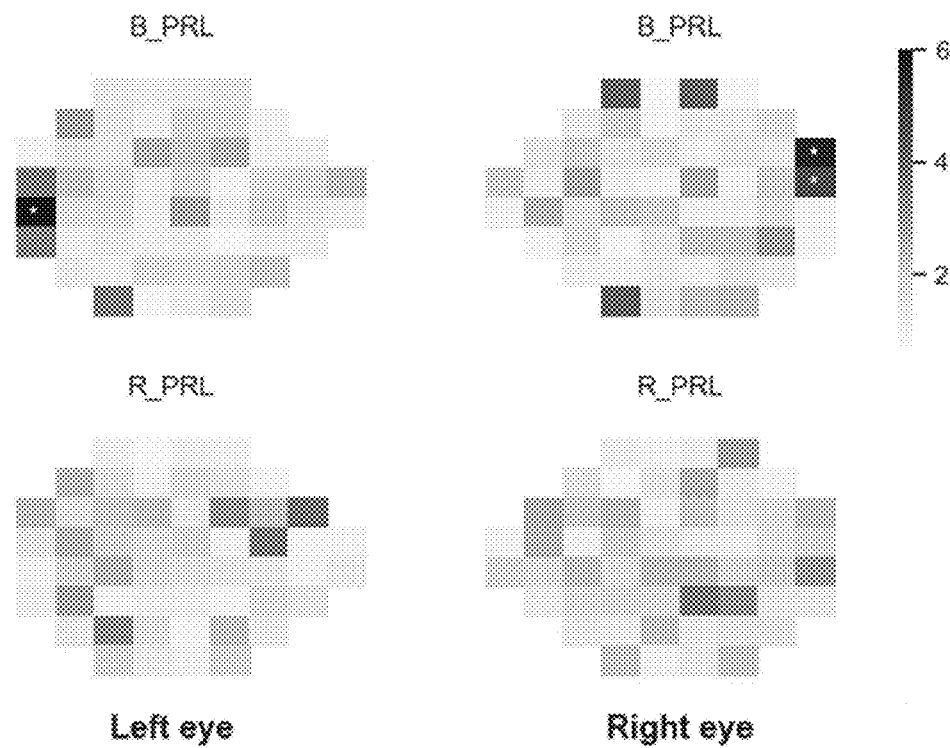
Figure 12:
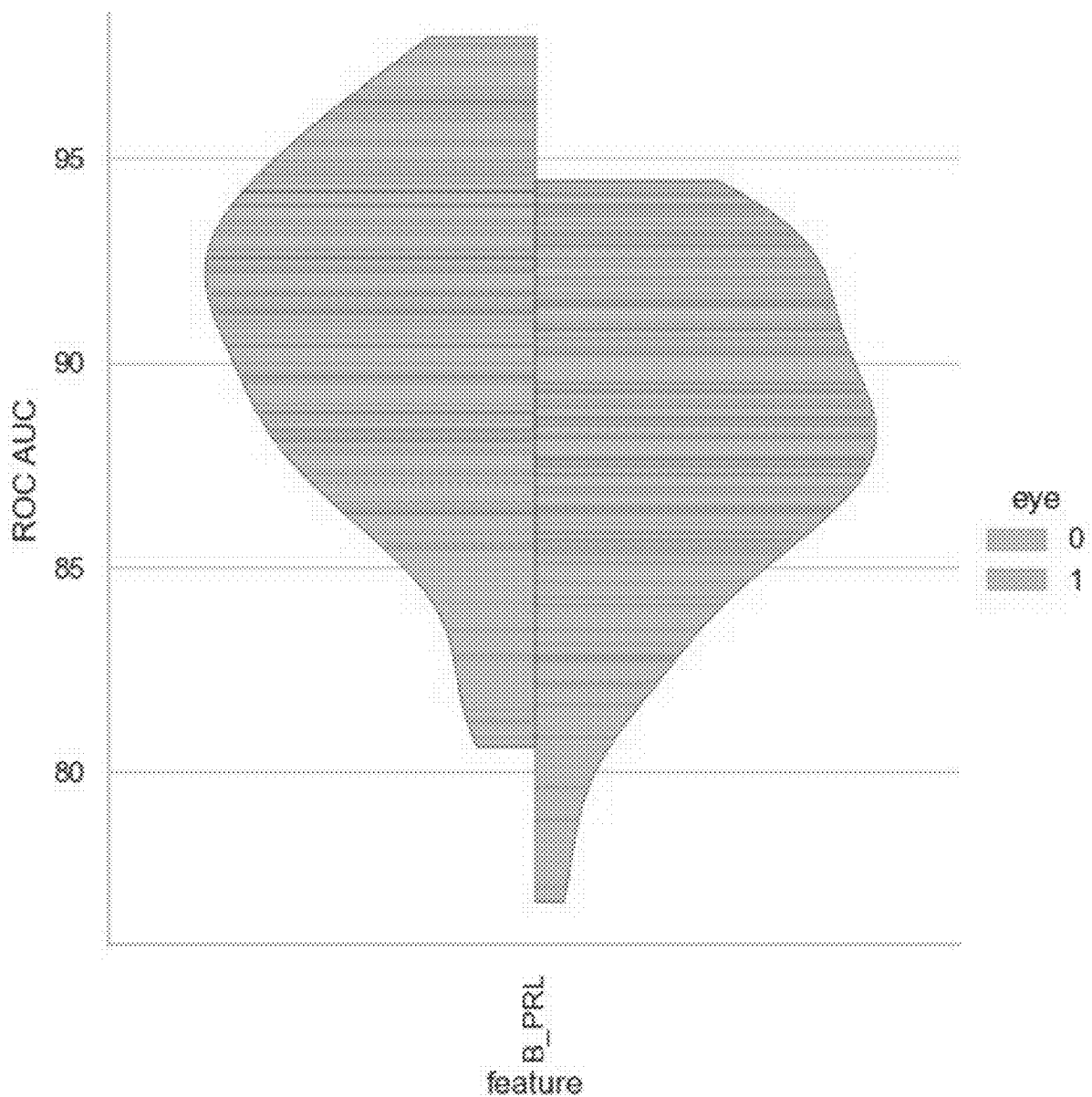
Figure 13:
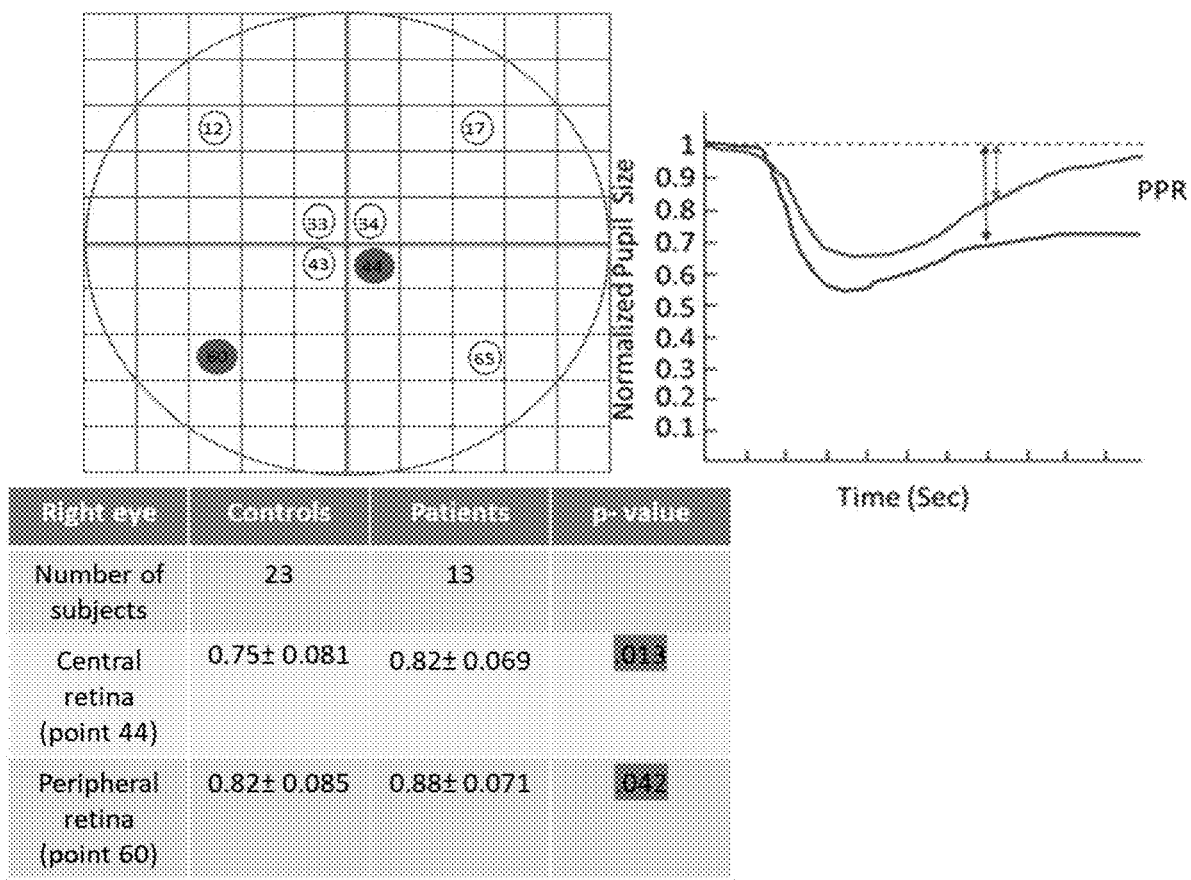
Figure 14A:
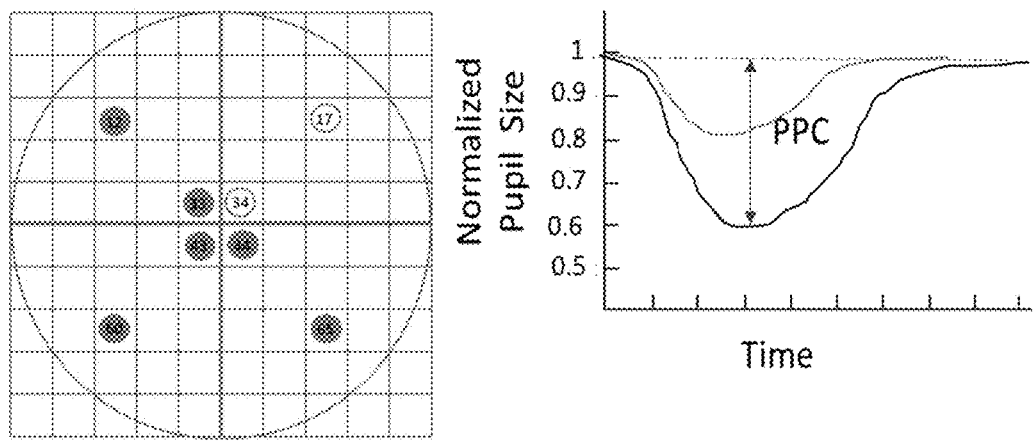
Figure 14B:
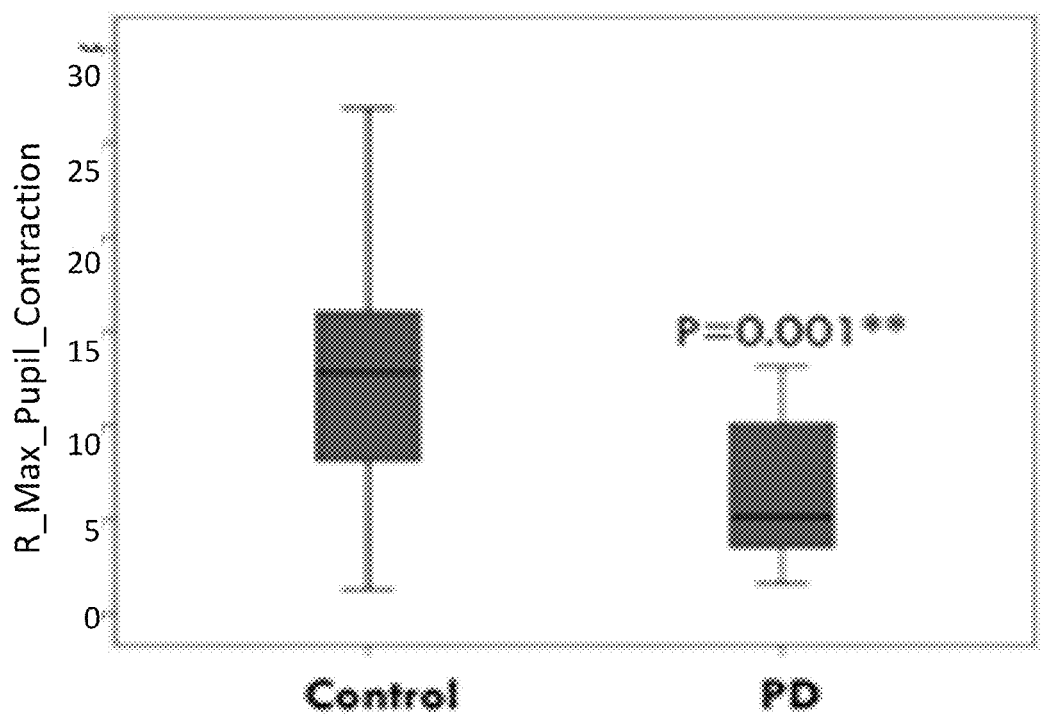
Figure 15A:
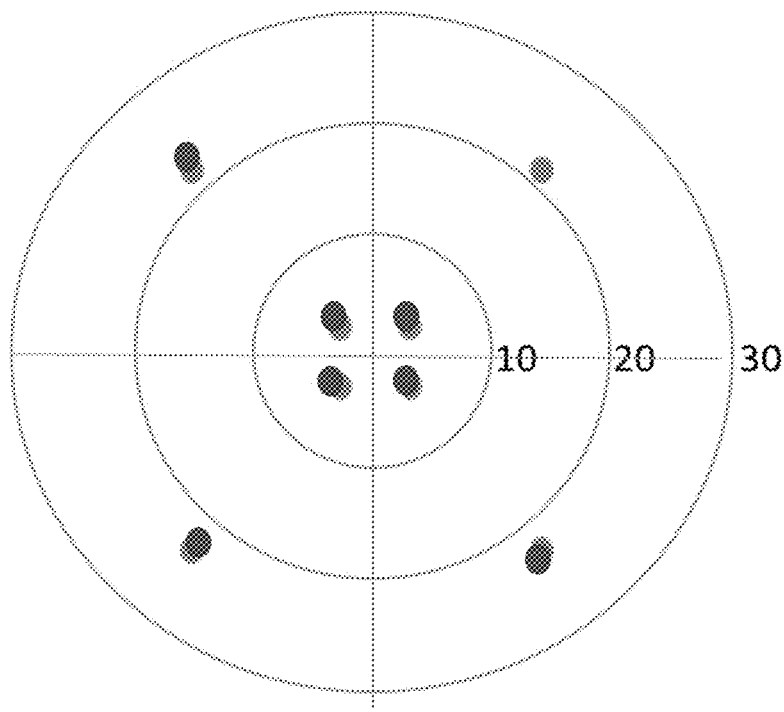
Figure 15B:
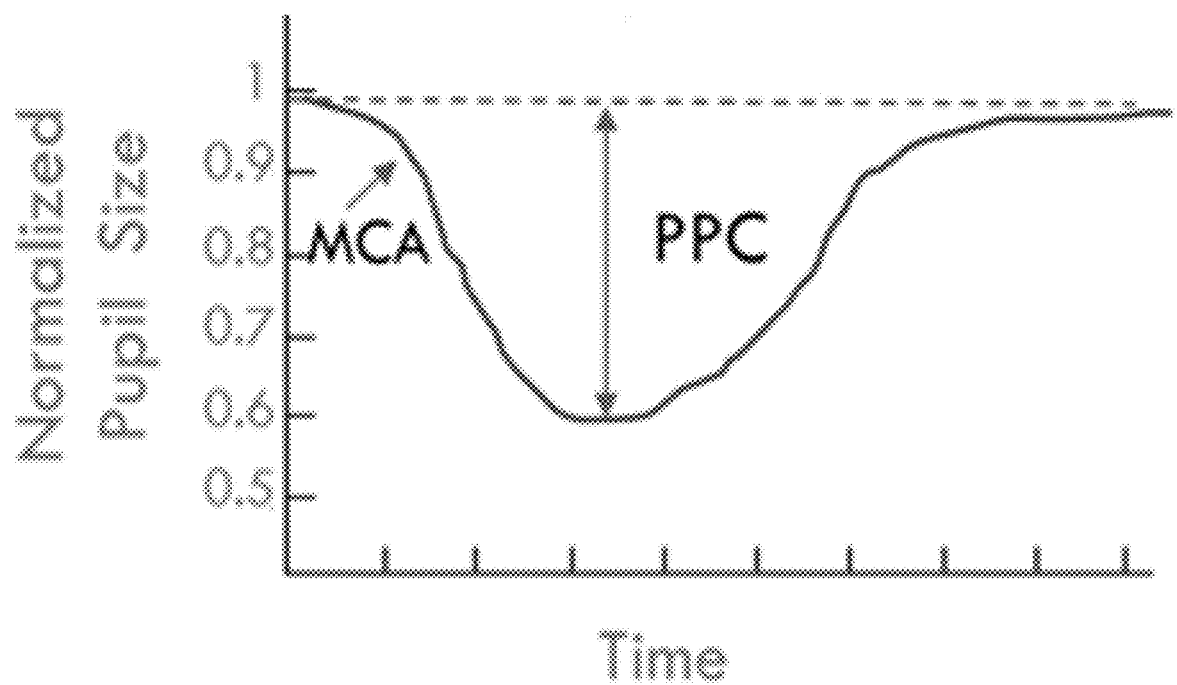
Figure 15C:
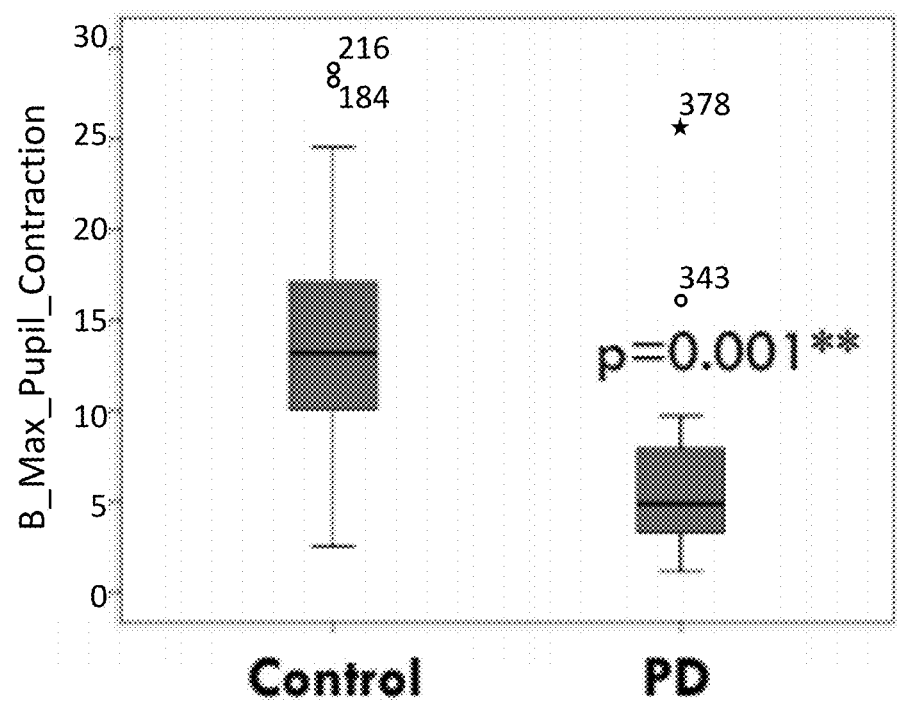
Figure 15C:
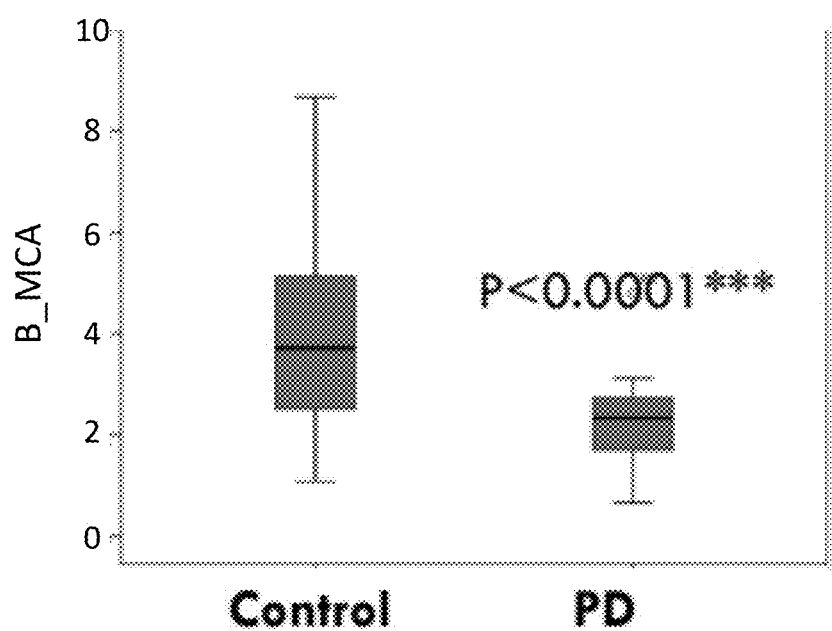
Figure 16:
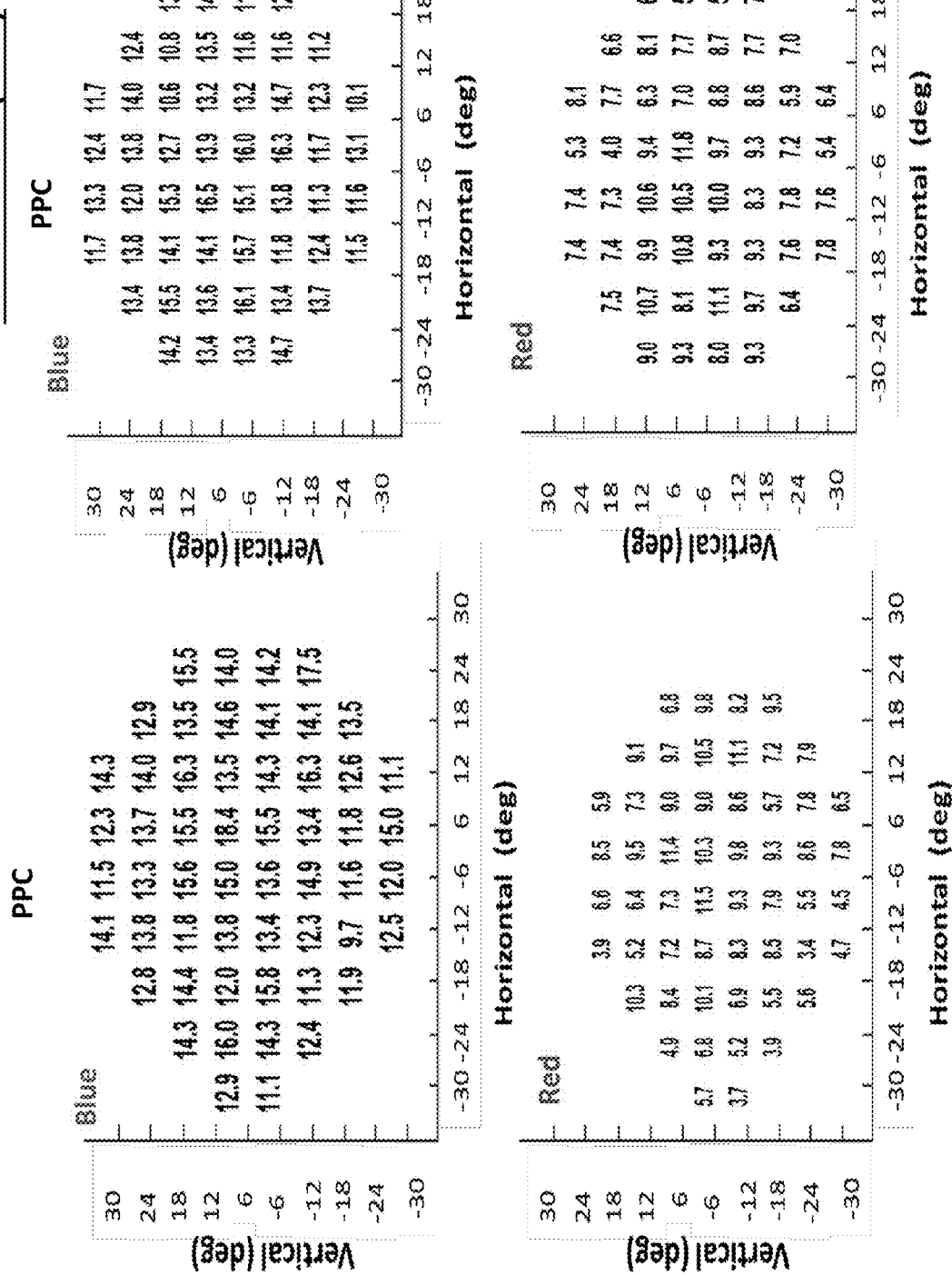
Figure 17:
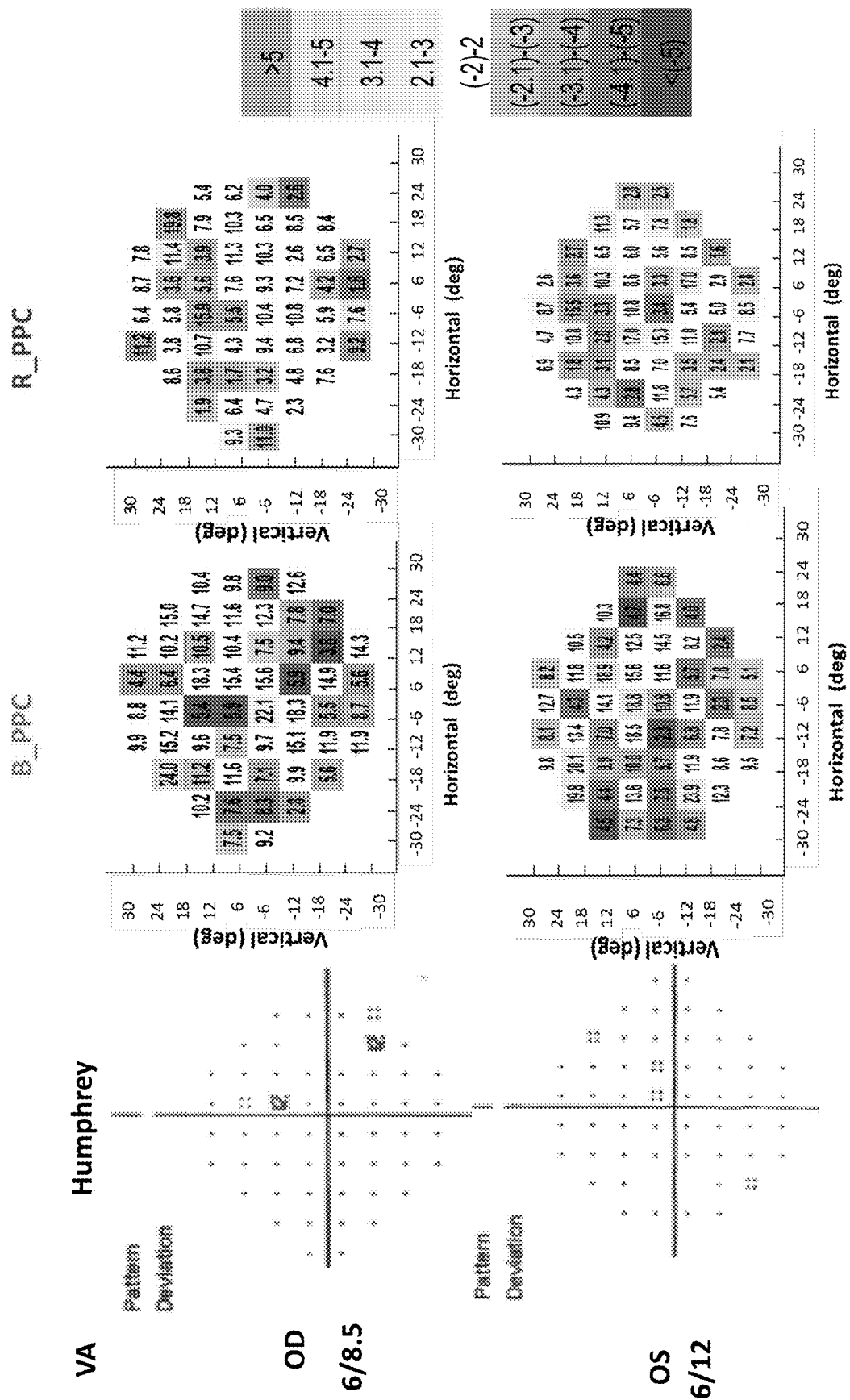
Figure 18:
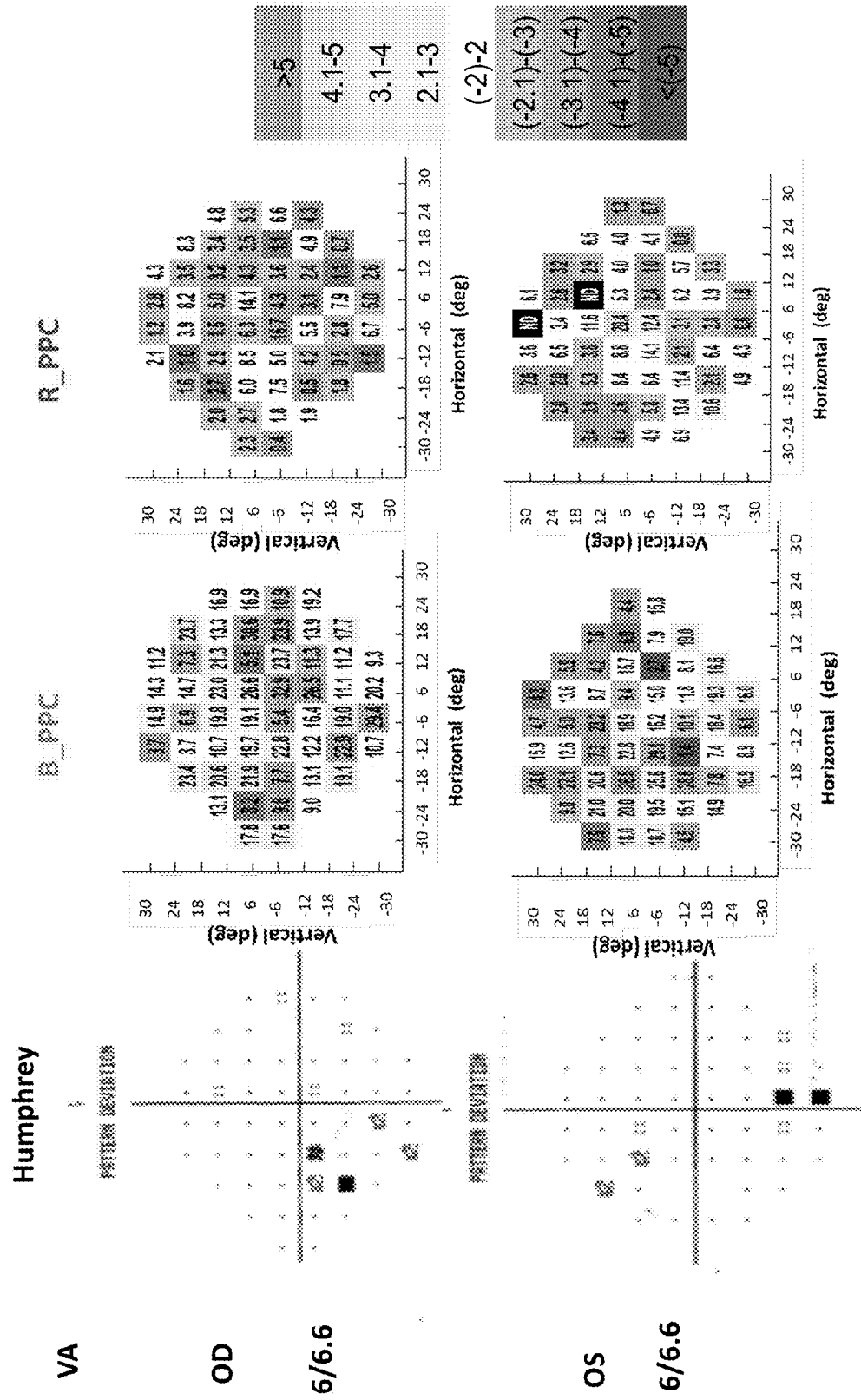
Figure 19:
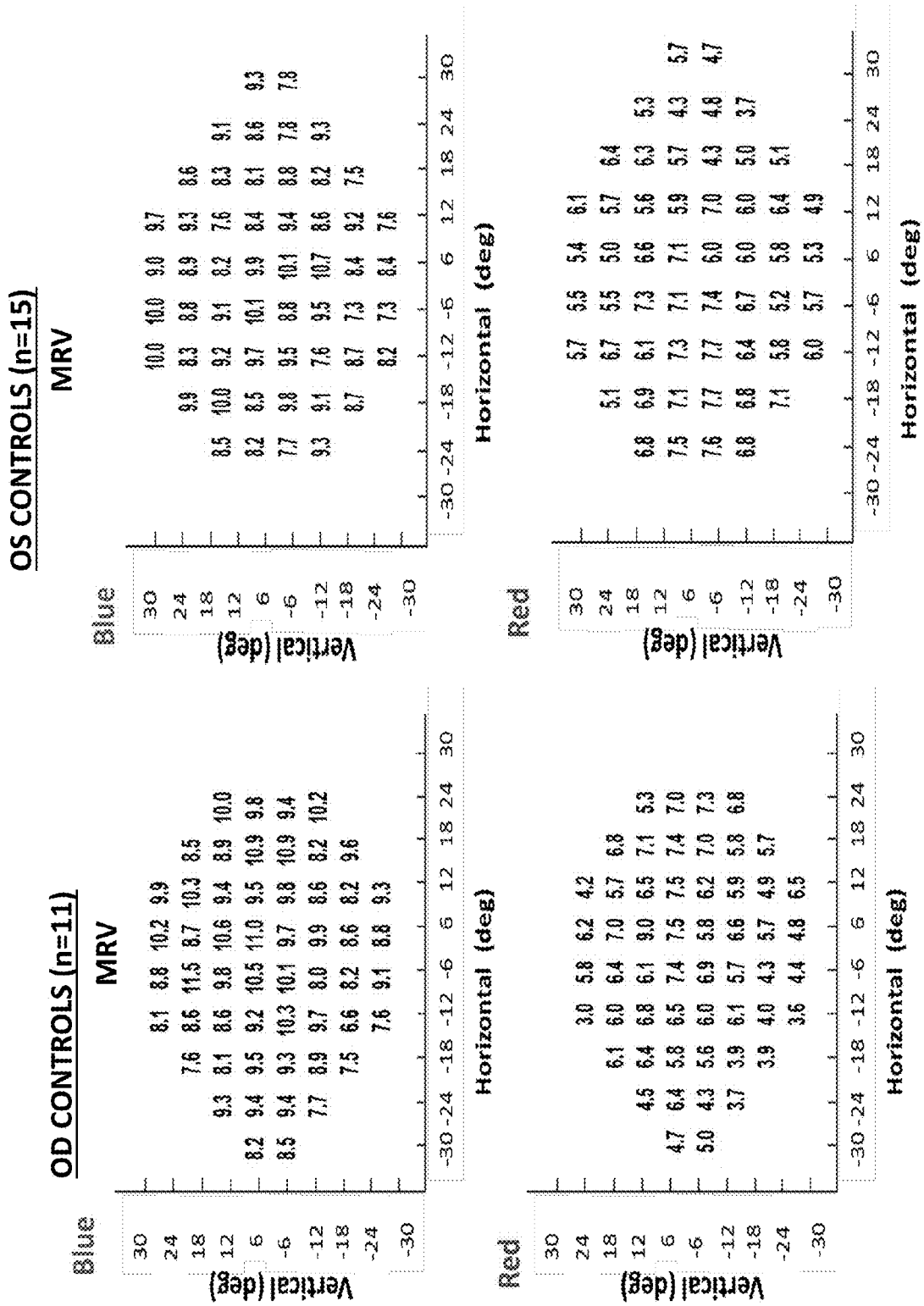
Figure 20:
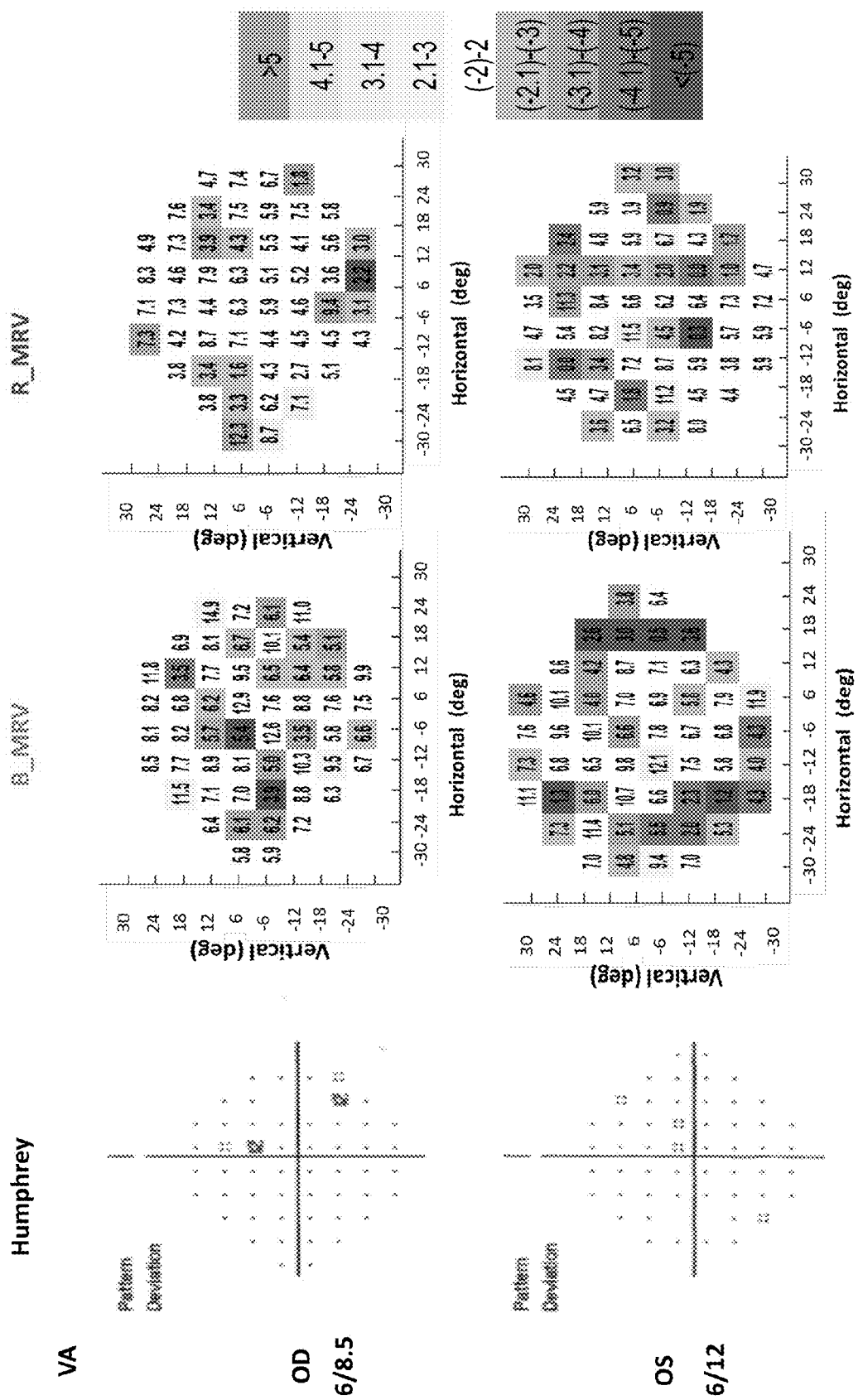
Figure 21:
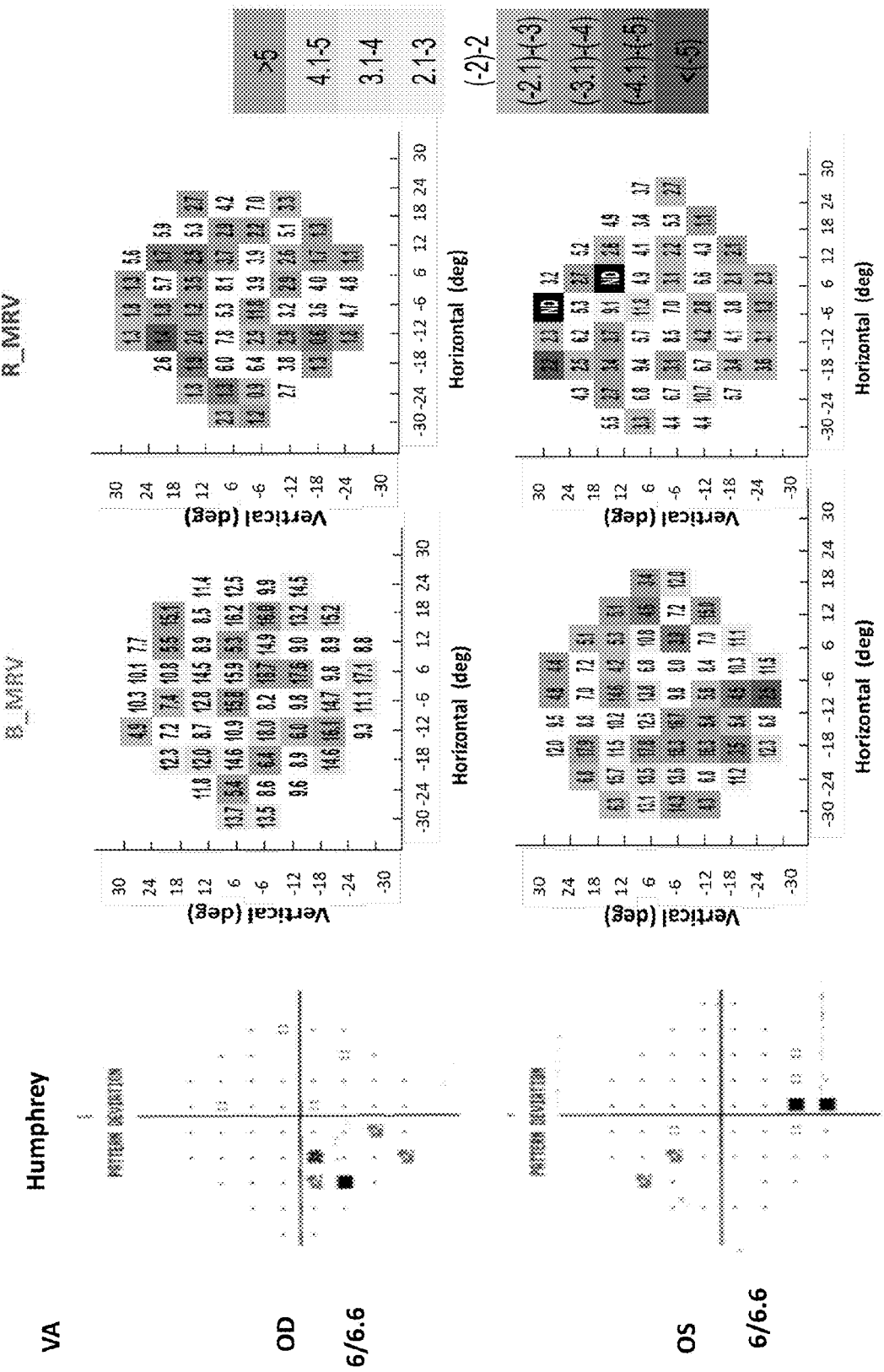
Figure 22:
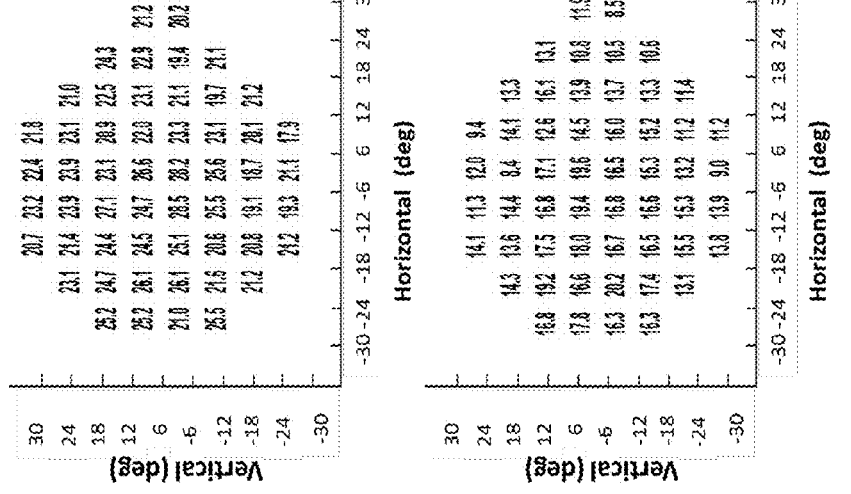
Figure 22:
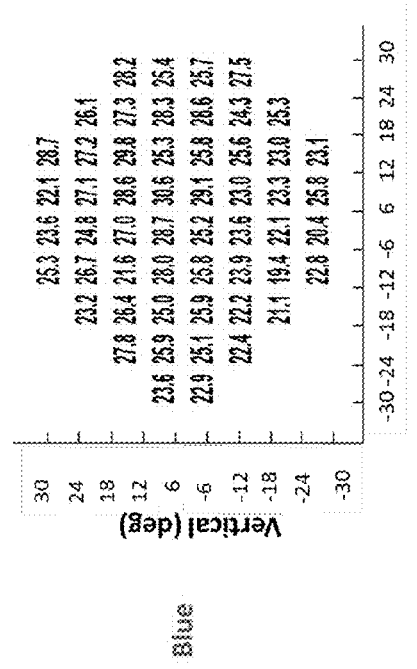
Figure 22:
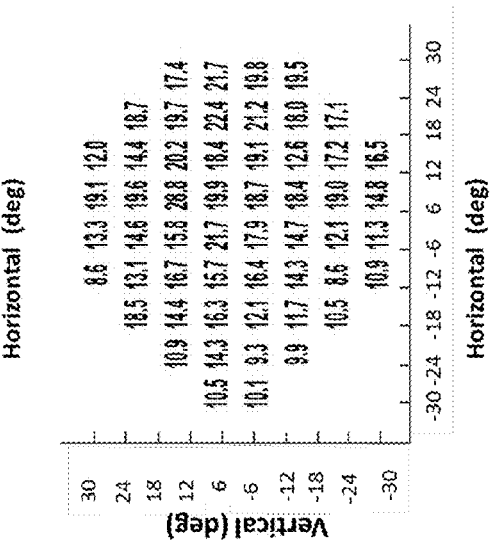
Figure 23:
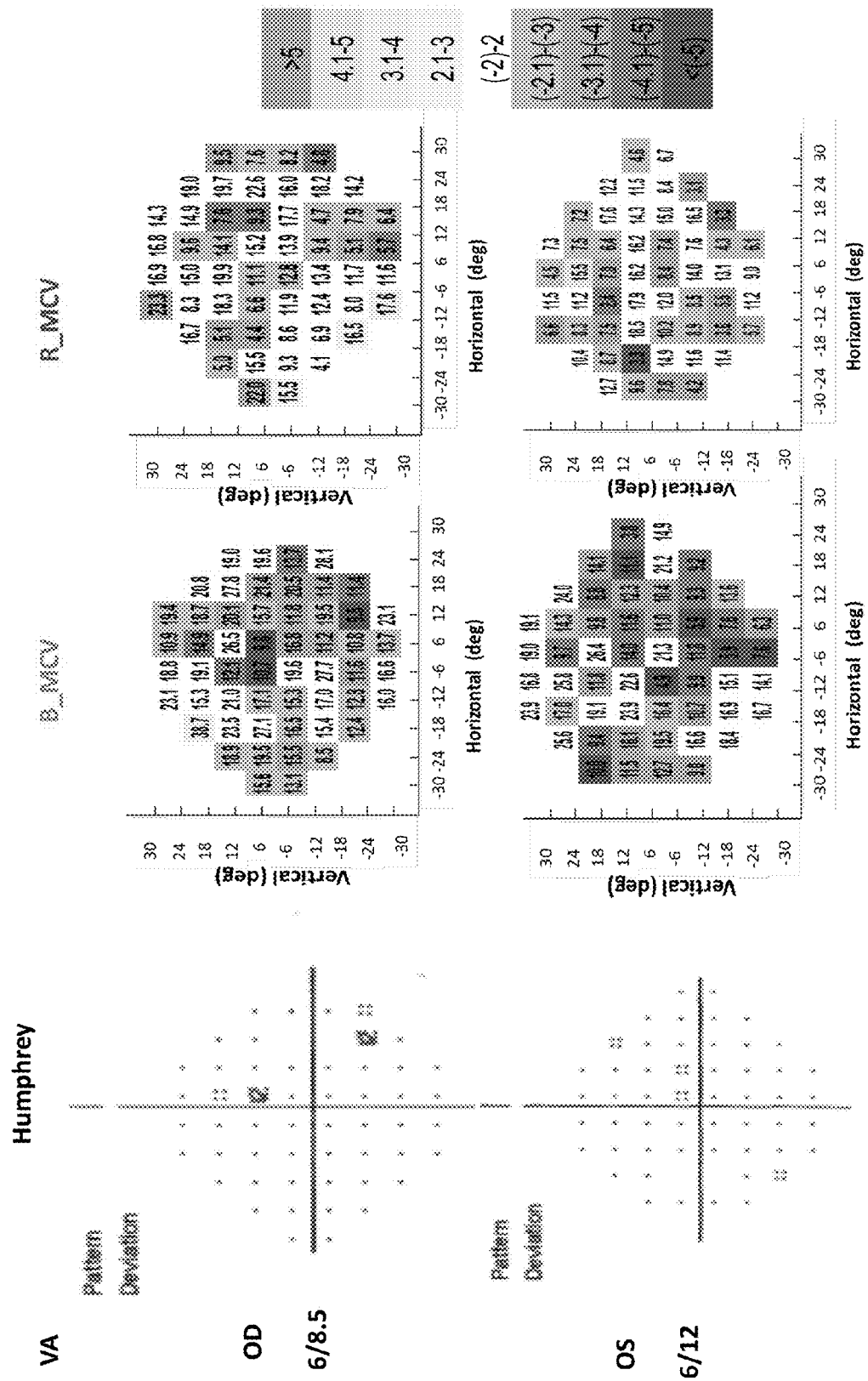
Figure 24:
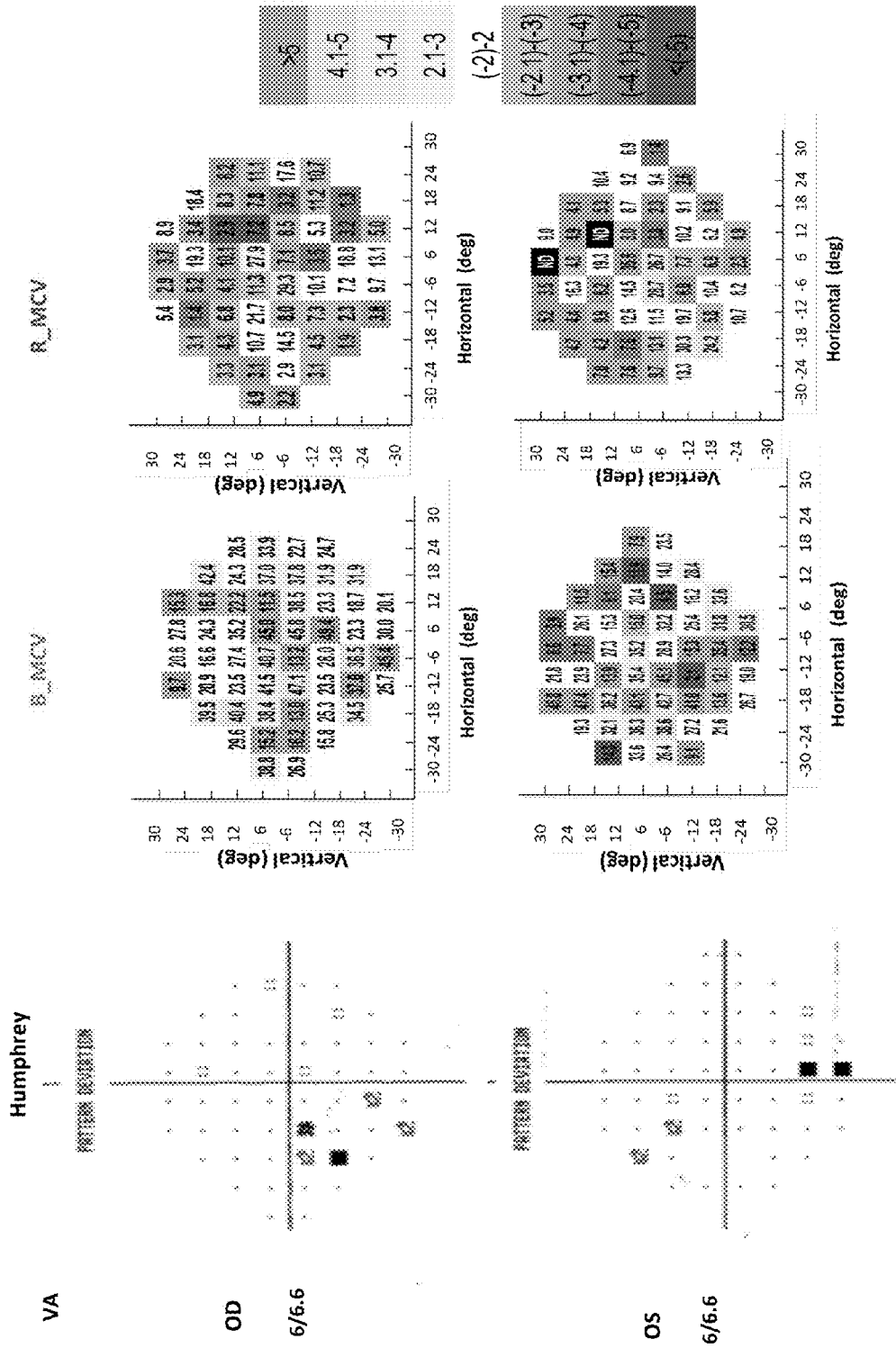
Figure 25:
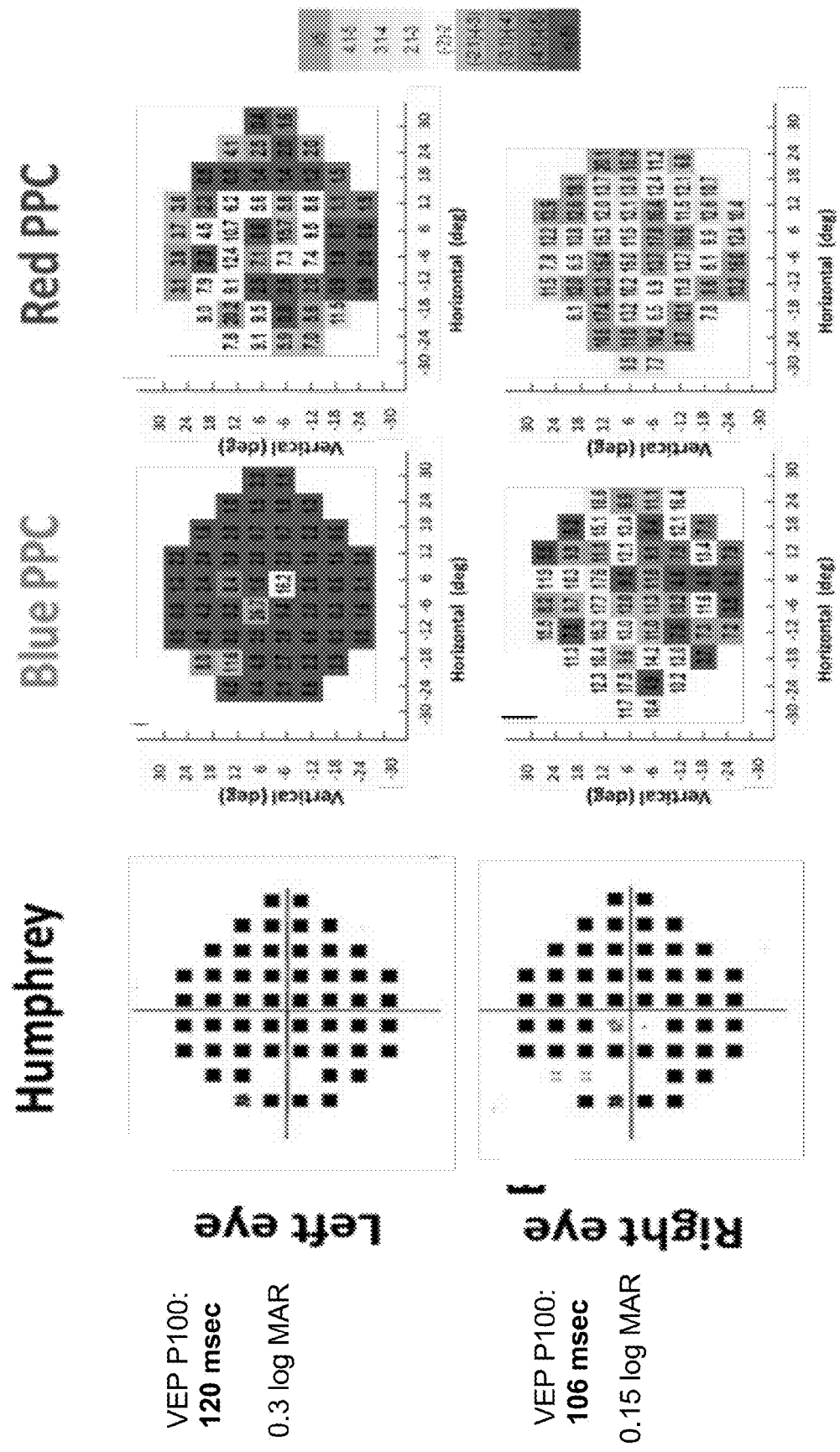
Figure 26:
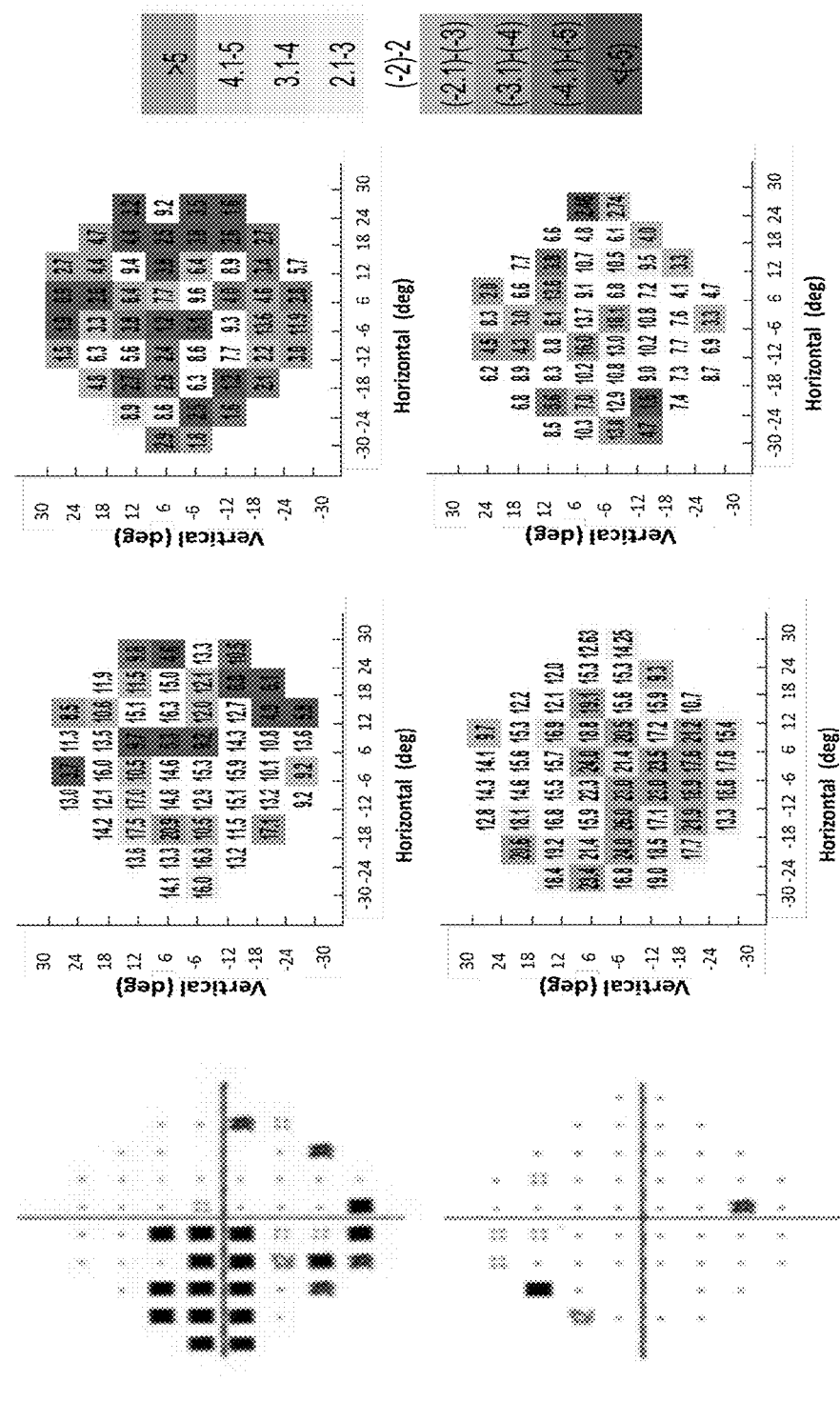
Figure 27:
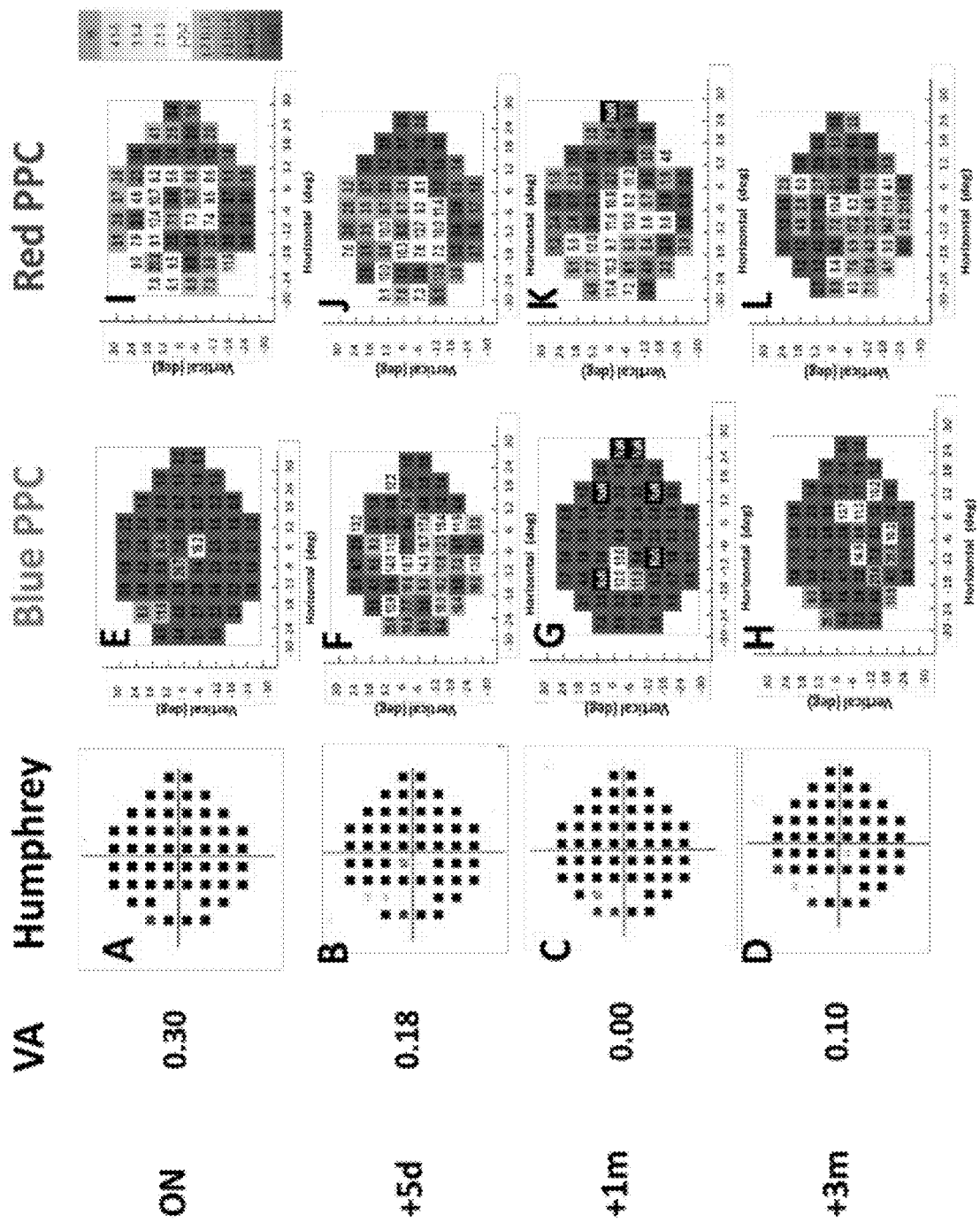
Figure 28:
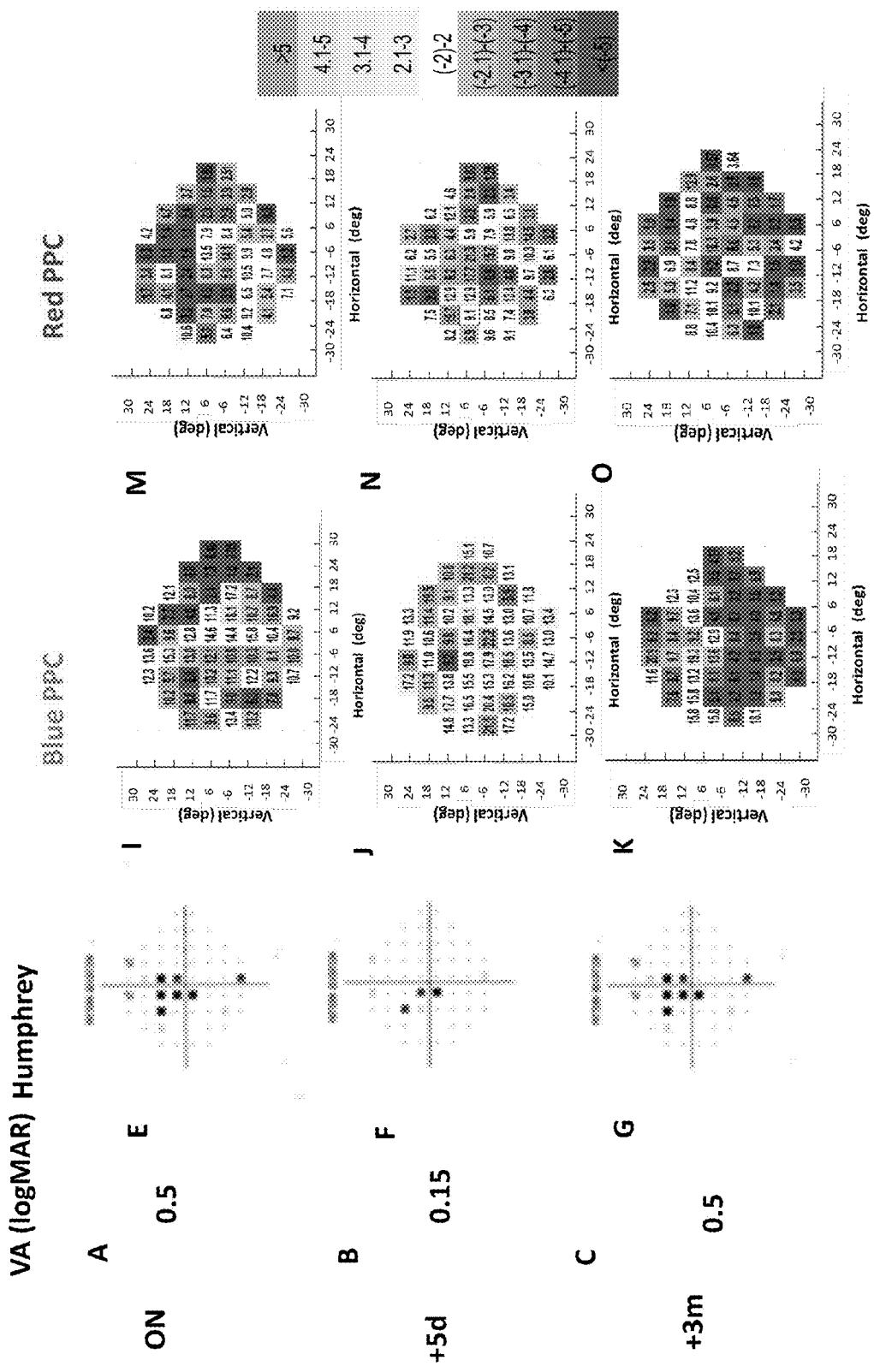
Figure 29:
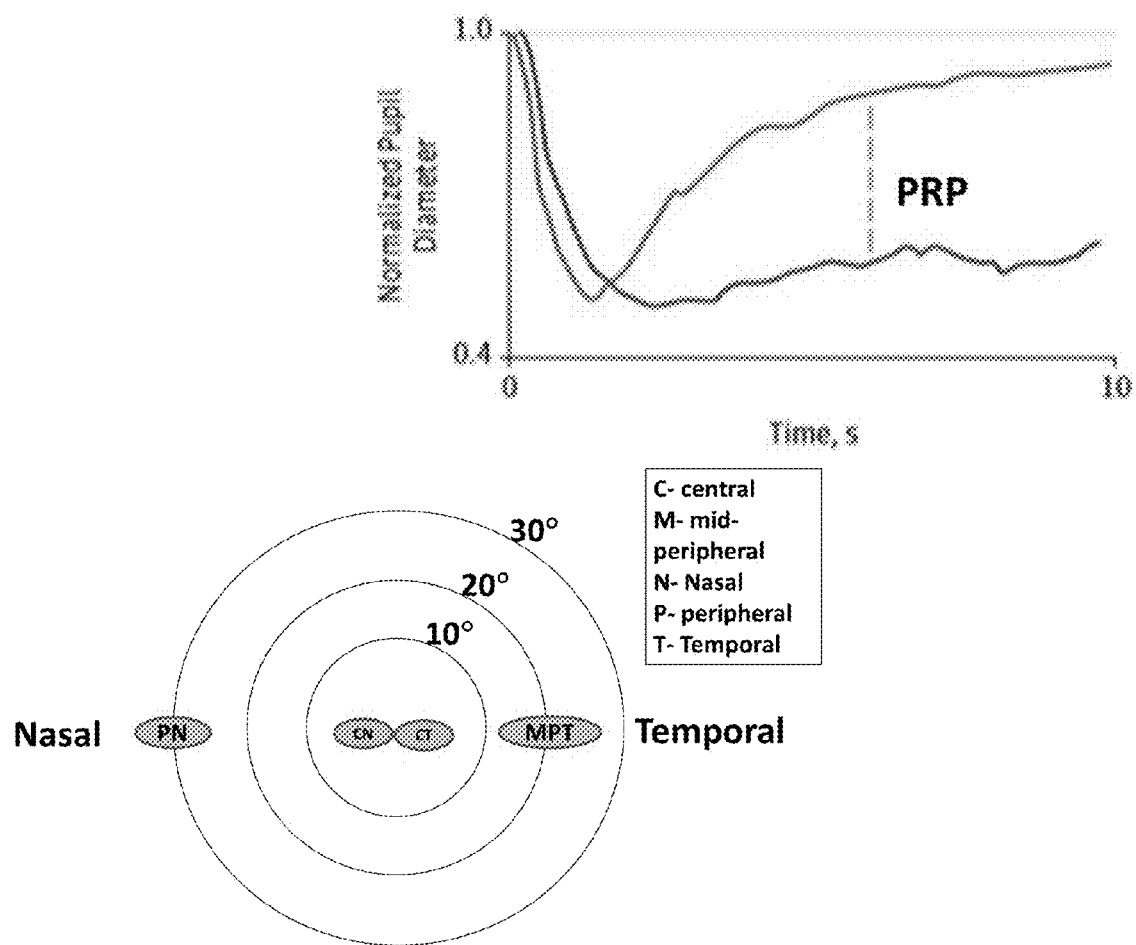

FIGS. 11A-B shows the relative weight given by a machine learning model to each one of the 54 eye spots, in accordance with some embodiments of the present invention. FIG. 11A—The weights are averaged over the 100 trials that were used to produce the 95% CI, as depicted above. Upper and bottom rows show the weights for B_PRL and R_PRL parameters, respectively. Left and right columns show results for left and right eyes, respectively. Color coding bars indicate weight of the eye spot, where higher weights correspond to darker colors; FIG. 11B-shows the relative weight given by the machine-learning model to each one of the 54 retinal test-targets for Pupil Response Latency (PRL) in the left (a,c) and right eye (b,d) for dim blue (a,b, B_PRL) and dim red light stimuli (c,d, R_PRL). The weights were averaged over the 2000 trials that were used to produce the 95% CI. Color-coding indicates higher weights in darker colors. White asterisks indicate the targets with highest weight for the dim blue light (a,b);

FIG. 12 shows the distribution of the different AUC values within the confidence interval, in accordance with some embodiments of the present invention. For each eye there are 95 horizontal lines, each one corresponding to a different AUC value that is a result of an independent experiment (a total of 100 experiments for each eye);

FIG. 13 shows that attenuated melanopsin-mediated PPR is observed in PD patients in central and inferior visual field (VF) in response to bright blue light, in accordance with some embodiments of the present invention;

FIG. 14A and FIG. 14B show that attenuated cone-mediated PPC in central and peripheral VF (i.e., response to red light) is observed in PD patients, in accordance with some embodiments of the present invention;

FIG. 15A, FIG. 15B, and FIG. 15C show that attenuated rod-mediated PPC and MCA in central VF and peripheral VF (i.e., response to dim blue light) is observed in PD patients, in accordance with some embodiments of the present invention;

FIG. 16 shows the results of the PPC parameter as measured in various locations of the visual field in the left eye (OS) or right eye (OD) of control subjects, in accordance with some embodiments of the present invention;

FIG. 17 shows the results of the PPC parameter as measured in various locations of the visual field in the left eye (OS) or right eye (OD) of MS patient, in accordance with some embodiments of the present invention;

FIG. 18 shows the results with respect of the PPC parameter as measured in various locations of the visual field in the left eye (OS) or right eye (OD) of MS patient, in accordance with some embodiments of the present invention;

FIG. 19 shows the results with respect of the MRV parameter as measured in various locations of the visual field in the left eye (OS) or right eye (OD) of control subjects in response to blue or red light irradiation, in accordance with some embodiments of the present invention;

FIG. 20 shows the results with respect of the MRV parameter as measured in various locations of the visual field in left eye (OS) or right eyes (OD) of MS patient in response to blue or red light irradiation. Each number in the pupilloperimeter "map" represents the MRV measured in that retinal location. Color coding was set to resemble the Humphrey perimeter's output, with a white color for "normal" values (based on the mean of age-matched controls in each test point location) and darker grey colors for values that were lower than normal. Darkest color was used for test points in which the MRV was lower than 5 SEs away from the mean of controls in those points. Yellow color, denotes targets with higher PPC than the mean of controls;

FIG. 21 shows the results with respect of the MRV parameter as measured in various locations of the visual field in the left eye (OS) or right eyes (OD) of MS patient in response to blue or red light irradiation;

FIG. 22 shows the results with respect of the MCV parameter as measured in various locations of the visual field in the left eye (OS) or right eye (OD) of control subjects in response to blue or red light irradiation;

FIG. 23 shows the results with respect of the MCV parameter as measured in various locations of the visual field in the left eye (OS) or right eyes (OD) of MS patient in response to blue or red light irradiation;

FIG. 24 shows the results with respect of the MCV parameter as measured in various locations of the visual field in the left eye (OS) or right eyes (OD) of MS patients in response to blue or red light irradiation;

FIG. 25 show an attenuated rod- and cone-mediated PPC during an ON attack;

FIG. 26 show a pupil response (PPC) for blue light is reduced in ON patients and correlates with the severity of perimetry defect;

FIG. 27 shows progression analysis of the PLR and visual function in a representative patient with ON following treatment;

FIG. 28 shows progression analysis of the PLR and visual function in a representative patient with ON following treatment with methylprednisolone (Solu-Medrol);

FIG. 29 shows a ROC analysis of the results of the PPR for high intensity blue light in ON subjects;

FIGS. 30A and 30B show a ROC analysis of the results of the PPR for high intensity blue light in ON subjects; FIG. 30A—Significantly higher PRP in eyes with optic neuritis and fellow eye (NON) or healthy eyes (control). The ON eye is more affected than fellow eye. FIG. 30B—ROC analysis with AUC of 100% for detection of ON using PPR for high intensity blue light.

Figure 31:
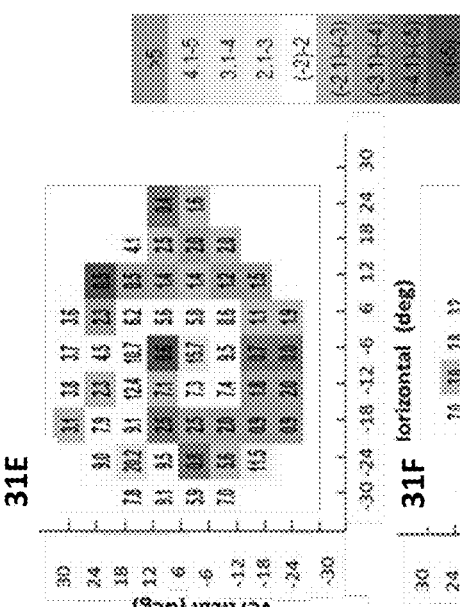
Figure 31:
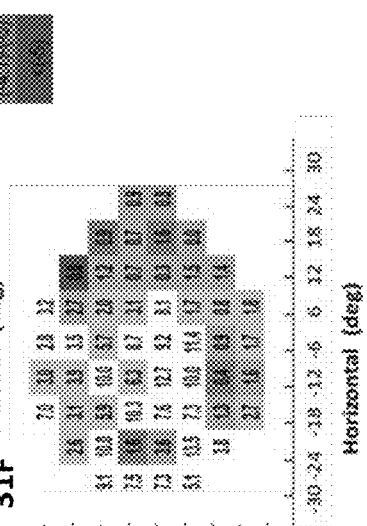
Figure 31:
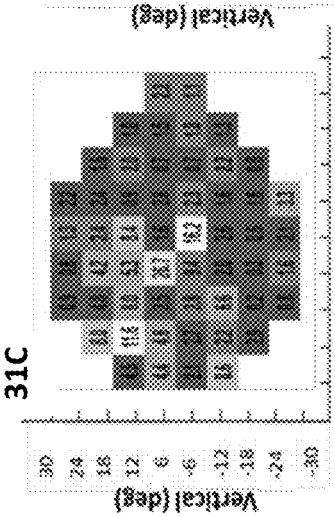
Figure 31:
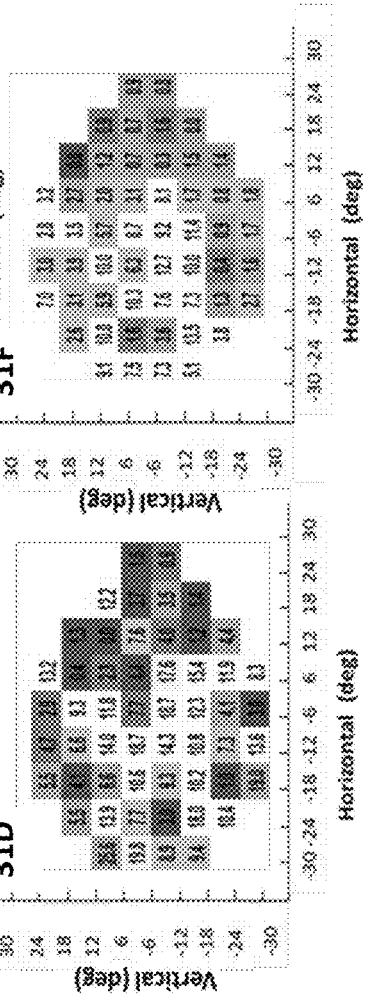
Figure 31:
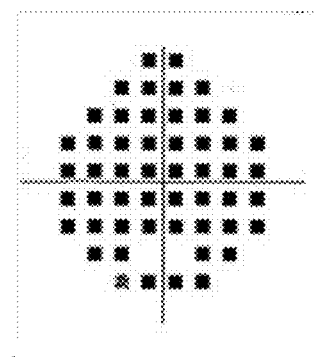
Figure 31:
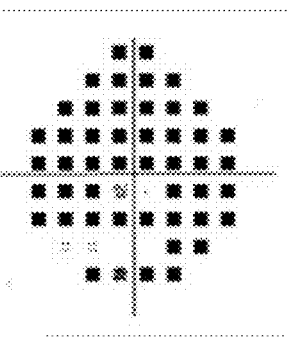
Figure 32:
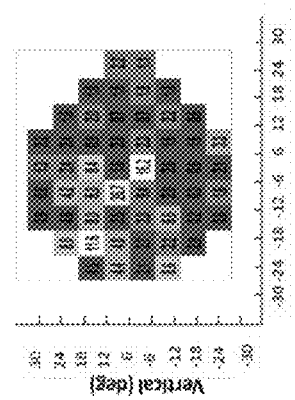
Figure 32:
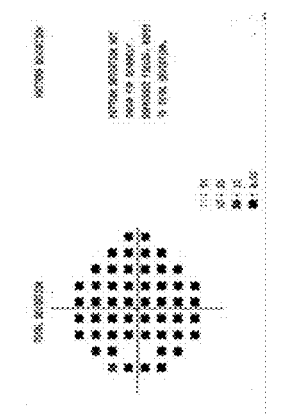
Figure 32:
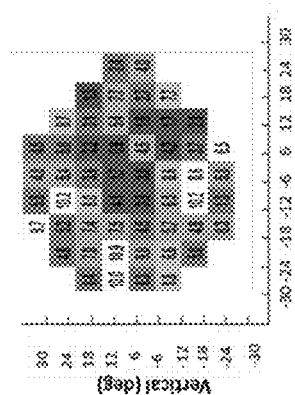
Figure 32:
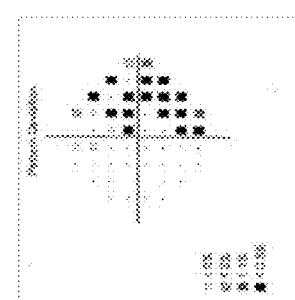
Figure 32:
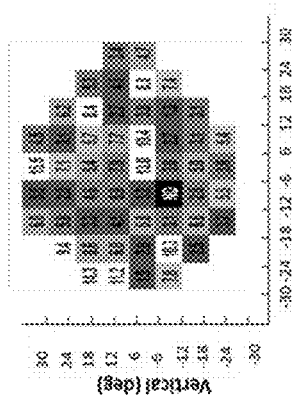
Figure 32:
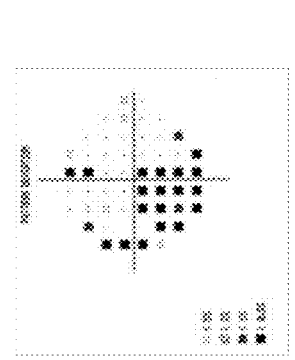
Figure 32:
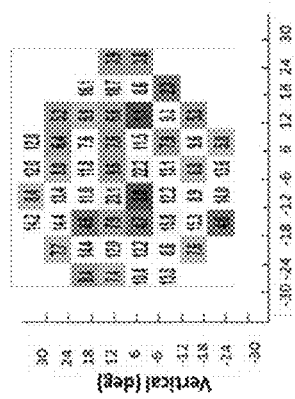
Figure 32:
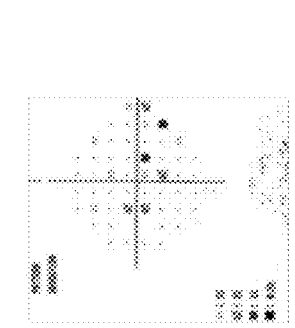
Figure 33A:
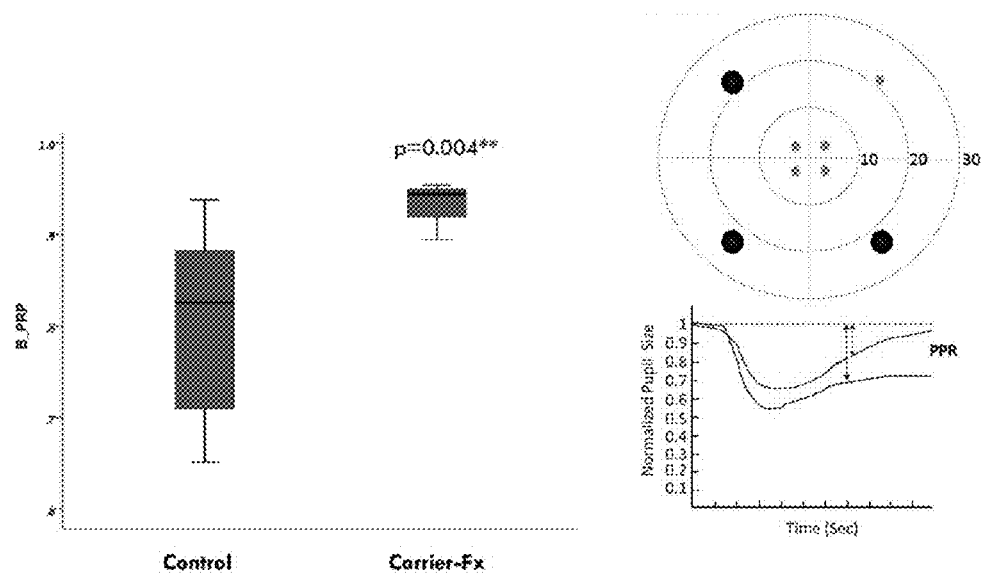
Figure 33B:
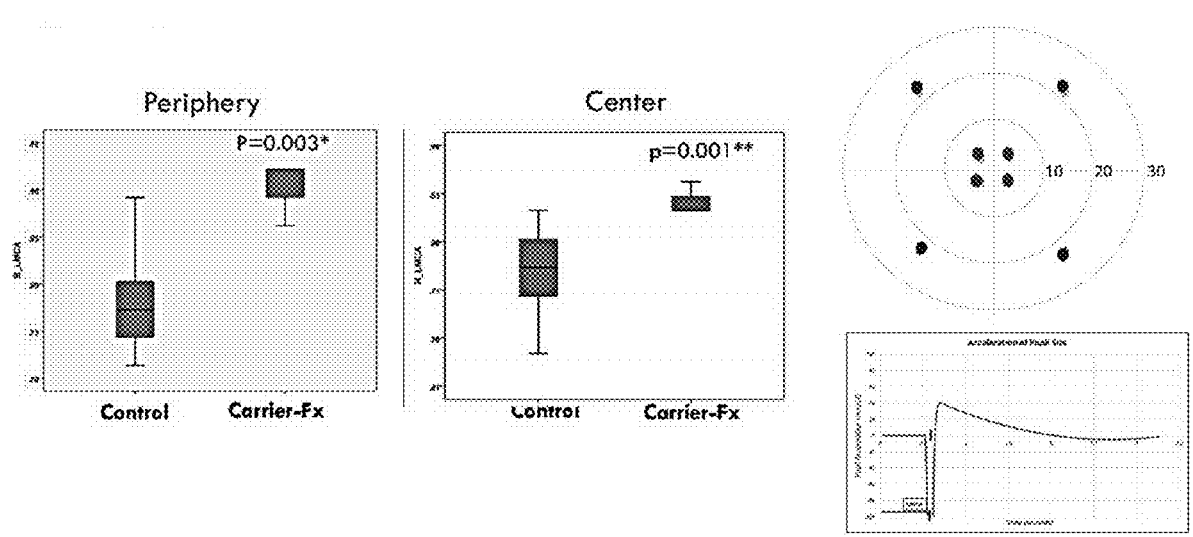
Figure 34:
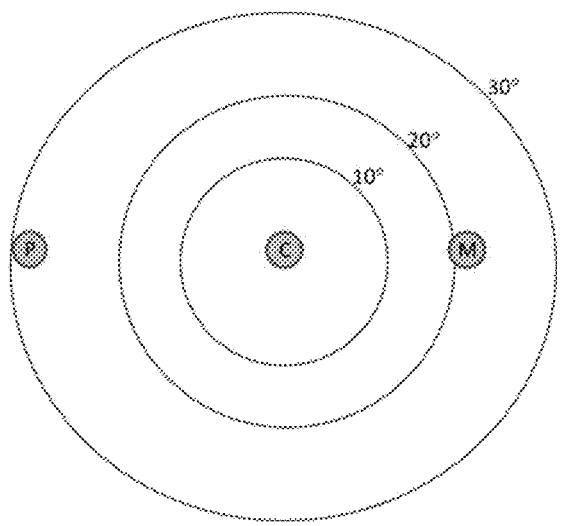
Figure 35:
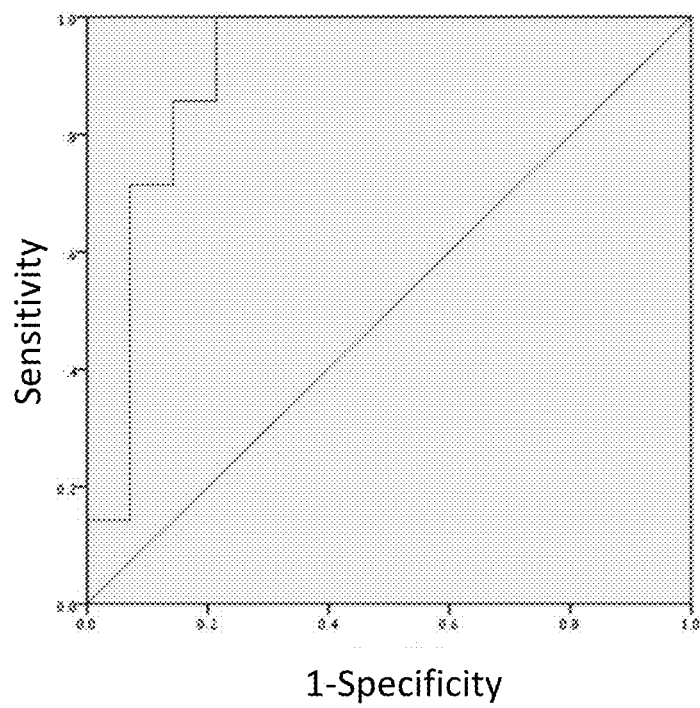
Figure 36:
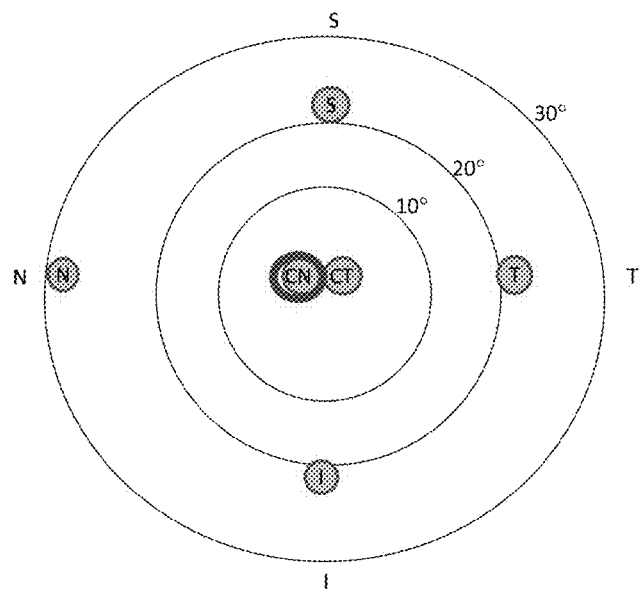
Figure 37:
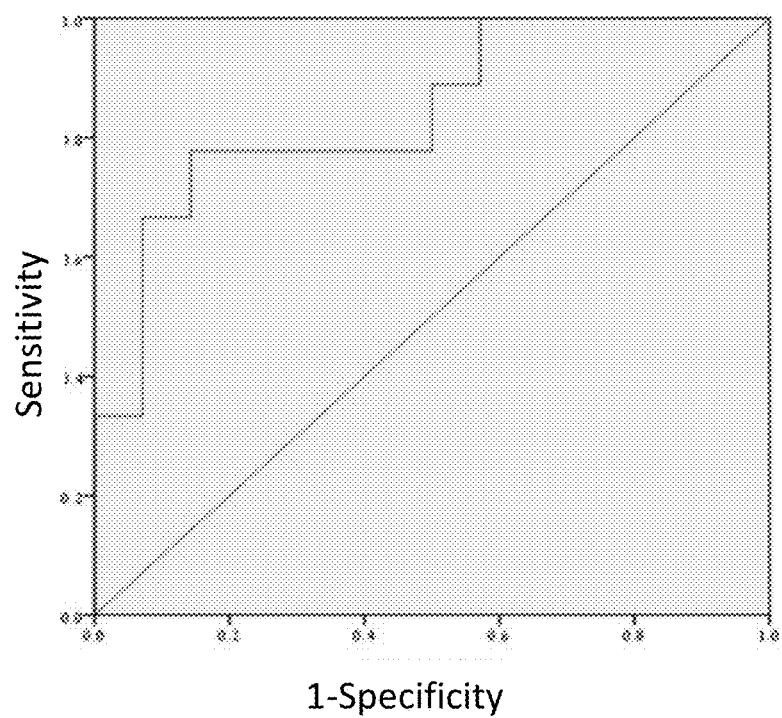
Figure 38:
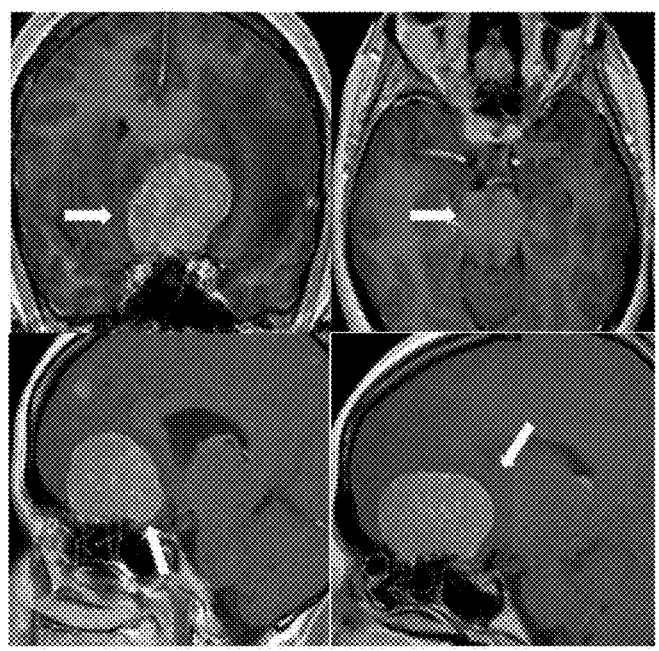
Figure 39:
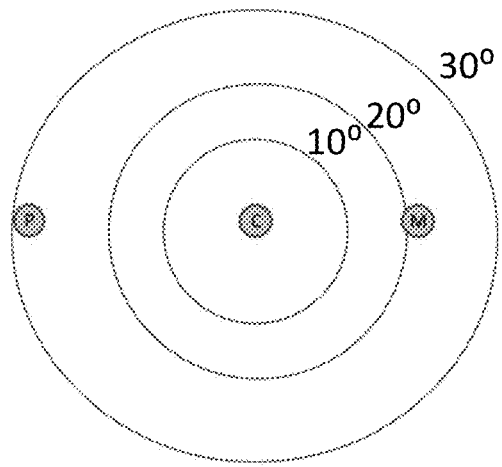
Figure 40:
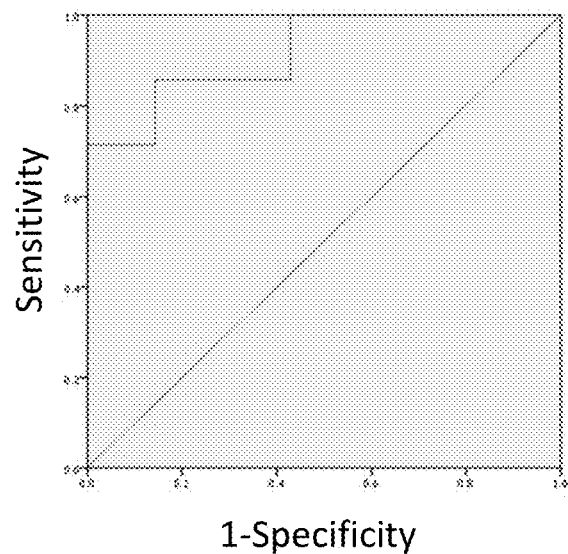
Figure 41:
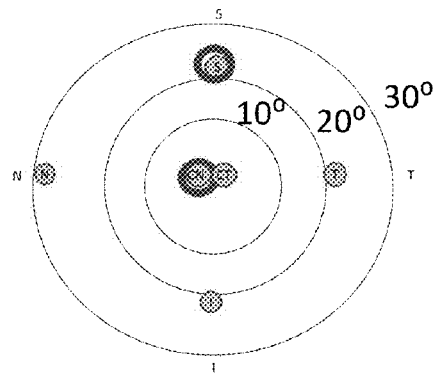
Figure 42:
Figure 43:
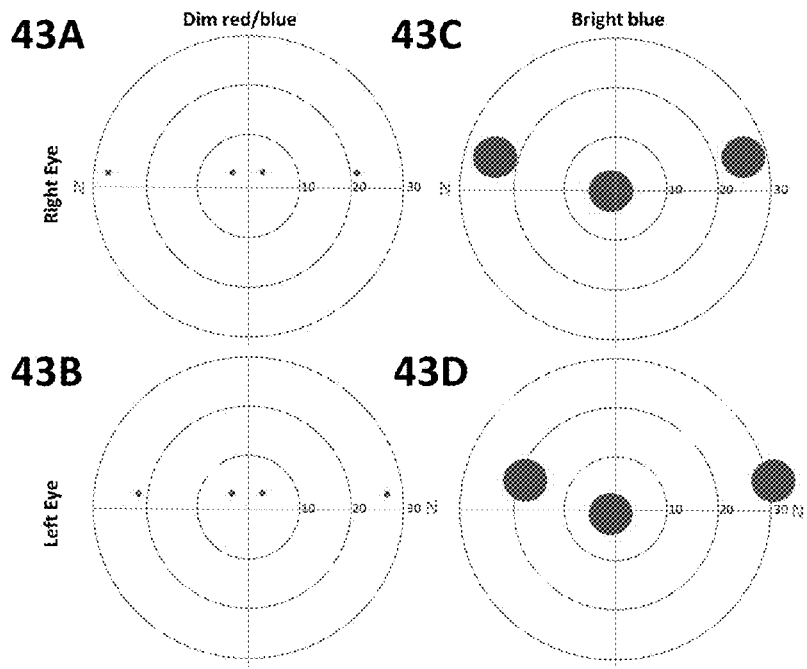

FIGS. 31A-31F show an assessment of changes in focal PPC at various retinal locations during ON and following treatment. This representative 18 year-old male was tested during an acute ON episode (FIG. 31A, FIG. 31C, FIG. 31E) and following 5 days of SOLU-MEDROL treatment (FIG. 31B, FIG. 31D, FIG. 31F). The patients had visual acuity of 0.3 during the ON episode which improved following treatment to 0.18 (logMAR ETDRS). Diminished PPC for blue light throughout the VF (31C) correlated with Humphrey perimetry during the ON (31A) improved following treatment (31D). PPC for red light was less affected (31E) and did not substantially change following treatment (31F);

FIG. 32 shows chromatic pupilloperimetry measures correlated with severity of VF loss during ON attack; Four subjects (2 males, M and 2 females, F) at indicated ages (years old, YO) were tested; Top row-chromatic pupilloperimetry maps for the PPC parameter; Bottom row-Humphrey perimetry results;

FIGS. 33A-33B show the PLR results for assessing brain pathology in fragile-X carriers, exemplified in Example 5, FIG. 33A shows the PPR parameter and FIG. 33B shows the LMCA parameter;

FIG. 34 shows the test point locations that were used for PPR for high intensity blue light. Test point locations are highlighted in yellow: Central (C); Mid-peripheral (M); Peripheral (P);

FIG. 35 shows the ROC Curve for PPR in the central retina target (see FIG. 34) in the right eye of patients with tumors with no contact with optic apparatus before surgery;

FIG. 36 shows the VF test points used for assessment of the transient PLR in patients with tumors without contact with the optic apparatus and controls. The CN test target is highlighted in red; Temporal (T); Central-nasal (CN); Central-temporal (CT); Nasal (N), Superior(S); Inferior (I);

FIG. 37 shows a ROC curve for maximal contraction velocity (MCV) measured following red light stimulus presented at VF target CN in the right eye of patients with brain tumors with no contact with optic apparatus before surgery and controls;

FIG. 38 shows an MRI scan of a patient (#1) demonstrating an olfactory groove meningioma before surgery, the red arrow points to the optic nerve and chiasm, and the white arrow points to the tumor mass;

FIG. 39 shows the VF test points used for assessment of the sustained PLR in patients with tumors that came into contact with the optic apparatus; test point locations of the chromatic pupilloperimeter; the test points are highlighted in yellow: Central (C); Mid-peripheral (M); Peripheral (P);

FIG. 40 shows a ROC Curve for PPR for high intensity blue light in the peripheral visual field target (see FIG. 39) in the right eye of patients with tumors that came into contact with the optic apparatus and controls;

FIG. 41 shows the VF test points used for assessment of the transient PLR testing in patients with tumors that came into contact with the optic apparatus and controls. The central and superior test targets are highlighted in red; Temporal (T); Central-nasal-(CN); Central-temporal-(CT); Nasal (N), Superior(S); Inferior (I);

FIG. 42 shows a MRI scan of a patient (p #7) suffering from recurrent temporal glioblastoma that came into contact with the right eye, before surgery. The red arrow points to the optic nerve and chiasm, the white arrow points to the tumor mass;

FIG. 43 shows light stimuli presentations in nasal and temporal locations. Light stimulus presentation. In each eye, the subjects were first tested for red light stimuli followed by dim blue light stimuli that were sequentially presented at the following order for OD: CN-N-T-CT, and for OS: CT-T-N-CN (FIG. 43A, FIG. 43B). Stimulus duration was 1 second and the inter-stimulus interval was 3 seconds. Then, and the PLR was recorded for three sequential bright blue light stimuli presented for 8 seconds each with an inter-stimulus of 8 seconds, using the sequence N-C-T for OD, and T-C-N for OS (FIG. 43C, FIG. 43D). After completion of all testing of one eye (red light stimuli, dim and bright blue light stimuli), the 2nd eye was tested. C—central, N—Nasal, T—Temporal, CN—Central Nasal, CT—Central-Temporal;

FIGS. 44A-44L shows a patient (#4, group I) diagnosed with a supratentorial right temporal brain metastasis of lung carcinoma. FIGS. 44A-44B: T2 MRI scan (FIG. 44A) and T1 with gadolinium (FIG. 44B) show a brain edema (blue arrow) in right temporal lobe with direct pressure on right optic nerve (black arrow) and right optic tract. FIGS. 44C-44D: Four months postoperative (post OP) T2 MRI scan (FIG. 44C) show significant improvement of brain edema and mass effect on right optic nerve (black arrow). T1 MRI with gadolinium revealed recurrent tumor in right frontal lobe with direct pressure on right optic nerve (Black arrow, FIG. 44D). FIG. 44E: Fundus Imaging pre-OP. FIG. 44F: SD-OCT peripapillary RNFL thickness pre-OP. Humphrey visual field testing before surgery (FIG. 44G) and four months post OP (FIG. 44H). Maximal percentage of pupil contraction (PPC, in %) was recorded in response to dim blue light before (FIG. 44I), and 4 months (FIG. 44K) post OP. Red denotes PPC values that are lower than 2 standard errors (SEs) from the mean of controls. Green denotes PPC values that are within 2 SEs of the mean of controls; FIG. 44J, FIG. 44L-Percentage of pupil recovery (PPR, in %) recorded before (FIG. 44J), and 4 months (FIG. 44L) post OP. Red denotes PPR values that are higher (faster pupil recovery) than 2SEs from mean of controls. Green denotes PPR values that are within 2 SEs of the mean of controls;

FIGS. 45A-45Q show a patient (#10, group II) patient diagnosed with right temporal glioblastoma. Functional MRI T1 +GAD scans show brain edema (red arrows) around the right temporal enhanced lesion involving right optic radiation (bright white color, FIGS. 45A-45C). MRI scans post OP (FIG. 45D) and 3 months after surgery (FIG. 45E-FIG. 45F). FIG. 45G-Fundus Imaging pre OP. FIG. 45H-Pre OP SD-OCT peripapillary RNFL thickness. Humphrey SITA Standard visual field testing was done pre OP (FIG. 45I), 4 days post OP (FIG. 45J) and 3 months post OP (FIG. 45K). Maximal percentage of pupil contraction (PPC, in %), recorded in response to dim blue light pre OP (FIG. 45L), 4 days (FIG. 45N) and 3 months (FIG. 45P) post OP.

Figure 47:
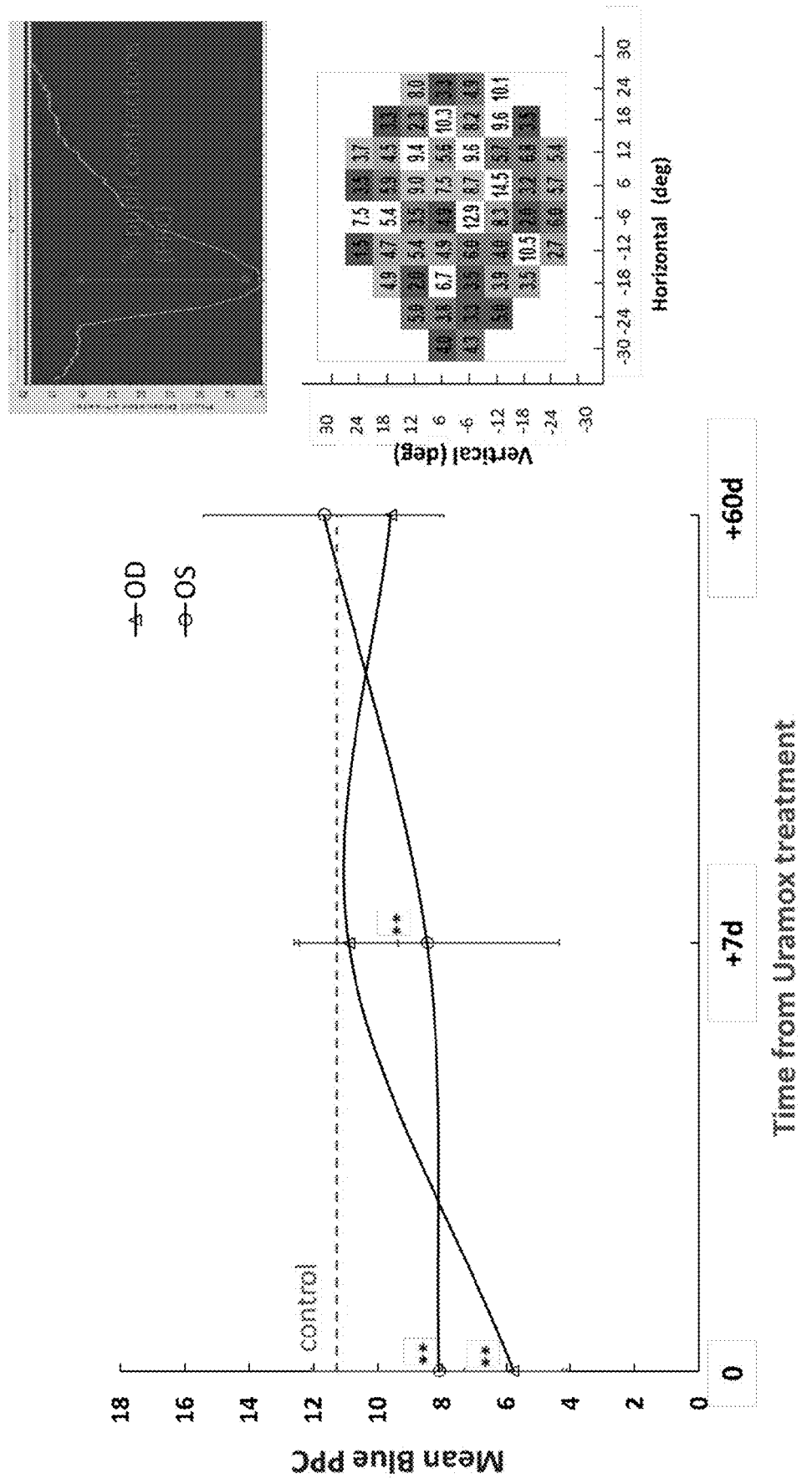
Figure 48:
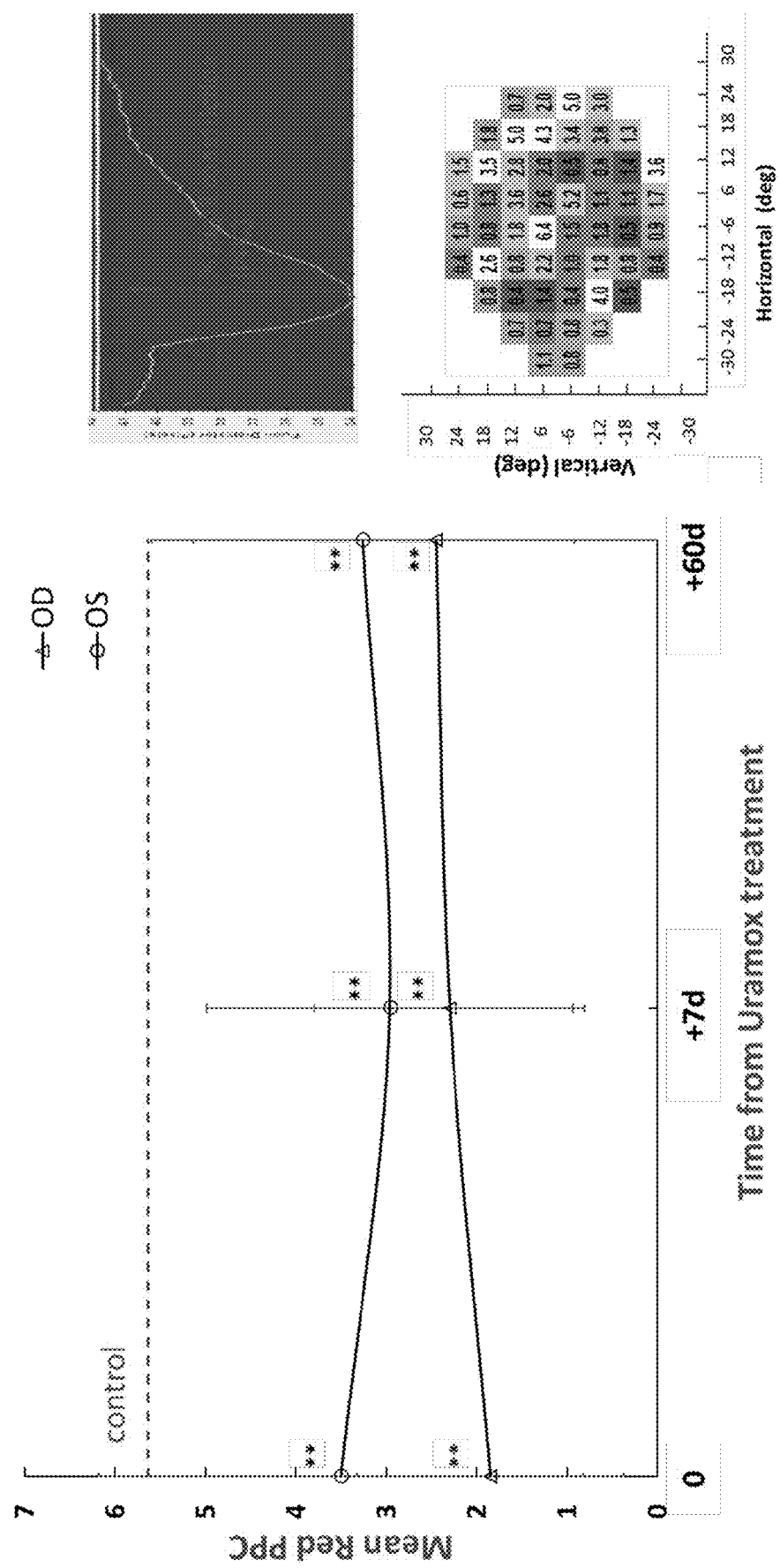

Red denote values lower than 2 standard errors (SEs) from mean of controls, green denote values within 2 SEs of the mean of controls; Percentage of pupil recovery (PPR, in %) recorded pre OP (FIG. 45M), 4 days (FIG. 45O) and 3 months (FIG. 45Q) post OP. Red denote values higher (faster recovery) than 2 standard errors (SEs) from mean of controls, green denote values within 2 SEs of the mean of controls;

FIGS. 46A-46L show a patient (#18, group III) diagnosed with convexity meningioma on the frontal right side. Functional MRI T1 +GAD scans showed revealed a large right frontal convexity meningioma (red arrows in FIG. 46A and FIG. 46B) and brain edema in frontal and right temporal lobes. MRI scans 4 weeks following surgery demonstrated improvement of brain edema and mass effect (FIG. 46C, FIG. 46D). FIG. 46E-Fundus Imaging pre OP. FIG. 46F-Pre OP SD-OCT peripapillary RNFL thickness. Humphrey SITA Standard visual field testing was done pre OP (FIG. 46G) and 7 days post OP (FIG. 46H). Maximal percentage of pupil contraction (PPC, in %), recorded in response to dim blue light pre OP (FIG. 46I) and 7 days post OP (FIG. 46K). Red denotes values lower than 2 standard errors (SEs) from mean of controls, green denotes values within 2 SEs of the mean of controls; Percentage of pupil recovery (PPR, in %) recorded pre OP (FIG. 46J) and 7 days post OP (FIG. 46L). Red denotes values higher (faster recovery) than 2 standard errors (SEs) from mean of controls, green denotes values within 2 SEs of the mean of controls;

FIG. 47 shows rod-mediated PPC results (response to blue light stimulation) in a representative Pseudotumor cerebri (PTC) patient #1; and FIG. 48 shows cone-mediated PPC results in PTC patient #1, in response to red light stimulation.

DETAILED DESCRIPTION

The principles, uses and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the following description, various aspects of the invention will be described. For the purpose of explanation, specific details are set forth in order to provide a thorough understanding of the invention. However, it will also be apparent to one skilled in the art that the invention may be practiced without specific details being presented herein. Furthermore, well-known features may be omitted or simplified in order not to obscure the invention.

As used herein, the terms "brain related condition" and "CNS related condition" may interchangeably be used. The terms are directed to a condition affecting the function and/or structure of the brain and/or related tissues. According to some embodiments, a brain related condition may affect various neurological functions, such as, cognitive, functional or behavioral functions. In some embodiments, the brain related condition may an acute condition or a chronic condition. In some embodiments, the brain related condition is a neurodegenerative condition. In some embodiments, a neurodegenerative condition may be selected from, but not limited to: Alzheimer's disease (AD), Parkinson's disease (PD), Multiple sclerosis (MS), cognition impairment in fragile X carriers, and the like. In some embodiments, the brain related condition is a nerve related condition, such as, optical nerve related condition, including, for example, optical neuritis (ON). In some embodiments the condition may be a tumor in various regions of the brain. In some embodiments, the tumor does not affect the visual system. In some embodiments, the tumor may affect the visual system. In some embodiments, the brain related condition is intracranial pressure (ICP), that may result of various conditions (such as, for example, brain tumor, edema, contusions, hematoma, abscesses, and the like). In some embodiments, the brain related condition is an ischemic condition. In some embodiments, the brain related condition is a traumatic brain injury (TBI). In some embodiments, the brain related condition may be selected from a tumor, a lesion, ICP, a neurodegenerative condition, an injury, ischemic condition, nerve related condition, optic neuritis, inflammations, infections, and the like, or any combination thereof.

As used herein, the term "subject" is interchangeable with the term "patient" or "individual". According to some embodiments, a subject in need thereof is a subject having or suspected of having (afflicted with/suffering from) a brain and central nerve system (CNS) related condition. According to some embodiments, the subject is symptomatic. According to some embodiments, the subject is asymptomatic. In some embodiments, a "control" subject is a subject not afflicted or not diagnosed with a respective condition.

As used herein the term "determining a brain related condition" refers to identifying/detecting/diagnosing the subject as having a brain related condition, and/or the type of the brain related condition. In some embodiments, determining a brain related condition further encompass determining the probability/possibility/risk of the subject to develop a brain related condition.

As used herein, the term "assessing brain related condition" is directed to the evaluating or classifying the brain related condition in a subject. As used herein, the terms "monitoring brain related condition" and "monitoring progression of a brain related condition" may interchangeably be used. The terms are directed to the grading or comparing the severity (progression) of the brain related condition in a subject, for example, over a period of time, or between at least two time points. In some embodiments, the terms are directed to evaluating, grading or comparing the severity of the brain related condition in response to a treatment or treatment regime. In some embodiments, the terms are further directed to determine treatment efficacy of a selected treatment on the state or severity of the brain related condition. In some embodiments, the severity may diminish over time (i.e., improvement in the brain related condition or outcomes thereof). In some embodiments, the severity may increase over time (i.e., deterioration in the brain related condition or outcomes thereof).

As used herein, the term "treating" includes, but is not limited to, any one or more of the following: abrogating, ameliorating, inhibiting, attenuating, blocking, suppressing, reducing, delaying, halting, alleviating or preventing the brain related condition, and/or symptoms associated therewith. Each possibility is a separate embodiment.

As used herein, the term "PLR" is directed to "Pupil light response" or "pupil light reflex" of a subject. The terms are directed to changes in various parameters related to the response of the pupil when being stimulated (irradiated) with light. In some embodiments, the light is chromatic light. In some embodiments, a stimulation may include various variables, including, for example, but not limited to: different wavelengths (for example, red, blue), different beam size, different intensities, different duration of irradiation, different time period between irradiations, regions (areas or points) of the visual field that are stimulated, and the like, or any combination thereof. In some embodiments, the parameters may be directly or indirectly measured, detected, calculated and/or determined. In some embodiments, changes in parameters values may be detected, measured, calculated and/or determined. In some embodiments, the changes in the pupil response are compared to a baseline response of the subject under similar or different conditions. In some embodiments, changes in the pupil response parameters (or values thereof) may be compared between different stimulations, and/or compared to a baseline response. In some embodiments, changes in the pupil response parameters (or values thereof), may be compared to a corresponding response of a control subject under similar conditions.

As referred to herein different intensities of blue light may be used for stimulation, high intensity blue light, which is also referred to as strong or bright blue; and low intensity blue light, which is also referred to as dim blue.

Reference is made to FIG. 1A which shows a schematic illustration of a system for monitoring the progression of, determining and/or assessing a brain related condition of a subject, in accordance with some embodiments of the present invention. According to some embodiments, the system may include a pupillometer device 100 used for monitoring the progression of, determining and/or assessing a brain related condition of a subject. According to some embodiments, the pupillometer device 100 may include plurality of chromatic beam emitters 106 configured to generate red and/or blue light stimuli at predetermined locations of the visual field of the subject. According to some embodiments, the system and/or the pupillometer device 100 may include at least one camera 108 configured to detect pupil response. According to some embodiments, the system may include a at least one hardware processor 110. According to some embodiments, the at least one hardware processor 110 may be in communication with the at least one camera 108 and/or the chromatic beam emitters 106. According to some embodiments, the system may include a non-transitory computer-readable storage medium having stored thereon program code in communication with the processor 110. According to some embodiments, the program code may be configured to be executable by the at least one hardware processor 110.

According to some embodiments, the pupillometer device 100 may include a testing compartment 102 configured to support the head of the subject during testing and provide light stimulation in the visual field of the subject. According to some embodiments, the testing compartment 102 may include a Ganzfeld dome apparatus. According to some embodiments, testing compartment 102 may be portable. According to some embodiments, the pupillometer device 100 may be multifocal. According to some embodiments, the testing compartment 102 may include an ocular fixture 104 configured to support a head of the subject. According to some embodiments, the testing compartment 102 and/or the ocular fixture 104 may include a chin rest. According to some embodiments, the ocular fixture 104 of the testing compartment 102 may aid in positioning of the eye toward the chromatic beam emitters 106. In some embodiments, the ocular fixture 104 may comprise additional or fewer components for positioning the subject eye. According to some embodiments, the ocular fixture 104 may be configured such that the non-tested eye of the subject is occluded. According to some embodiments, the testing compartment 102 and/or the pupillometer device 100 may include a frame including a wall 112. According to some embodiments, the wall 112 may be positioned across the ocular fixture 104. According to some embodiments, the wall 112 may be positioned about 330 mm from the ocular fixture 104. According to some embodiments, the plurality of chromatic beam emitters 106 may be arranged about the inner surface of the wall 112. According to some embodiments, the distance between the plurality of chromatic beam emitters 106 and the ocular fixture 104 may be about 330 mm from.

Reference is made to FIG. 1B which shows a front view of a pupilometer device, in accordance with some embodiments of the present invention. According to some embodiments, the plurality of chromatic beam emitters 106 may be positioned in a grid pattern at a plurality of locations arranged about the inner surface of the wall 112 and/or of the testing compartment 102. According to some embodiments, the chromatic beam emitters 106 may be positioned and driven to generate light stimuli throughout a substantial entirety of the visual field of the eye of the subject positioned at the ocular fixture 104. According to some embodiments, the chromatic beam emitters 106 may include between about 1 and about 1000 chromatic beam emitters. According to some embodiments, the chromatic beam emitters 106 may include between about 7 and about 76 chromatic beam emitters. According to some embodiments, and as described in greater detail elsewhere herein, the chromatic beam emitters 106 may be in communication with the processor 110.

Reference is made to FIG. 1C, which shows a graph of an exemplary distribution of positions of light stimuli of a pupilometer device, in accordance with some embodiments of the present invention. According to some embodiments, the chromatic beam emitters 106 may be positioned in a grid pattern such as depicted in FIG. 1C. According to some embodiments, each of the chromatic beam emitters 106 may be positioned at a test point location (such as test point locations 1 to 76, as depicted in FIG. 1C). According to some embodiments, each of the chromatic beam emitters 106 may be positioned at a test point location of the visual field of the eye of the subject. According to some embodiments, the chromatic beam emitters 106 may be positioned in relation to the ocular fixture 104 such that the light emitted by the chromatic beam emitters 106 is emitted at one or more regions of the visual field of the subject. According to some embodiments, the regions of the visual field may include a central visual field ranging between 0-10 degrees. According to some embodiments, the regions of the visual field may include a peripheral visual field ranging between 11-160 degrees.

According to some embodiments, the chromatic beam emitters 106 may include one or more LED lights 116. According to some embodiments, each of the chromatic beam emitters 106 may be configured to emit blue and/or red light. According to some embodiments, the red chromatic stimuli emission wavelength may range between 550 nm to about 700 nm or, for example, from about 620 nm to about 630 nm. According to some embodiments, the red chromatic stimuli emission wavelength may be about 624 nm.

According to some embodiments, the blue chromatic stimuli emission wavelength may range between about 410 nm to about 520 nm or from about 480 nm to about 490 nm. According to some embodiments, the blue chromatic stimuli emission wavelength may be about 485 nm. According to some embodiments, the chromatic beam emitters 106 may include ultraviolet light LED lights. According to some embodiments, the chromatic beam emitters 106 may include infra-red light LED lights. According to some embodiments, the processor 110 may control the wavelength of the light emitted by one or more of the plurality of chromatic beam emitters 106. According to some embodiments, the processor 110 may control the wavelength of the light emitted by each of the plurality of chromatic beam emitters 106.

According to some embodiments, the processor 110 may control individual chromatic beam emitters 106. According to some embodiments, and as described in greater detail elsewhere herein, the processor 110 may be configured to power a selected subset of chromatic beam emitters 106. According to some embodiments, the subset of chromatic beam emitters 106 may include between 1 and 76 chromatic beam emitters 106. According to some embodiments, the processor 110 may be configured to control the wavelength, duration of time of the emitted light, and/or the intensity of the emitted light of each individual chromatic beam emitter 106.

According to some embodiments, the processor 110 may control the intensity of the light emitted by one or more of the plurality of chromatic beam emitters 106. According to some embodiments, the processor 110 may control the intensity of the light emitted by each of the plurality of chromatic beam emitters 106. According to some embodiments, the intensity of the light emitted by the chromatic beam emitters 106 may range between 50 and 7000 $cd/m^2$. According to some embodiments, the chromatic stimuli may include a high intensity and/or low intensity light. According to some embodiments, the high intensity may range between 5500 to 6500 $cd/m^2$. According to some embodiments, the low intensity may range between 100 and 200 $cd/m^2$. According to some embodiments, the red chromatic stimuli may include a high intensity and/or low intensity red light. According to some embodiments, the red chromatic stimuli may range between a high intensity and/or low intensity red light. According to some embodiments, the blue chromatic stimuli may include a high intensity and/or low intensity blue light. According to some embodiments, the blue chromatic stimuli may range between a high intensity and/or low intensity red light.

According to some embodiments, the processor 110 may control the duration of the light emitted by one or more of the plurality of chromatic beam emitters 106. According to some embodiments, the processor 110 may control the duration of the light emitted by each of the plurality of chromatic beam emitters 106. According to some embodiments, the plurality of chromatic beam emitters 106, an individual chromatic beam emitter 106, and/or a subset of the plurality of chromatic beam emitters 106 may be illuminated for a duration ranging between 0.1 and 120 seconds. According to some embodiments, the plurality of chromatic beam emitters 106, an individual chromatic beam emitter 106, and/or a subset of the plurality of chromatic beam emitters 106 may be illuminated for a duration ranging between 1 and 8 seconds. According to some embodiments, the plurality of chromatic beam emitters 106, an individual chromatic beam emitter 106, and/or a subset of the plurality of chromatic beam emitters 106 may be illuminated for a duration ranging between 0.5 and 3 seconds.

According to some embodiments, the pupilometer device may include a background light in communication with the processor 110. According to some embodiments, the processor 110 may control the powering of the background light. According to some embodiments, the processor 110 may control the duration of time in which the background light is light. According to some embodiments, the processor 110 may control the wavelength of the background light. According to some embodiments, the wavelength of the background light may range between about 410 nm to about 520 nm or from about 480 nm to about 490 nm. According to some embodiments, the processor 110 may control the intensity of the background light. According to some embodiments, the intensity of the background light may range between 0 and 5 $cd/m^2$. According to some embodiments, the intensity of the background light may range between 0 and 0.5 $cd/m^2$. According to some embodiments, the intensity of the background light may be about 0.4 $cd/m^2$.

According to some embodiments, the pupilometer device may include a fixation light 114 configured to maintain a gaze of the subject during administration of the chromatic stimuli. According to some embodiments, the fixation light 114 may be configured to facilitate exposure of light sensitive ocular structures of an eye to the chromatic stimuli of the chromatic beam emitters 106. According to some embodiments, the fixation light 114 may include a light such as a LED light. According to some embodiments, the fixation light may include white light. According to some embodiments, the fixation light 114 may include a mark, such as a spot or object configured to contrast with the inner wall 112 of the testing compartment 102. According to some embodiments, the fixation light 114 may be positioned at the center of the field defined by the plurality of chromatic beam emitters 106. According to some embodiments, the fixation light 114 may be positioned across from the ocular fixture 104. According to some embodiments, the fixation light 114 may be positioned near the camera 108. According to some embodiments, the fixation light 114 may be positioned near the camera 108 such that a pupil of a subject gazing towards the fixation light 114 may appear to fixate on the camera 108. According to some embodiments, the camera 108 is positioned below the fixation light 114.

According to some embodiments, the camera 108 may be configured to record one or more images and/or a video of the pupil of the subject. According to some embodiments, the camera 108 may include a video camera. According to some embodiments, the camera 108 may include a high-resolution video camera. According to some embodiments, the camera 108 may include a high-resolution infrared video camera. According to some embodiments, the camera 108 may include a plurality of cameras and/or recording devices and/or sensing devices. According to some embodiments, the camera 108 may be any device having an array of sensing devices (e.g., pixels) capable of detecting radiation in an ultraviolet wavelength band, a visible light wavelength band, or an infrared wavelength band. According to some embodiments, the camera 108 may be an infrared camera. According to some embodiments, the camera 108 may have any resolution. According to some embodiments, the camera 108 may be an omni-directional camera, or a panoramic camera. According to some embodiments, the camera 108 may include one or more optical components, such as a mirror, fish-eye lens, or any other type of lens. According to some embodiments, the processor 110 may be configured to control and/or operate the camera 108.

According to some embodiments, the processor 110 may be configured to execute instructions associated with a method for monitoring the progression of, determining and/or assessing a brain related condition of a subject based on pupil light response (PLR) to chromatic light stimuli, such as the chromatic light stimuli of the chromatic beam emitters 106.

Reference is made to FIG. 2, which shows a flow charts of functional steps in a non-invasive method for monitoring the progression of, determining and/or assessing a brain related condition of a subject, in accordance with some embodiments of the present invention. According to some embodiments, the method 200 may be based on pupil light response (PLR) to chromatic light stimuli. According to some embodiments, at step 202, the method 200 may include determining a baseline pupil size of an eye of the subject. According to some embodiments, at step 204, the method 200 may include applying blue and/or red light stimuli to one or more regions of visual field of the eye, the light stimuli configured to induce a response in the pupil. According to some embodiments, at step 206, the method 200 may include determining a value for one or more parameters related to induced changes in the pupil size in response to the light stimuli. According to some embodiments, at step 208, the method 200 may include classifying the PLR based on the one or more parameter values, wherein the classifying may include monitoring the progression of, determining and/or assessing the brain related condition.

According to some embodiments, the brain related condition is selected from: brain tumor, optic neuritis, neurodegenerative conditions, traumatic brain injury, stroke, intracranial lesions, intracranial pressure, pseudotumor cerebri. According to some embodiments, the brain related condition may include an existing brain condition and/or a level of risk for a brain condition. According to some embodiments, the level of risk for a brain condition may be genetic. According to some embodiments, the neurodegenerative conditions are selected from: Alzheimer's disease (AD), Multiple Sclerosis (MS), Parkinson disease (PD), fragile-X related cognitive decline in fragile X carriers, and the like, or combinations thereof.

According to some embodiments, the method 200 may include positioning a subject and/or fixing a position of the subject in relation to the pupilometer device, such as presented in FIG. 1A. According to some embodiments, the method 200 may include positioning a subject using the ocular fixture 104. According to some embodiments, the method 200 may include positioning a subject eye at the ocular fixture 104 such that the non-tested eye of the subject is occluded. According to some embodiments, the method may include occluding the non-tested eye of the subject, for example, by using an eye patch. According to some embodiments, the method may include powering on the background light of the pupilometer device. According to some embodiments, the method may include controlling the wavelength and/or intensity of the background light of the pupilometer device. According to some embodiments, the method may include powering on the fixation light 114 of the pupilometer device. According to some embodiments, the method may include controlling the wavelength and/or intensity of the fixation light 114 of the pupilometer device.

According to some embodiments, the method 200 includes operating the camera 108. According to some embodiments, the method 200 includes recording the pupil of the subject. According to some embodiments, the method 200 includes recording the pupil of the subject for a time ranging between 1 and 30 seconds. According to some embodiments, the method 200 includes recording the pupil of the subject for a time ranging between 1 and 20 seconds. According to some embodiments, the method includes storing data, such as one or more images and/or one or more videos, recorded using the camera 108. According to some embodiments, and as described in greater detail elsewhere herein, the method may include extracting one or more parameters from the data received from the camera 108.

According to some embodiments, at step 202, the method 200 may include determining a baseline pupil size of an eye of the subject. According to some embodiments, the baseline pupil size of an eye of the subject is determined based, at least in part, on the data received from the camera 108. According to some embodiments, the baseline pupil size of an eye of the subject is determined based, at least in part, on the recorded size of the pupil of the subject prior to responding to light stimulation generated by the chromatic beam emitters 106. According to some embodiments, the baseline pupil size of an eye of the subject may be determined using data which may be recorded after the blue and/or red light stimuli are applied (and/or powered on) and before the pupil of the subject began responding to the light stimuli. According to some embodiments, the method may include determining a baseline pupil size of an eye of the subject for each light stimulation generated by the chromatic beam emitters 106. For example, for a series of two or more light stimulations separated by a break, a first baseline pupil size may be associated with a first stimulation generated by the chromatic beam emitters and a second baseline pupil size may be associated with a second stimulation generated by the chromatic beam emitters.

According to some embodiments, at step 204, the method 200 may include applying blue and/or red light stimuli to one or more regions of visual field of the eye, the light stimuli configured to induce a response in the pupil. According to some embodiments, the method 200 may include starting the recording and/or operating of the camera 108 once the blue and/or red light stimuli are applied, thereby utilizing the time until the pupil of the subject begins responding to the light stimulation to determine the baseline of the size of the pupil. According to some embodiments, applying the blue and/or red stimuli may range between having high intensity and having a low intensity. According to some embodiments, the method may include applying blue light stimuli configured to stimulate the rods of the eye of the subject and/or the ipRGCs of the eye of the subject. According to some embodiments, the method may include applying blue light stimuli at a high intensity, thereby stimulating the ipRGCs of the eye of the subject. According to some embodiments, the method may include applying blue light stimuli at a low intensity, thereby stimulating the rods of the eye of the subject. According to some embodiments, the method may include applying red light stimuli configured to stimulate the cones of the eye of the subject.

According to some embodiments, applying blue and/or red light stimuli may include illuminating a subset of the chromatic beam emitters. According to some embodiments, multiple chromatic light stimulation may be applied. According to some embodiments, the subset of the chromatic beam emitters may include between 4 and 76 chromatic light stimuli. According to some embodiments, the subset of the chromatic beam emitters may include between 1 and 228 individual small/focal (for example, in the range of about 0.1-16 degrees) light stimuli at different locations of the visual field. According to some embodiments, the subset of chromatic beam emitters may include specified portions of the chromatic beam emitters associated with specific brain conditions.

According to some embodiments, the subset of chromatic beam emitters may include specified portions of the chromatic beam emitters associated with specific brain conditions, wherein different subsets of chromatic beam emitters may be positioned at different locations in the visual field of the subject. According to some embodiments, the number of chromatic beam emitters of the subset may vary in accordance with the specific brain condition being tested. According to some embodiments, the location of one or more of the chromatic beam emitters (in the visual field of the subject) of the subset may vary in accordance with the specific brain condition being tested. According to some embodiments, the wavelengths of one or more of the chromatic beam emitters of the subset may vary in accordance with the specific brain condition being tested. According to some embodiments, the duration of the applied chromatic beam emitters of the subset may vary in accordance with the specific brain condition being tested. According to some embodiments, the intensity of the applied chromatic beam emitters of the subset may vary in accordance with the specific brain condition being tested. According to some embodiments, the ratio between different wavelengths, such as the ratio between red light stimuli and blue light stimuli, of the chromatic beam emitters in the subset may vary in accordance with the specific brain condition being tested.

According to some embodiments, the method 200 may include controlling the emission wavelength, intensity, and duration of individual light stimuli or subsets of the light stimuli. According to some embodiments, applying blue and/or red light stimuli to one or more regions of visual field of the eye comprises selecting a subset of light stimuli based on at least one of a location of the light stimuli in relation to the visual field and optionally, type of brain related condition. According to some embodiments, the blue and/or red light stimuli may be applied such that prior to testing, there is no prior knowledge regarding a brain related condition of the subject (i.e., the subject is not suspected of having a brain related condition). In some embodiments, the blue and/or red light stimuli may be applied such that prior to testing, there is prior knowledge or at least a suspicion regarding a brain related condition of the subject. According to some embodiments, applying blue and/or red light stimuli to one or more regions of visual field of the eye comprises one or more of: selecting the wavelength of each individual light of the light stimuli, selecting the intensity of each individual light of the light stimuli, selecting the ratio of blue to red light stimuli, selecting the duration of illumination of each individual light of the light stimuli, or any combinations thereof.

According to some embodiments, the duration of illumination of each individual light of the light stimuli (or in other words, each individual chromatic beam emitter) and/or a subset of the chromatic beam emitters may range between 0.1 and 10 seconds. According to some embodiments, the duration of illumination may range between 1 and 8 seconds. According to some embodiments, individual chromatic beam emitters of a subset may have different durations of illumination. According to some embodiments, individual chromatic beam emitters of a subset may have the same durations of illumination.

According to some embodiments, the method may include applying blue and/or red light stimuli at a ratio of between 1:1 to 1:10000 red to blue chromatic stimuli. According to some embodiments, the ratio of red to blue chromatic stimuli may be 1:1, 2:5, 1:6, 1:50, 1:60, 1:70, 1:80, 1:100, 1:250, or 1:300. According to some embodiments, the method may include applying blue and/or red light stimuli at a ratio of between 1:1 to 1:10000 blue to red chromatic stimuli. According to some embodiments, the ratio of blue to red chromatic stimuli may be 1:1, 2:5, 1:6, 1:50, 1:60, 1:70, 1:80, 1:100, 1:250, or 1:300.

According to some embodiments, the method may include applying blue and/or red light stimuli at a central visual field and/or a peripheral visual field. According to some embodiments, the central visual field may range between 0 to 10 degrees. According to some embodiments, the central visual field may range between 0 to 15 degrees. According to some embodiments, the peripheral visual field may be greater than 10 degrees. According to some embodiments, the peripheral visual field may be greater than 15 degrees. According to some embodiments, the peripheral visual field may range between 10 to 60 degrees. According to some embodiments, the method may include applying blue and/or red light stimuli at a central visual field and/or a peripheral visual field, wherein the location of the light stimuli in relation to the visual field may be based, at least in part, on the type of brain condition.

According to some embodiments, the method may include applying blue and/or red light stimuli to one or more regions of visual field of the eye in a series of two or more intervals. According to some embodiments, applying blue and/or red light stimuli to one or more regions of visual field of the eye comprises applying blue and/or red light stimuli at two or more intervals. According to some embodiments, each interval of application of blue and/or red light stimuli may include a same, a different, and/or a similar subset of chromatic light stimulation. According to some embodiments, each interval of application of blue and/or red light stimuli may include a same and/or different duration of simulation, ratio between different wavelengths, wavelengths of light stimuli, intensity of light stimuli, and location of light stimuli in the visual field. According to some embodiments, the number of intervals and/or the subsets of chromatic stimuli of each subset may vary based, at least in part, on the type of brain condition. According to some embodiments, the intervals may be 2 to 120 seconds apart. According to some embodiments, the intervals may be 2 seconds to 8 minutes apart. According to some embodiments, the time between each sequential interval may vary. According to some embodiments, between two intervals of illumination of the chromatic beam emitters, the method may include illuminating any one or more of the fixation light and/or the background light. According to some embodiments, between two intervals of illumination of the chromatic beam emitters, the method may include determining a baseline size of the pupil of the subject. According to some embodiments, each interval comprises a different subset of light stimuli, different wavelengths of light stimuli, and/or different intensities of light stimuli.

According to some embodiments, the method 200 may include providing an initial pre-determined light stimulus at an initial illumination. According to some embodiments, the method may include determining a baseline size of the pupil prior to the initial illumination. According to some embodiments, the initial illumination may be configured to determine a possibility of the subject having a brain related condition. According to some embodiments, the initial illumination may include at least one of or any one of a pre-determined duration of time of powered chromatic light stimuli, visual field locations of the chromatic light stimuli, wavelengths of the chromatic light stimuli, and/or subsets of the chromatic beam emitters. According to some embodiments, providing an initial pre-determined light stimulus at an initial illumination may include illuminating at least one chromatic beam emitter. According to some embodiments, providing an initial pre-determined light stimulus at an initial illumination may include illuminating a specified subset of chromatic beam emitters. According to some embodiments, the method may include applying blue and/or red light stimuli to one or more regions of visual field of the eye and it is based, at least in part, on the determined possibility in the initial illumination. According to some embodiments, the method may include selecting any one or more of the duration of simulation, ratio between different wavelengths, wavelengths of light stimuli, intensity of light stimuli, location of light stimuli in the visual field, number of intervals of illumination, and time between each illumination, based, at least in part, on the determined possibility in the initial illumination.

According to some embodiments, at step 206, the method 200 may include determining a value for one or more parameters related to induced changes in the pupil size in response to the light stimuli. According to some embodiments, the method 200 may include determining a value for one or more parameters related to induced changes in the pupil size in response to the light stimuli based, at least in part, on the data received from the camera 108. According to some embodiments, the one or more parameters may be selected from: Percent of Pupil Contraction (PPC), Pupil Response Latency (PRL), Maximal Contraction Velocity (MCV), Latency of MCV (LMCV), Percentage of Pupil Relaxation (PPR), Maximal Relaxation Velocity (MRV), Latency of MRV (LMRV), Maximal Contraction Acceleration (MCA), Latency of MCA (LMCA), Maximal Relaxation Acceleration (MRA), Latency of MRA (LMRA), Maximal Relaxation Deceleration (MRD), Latency of Maximal Relaxation Deceleration (LMRD), Area of Curve (AC), Latency of Maximal Pupil Contraction (LMP), Maximal Contraction Deceleration (MCD), Latency of MCD (LMCD), Max_Pupil_Size (Max_PS), Min_Pupil_Size (Min_PS, which may be used in some instances for blue light only), and any combination thereof. Each possibility is a separate embodiment. According to some embodiments, the one or more parameters may include the number of test targets with aberrant PPC in response to blue and/or red light stimuli.

According to some embodiments, the method may include multi-dimensional analysis of a plurality of pupil response parameters for each location. According to some embodiments, the method may include multi-dimensional analysis of a plurality of pupil response parameters for each location of a chromatic beam emitter that is illuminated. According to some embodiments, the method may include modeling the size of the pupil of the subject as a function of time for each location. According to some embodiments, each interval of illumination of a subset of chromatic beam emitters may generate at least 20, at least 30, or at least 40 pupil response parameters for each location. According to some embodiments, each interval of illumination of a subset of chromatic beam emitters may generate 35 pupil response parameters for each location.

According to some embodiments, there is provide a non-invasive method for determining, assessing and/or monitoring the progression of a brain related condition of a subject, based on pupil light response (PLR) to multiple chromatic small/focal (0.1-16 degree) light stimuli.

According to some embodiments, there is provide a non-invasive method for monitoring the progression of, determining and/or assessing a brain related condition of a subject, based on pupil light response (PLR) to chromatic light stimuli, the method includes the steps of:
(a) determining a baseline pupil size of an eye of the subject;
(b) applying blue and/or red light stimuli to one or more regions of visual field of the eye, the light stimuli configured to induce a response in the pupil;
(c) obtaining a value for one or more parameters related to induced changes in the pupil size in response to the light stimuli;
(d) normalizing, based on the baseline pupil size, the value of the one or more parameter; and
(e) classifying the PLR based on the one or more parameter values;
wherein said classifying results in monitoring the progression of, determining and/or assessing the brain related condition.

According to some embodiments, there is provide a non-invasive method for monitoring the progression of, determining and/or assessing a brain related condition of a subject, based on pupil light response (PLR) to chromatic light stimuli, the method includes the steps of:
determining a baseline pupil size of an eye of the subject;
applying blue and/or red light stimuli to one or more regions of visual field of the eye, the light stimuli configured to induce a response in the pupil;
determining a value for one or more parameters related to induced changes in the pupil size in response to the light stimuli;
normalizing, based on the baseline pupil size, the value of the one or more parameter; and
classifying the PLR based on the one or more parameter values, wherein said classifying allows monitoring the progression of, determining and/or assessing the brain related condition.

Reference is made to FIG. 3A, FIG. 3B, FIG. 3C, and FIG. 3D show graphs of exemplary parameters and value calculations, in accordance with some embodiments of the present invention. According to some embodiments, the method may include modeling the size of the pupil of the subject as a function of time, such as depicted in FIG. 3A, FIG. 3B, FIG. 3C, and FIG. 3D. According to some embodiments, the method may include applying a curve fitting algorithm to the model of the size of the pupil of the subject as a function of time. According to some embodiments, the method comprises applying a curve fitting algorithm to the model of the size of the pupil of the subject as a function of time for each individual illumination interval. According to some embodiments, the curve fitting may include calculating a trendline curve for the model of the size of the pupil of the subject as a function of time, such as a model of best fit, a polynomial equation, and the like. According to some embodiments, the curve fitting may include smoothing the model of the size of the pupil of the subject as a function of time. According to some embodiments, smoothing the curve may include removing tremors and/or small oscillatory movements of the pupil of the subject. For example, according to some embodiments, applying the curve fitting algorithm may include using Extreme Optimization Numerical Libraries and/or curve-fitting functions. According to some embodiments, the method may include normalizing the size of the pupil as a function of time and/or the curve fitting of the model of the size of the pupil as a function of time. According to some embodiments, the normalizing may be based, at least in part, on the determined baseline size of the pupil of the subject.

Figure 3A:
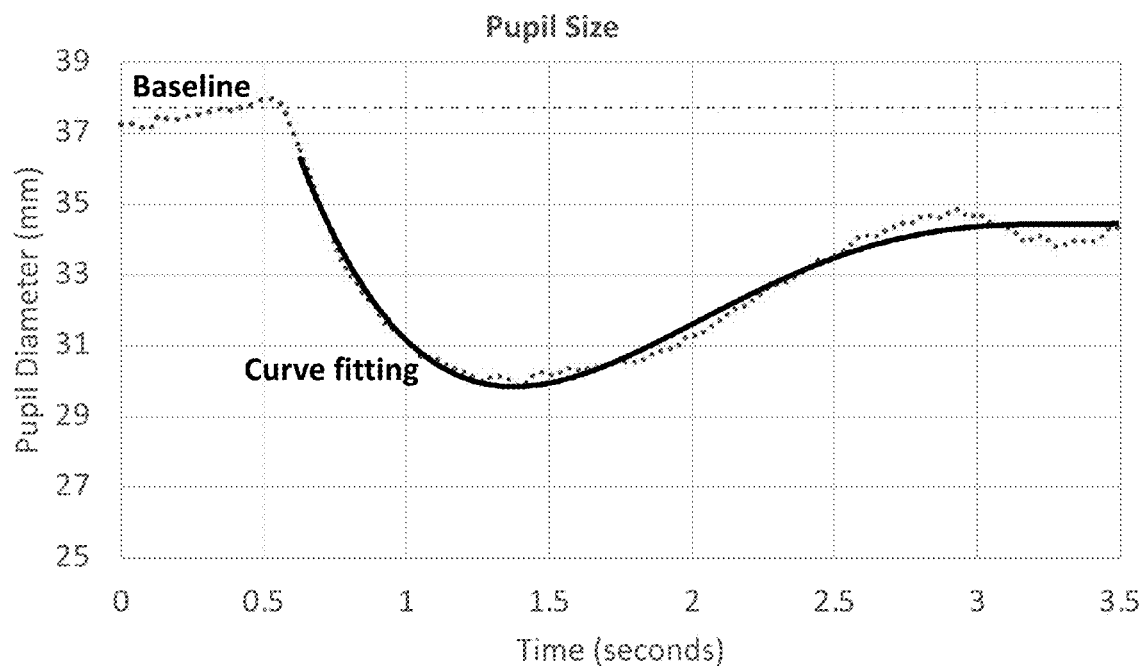
Figure 3B:
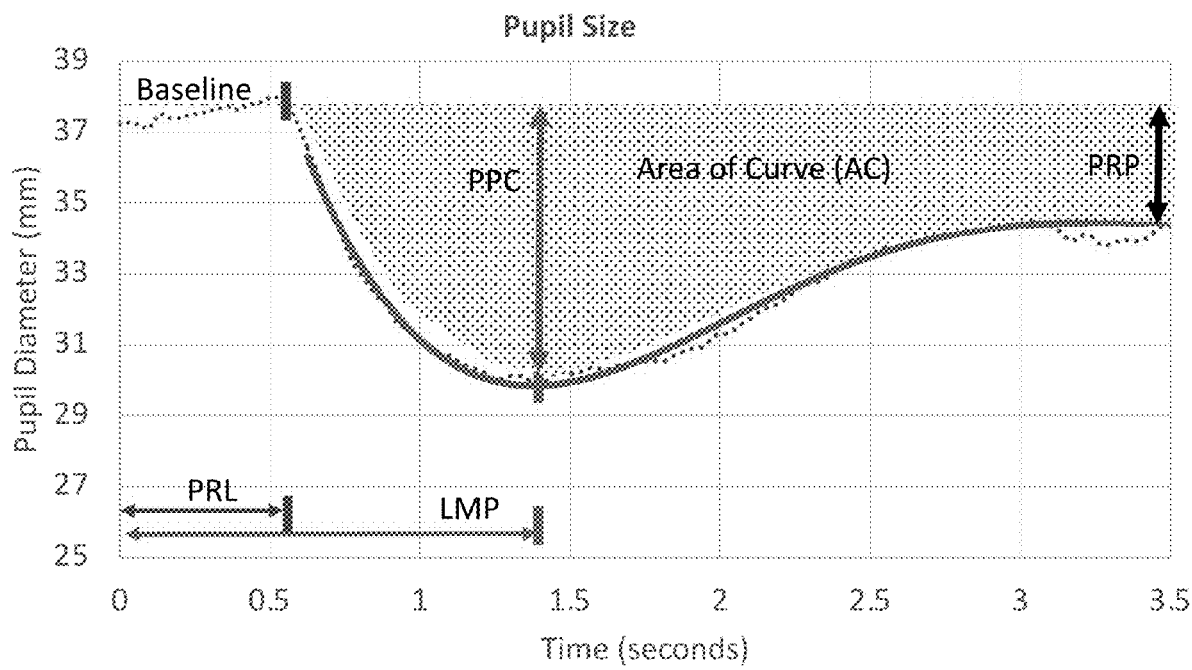
Figure 3C:
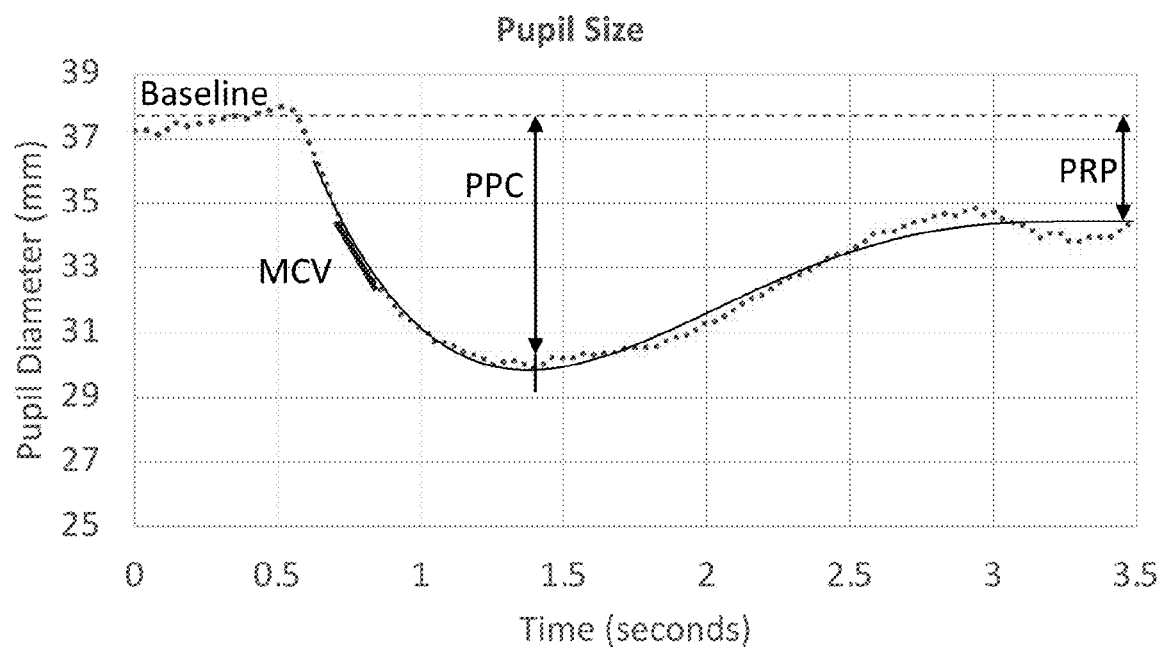
Figure 3D:
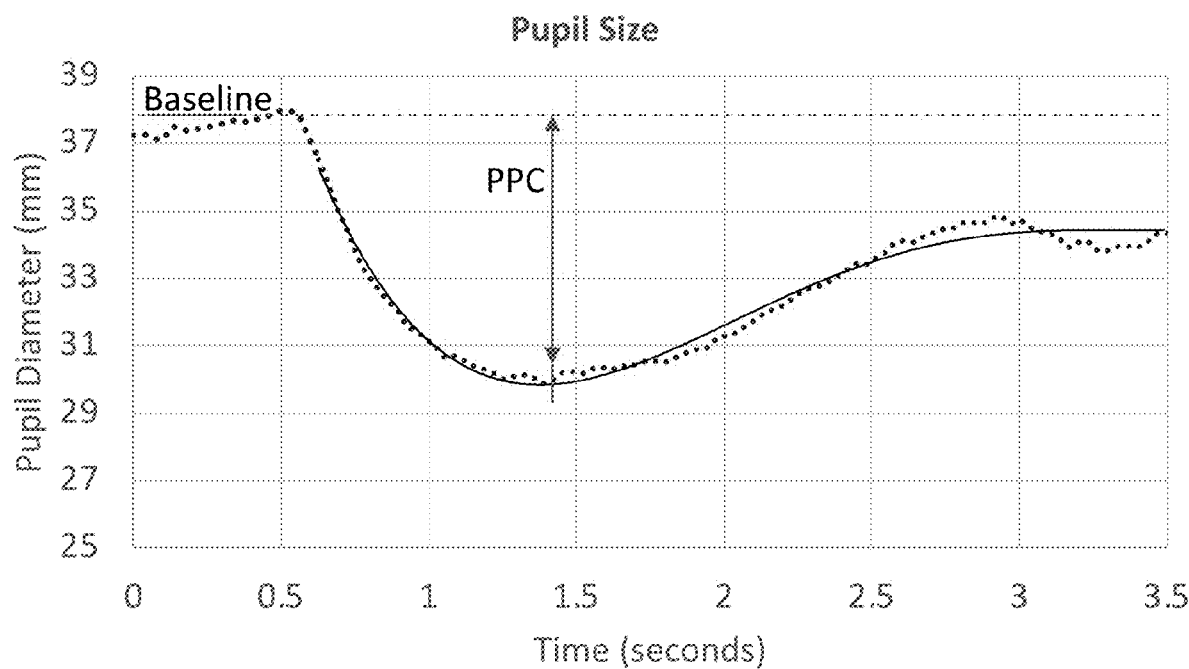

According to some embodiments, the method may include extracting the value of the one or more parameters from the curve fitting of the model of the size of the pupil of the subject as a function of time. According to some embodiments, the method may include extracting the value of the PPC, PPR, AC, PRL, LMP, and/or MCV from the curve fitting of the model of the size of the pupil of the subject as a function of time. According to some embodiments, the value of one or more parameters may be extracted from the curve fitting of the model of the size of the pupil of the subject as a function of time. According to some embodiments, and as depicted in FIG. 3B, the values of one or more of the PPC, PPR, AC, PRL, and/or LMP may be extracted from the curve fitting of the model of the size of the pupil of the subject as a function of time. According to some embodiments, and as depicted in FIG. 3C, the values of one or more of the PPC, MCV, and/or PPR may be extracted from the curve fitting of the model of the size of the pupil of the subject as a function of time. According to some embodiments, the value of the AC may include the area trapped between the baseline size of the pupil and the fitted curve of the model of the size of the pupil as a function of time. According to some embodiments, the value of the MCV may include a slope of the curve of the model between the baseline size of the pupil and a minimum point of the model. According to some embodiments, the value of the PPC may include the difference in size between the baseline size of the pupil and the size of the pupil at a minimum point of the model.

According to some embodiments, Pupil diameter maybe automatically recorded at a suitable frequency (for example, 30 Hz). For each stimulus, the percentage of pupil contraction (PPC, in %) may be determined automatically by the program instructions, following normalization, based on the initial pupil size (baseline pupil size), measured at the beginning of each stimulus, using the formula:

$$PPC = \frac{\text{Initial Pupil Diameter} - \text{Minimum Pupil Diamater}}{\text{Initial Pupil Diameter}}$$

Maximal contraction velocity (MCV in pixel/sec) and the latency of MCV (LMCV in sec) may be according be determined.

Percentage of pupil recovery (PPR, in %) for bright blue light stimuli may be determined at 3.7 second following light onset based on the initial pupil size measured at the beginning of each stimulus, using the formula:

$$PPR = \frac{\text{Pupil Diameter at 3.7 sec}}{\text{Initial Pupil Diameter}} \times 100$$

Normalized Minimal Pupil Size (NMPS, in %) may be determined at maximal pupil contraction stage, based on the initial pupil size measured at the beginning of each stimulus, using the formula:

$$NMPS = \frac{\text{Pupil Diameter at maximal contraction}}{\text{Initial Pupil Diameter}} \times 100$$

Reference is made to FIG. 4A and FIG. 4B, which show graphs of velocity of pupil size as a function of time, in accordance with some embodiments of the present invention. According to some embodiments, the method may include deriving a model of the velocity of the pupil size as a function of time. According to some embodiments, the method may include deriving a model of the velocity of the pupil size as a function of time based, at least in part, on the curve fitting of the model of the size of the pupil size as a function of time and/or the model of the size of the pupil size as a function of time. According to some embodiments, and as depicted in FIG. 4A and FIG. 4B, the values of one or more of the MCV, MRV, LMRV, and/or LMCV may be extracted from the model of the velocity of the pupil size as a function of time.

Reference is made to FIG. 5A and FIG. 5B, which show graphs of acceleration of pupil size as a function of time, in accordance with some embodiments of the present invention. According to some embodiments, the method may include deriving a model of the acceleration of the pupil size as a function of time. According to some embodiments, the method may include deriving a model of the acceleration of the pupil size as a function of time based, at least in part, on the curve fitting of the model of the size of the pupil size as a function of time and/or the model of the size of the pupil size as a function of time. According to some embodiments, the method may include deriving a model of the acceleration of the pupil size as a function of time based, at least in part, on the model of the velocity of the pupil size as a function of time. According to some embodiments, and as depicted in FIG. 5A and FIG. 5B, the values of one or more of the LMCA, MCA, LMRD, MRD, LMRA, and/or MRA may be extracted from the model of the acceleration of the pupil size as a function of time.

Reference is made to FIG. 6, which shows a graph of the lurch of pupil size as a function of time, in accordance with some embodiments of the present invention.

According to some embodiments, the method may include determining and/or calculating the value of the one or more parameters using the model of size as a function of time, the curve fitting of the model of size as a function of time, the velocity of the pupil size as a function of time, and the acceleration of pupil size as a function of time. According to some embodiments, the method may include determining and/or calculating the value of the one or more parameters for each location of a chromatic beam emitter in the visual field.

According to some embodiments, the method may include applying one or more values of the one or more parameters to one or more machine learning algorithms, such as a classification algorithm. According to some embodiments, the one or more machine learning algorithms may be configured to classify the subject as having a brain related condition or not having a brain related condition.

According to some embodiments, the algorithm to be used in the method or system of the disclosure is a machine-learning algorithm. Examples of machine-learning algorithms include AdaBoost, discriminant analysis, K-nearest neighbor classifier (KNN), Support Vector Machine (SVM) classifier, logistic regression classifier, neural network classifier, Gaussian mixture model (GMM), nearest centroid classifier, linear regression classifier, decision tree classifier, and random forest classifier, ensemble of classifiers, or any combination thereof.

According to some embodiments, at step 208, the method 200 may include classifying the PLR based on the one or more parameter values. According to some embodiments, the classifying allows monitoring the progression of, determining and/or assessing the brain related condition. According to some embodiments, the method may include classifying, using the one or more machine learning algorithms, the brain related condition into types and/or levels of severity and/or progression of the condition based, at least in part, on the one or more parameters and at least one calculated value.

According to some embodiments, the method may include obtaining one or more models, such as the model of size as a function of time, the curve fitting of the model of size as a function of time, the model of the velocity of the pupil size as a function of time, and the model of the acceleration of pupil size as a function of time. According to some embodiments, each of the one or more models is associated with a response to stimulation using a red light and/or a blue light. According to some embodiments, the method may include determining a value of one or more parameters for the one or more models. According to some embodiments, the number of determined values of one or more parameters may correspond to the number of chromatic beam emitters presented in the illuminated subset. For example, in some embodiments, for a subset including 54 virtual field locations of chromatic beam emitters, the method may include determining 54 values of a specified parameter. For example, for a subset including 54 virtual field locations of chromatic beam emitters, the method may include determining 54 values of CMP measured at 54 different spots in the retina of the subject.

According to some embodiments, the method may include applying the determined values of one or more parameters to one or more machine learning algorithms configured to identify, or assess a progression of, a brain related condition. According to some embodiments, the method may include applying the determined values of one or more parameters to one or more machine learning algorithms configured to identify a subject's risk for a brain related condition prior the onset of the disease. According to some embodiments, the confidence interval (CI) of the identification or assessment of the progression of a brain related condition is at least 80%. According to some embodiments, the confidence interval (CI) of the identification or assessment of the progression of a brain related condition is at least 90%. According to some embodiments, the confidence interval (CI) of the identification or assessment of the progression of a brain related condition is at least 95%.

According to some embodiments, the method may include determining the pupil diameter for each light stimuli. According to some embodiments, processor 110 is configured to calculate the values of one or more parameters for each light stimuli in response to each location. According to some embodiments, the method may include calculating the value of the one or more parameters for red stimuli and blue stimuli separately and/or independently. According to some embodiments, and as described in greater detail elsewhere herein, the method may include normalizing the values of the one or more parameters. According to some embodiments, the method may include normalizing the values of the one or more parameters based, at least in part, on the baseline size of the pupil. According to some embodiments, the method may include applying the calculated values of one or more parameters to a machine learning algorithm.

Reference is made to FIG. 7, which shows a flow chart of functional steps in a non-invasive method for monitoring the progression of, determining and/or assessing a brain related condition of a subject using a machine learning algorithm, in accordance with some embodiments of the present invention. According to some embodiments, the machine learning algorithm is configured to execute a method for monitoring the progression of, determining and/or assessing a brain related condition of a subject, such as the method 700 depicted in FIG. 7. According to some embodiments, at step 702, the method may include obtaining the values of one or more parameters for each light stimuli. According to some embodiments, at step 704, the method may include selecting one or more values of one or more parameters having a correlation with a specific brain condition. According to some embodiments, at step 706, the method may include classifying the values of the selected one or more parameters as being indicative of the brain condition.

According to some embodiments, at step 702, the method may include obtaining the values of one or more parameters for each light stimuli. According to some embodiments, the method may include obtaining the values of one or more parameters for each light stimuli in the form of an array. According to some embodiments, each value within the array may correspond to a location in the visual field, such as, for example, the depicted locations 1-76 in FIG. 1C. According to some embodiments, the method comprises obtaining at least two arrays associated with each one of the left eye and the right eye of the subject, respectively.

According to some embodiments, at step 704, the method may include selecting one or more values of one or more parameters having a correlation with a specific brain condition. According to some embodiments, and as described in greater detail elsewhere herein, specified parameters may be indicative of specific brain conditions. According to some embodiments, the values of the specific parameters may be normalized.

According to some embodiments, at step 706, the method may include classifying the values of the selected one or more parameters as being indicative of the specific brain condition. According to some embodiments, the method may include classifying the values based, at least in part, on a threshold associated with each specific value. According to some embodiments, the method may include classifying the values based, at least in part, on a threshold associated with a specific value of a parameter relating to a specific brain condition, or the state thereof. According to some embodiments, the threshold value may be relative (compared) to a control value. In one specific example, a threshold value may be over 1, 2, 4 or more SE or SD over or below a corresponding control value. In one specific example, a threshold value may be determined based on ROC AUC analysis. According to some embodiments, the threshold may include a normalized value above which the value of the parameter is indicative of a specific brain condition. According to some embodiments, and as described in greater detail elsewhere herein, different brain conditions may be associated with one or more different parameters. For example as depicted in the Table 1A below.

TABLE 1A

|  |  | Alzheimer (high risk) | Parkinson's Disease | Intracranial lesions - Brain Tumors (no contact with the optic tract/mid-brain or the optic radiation) | Intracranial lesions - Brain Tumors Contacting the optic tract/mid-brain or the optic radiation) |
|---|---|---|---|---|---|
| High Intensity Blue | Center | MCV | PPR | PPR | PPR |
|  | Periphery |  |  | PPR | PPR |
| Low Intensity Blue | Center |  | PPC, MCA | PPC | PPC, PPR |
|  | Periphery | PRL | PPC, MCA |  | PPC |
| Low Intensity Red | Center | PRL | PPC | PPC |  |
|  | Periphery | PRL |  |  |  |

TABLE 1A-continued

|  |  | Fragile X carriers | Multiple Sclerosis | Optic Neuritis | Pseudotumor Cerebri | Stroke |
|---|---|---|---|---|---|---|
| High Intensity Blue | Center Periphery |  PPR | MCV, PPR MCV, PPR | PPC PPC | PPC, MRV PPC, MRV | PPR PPR |
| Low Intensity Blue | Center Periphery |  LMCA | MCV PPC, MRV, MCV | PPC PPC, PPR | PPC, MRV PPC, MRV | PPC, MRV |
| Low Intensity Red | Center Periphery | LMCA | MCV PPC, MRV, MCV | PPC PPC, PPR | PPC, MRV PPC, MRV |  |

According to some embodiments, the condition may be Alzheimer's disease (AD), or high risk for AD, and the calculated value may be determined based at least on at least one of: the MCV parameter in the central region of the visual field in response to a high intensity blue light stimuli, the PRL parameter in the periphery of the visual field in response to a low intensity blue stimuli, PRL in the central region of the visual field in response to low intensity red stimuli, and/or PRL parameter in the periphery of the visual field in response to a low intensity red stimuli, to determine the existence or non-existence of Alzheimer's disease (or risk) using the calculated value.

In some embodiments, as exemplified herein (see, for example, FIG. 10B and FIG. 11), the transient pupil response latency (PRL) for dim blue light achieved Area Under the Curve Receiver Operating Characteristic (AUC-ROC) of 0.90±0.051 (left-eye) and 0.87±0.048 (right-eye). Parameters associated with the contraction arm of the rod and cone-mediated PLR were more discriminative compared to parameters associated with the relaxation arm and melanopsin-mediated PLR. Significantly shorter PRL for dim blue light was measured in the FH+ group in two test targets in the peripheral visual field in right eye that had highest relative weight in the machine learning algorithm (mean±standard error, SE 0.449 s±0.007 s vs. 0.478 s±0.010 s, p=0.038).

Early detection of Alzheimer's Disease (AD), at the pre-clinical stage, or identifying patients at risk, can be of benefit for implementing preventative measurements, and for drug modifying disease research purposes. Identification of sensitive and specific biomarkers, at the very early stages of AD neuropathology, is crucial for the development of interventions aimed at preventing the disease. Although amyloid and tau related biomarkers hold promise for early diagnosis of AD, they do not yet provide sufficient sensitivity or accuracy in identifying the asymptomatic disease stages. Some of the methods developed to detect these biomarkers involve highly invasive CSF measurements, or are not widely accessible due to high costs of amyloid imaging with PET scan. Retinal research has been a target for detection of neurodegeneration biomarkers in AD patients. Accumulating data suggest that in neurodegenerative diseases, ocular findings may precede the pathology in the brain. Studies demonstrated significant loss of iPRGCs in post-mortem AD eyes and impaired PLR was reported in sporadic AD as well is in a-symptomatic carriers of autosomal-dominantly inherited mutations for AD. Abnormal PLR correlates with cognitive performance in AD and mild cognitive impairment (MCI) subjects and with CSF markers of AD. These studies measured PLR in response to white light stimulating the entire retina.

According to some embodiments, the condition may be Parkinson's disease (PD), in differential diagnosis/or risk (genetic) for PD, and the calculated value may be determined based on at least one of: the PPR parameter in the central region of the visual field in response to a high intensity blue light stimuli, the PPC parameter in the central region of the visual field in response to a low intensity blue light stimuli, the MCA parameter in the central region of the visual field in response to a low intensity blue light stimuli, the PPC parameter in the peripheral region of the visual field in response to a low intensity blue light stimuli, the MCA parameter in the peripheral region of the visual field in response to a low intensity blue light stimuli, and the PPC parameter in the central region of the visual field in response to a red light stimuli.

Parkinson's disease (PD) is the second most common degenerative disease of the CNS, affecting between 7-10 million people worldwide. Currently, while early intervention is crucial in PD, specifically before motor symptom onset, there are only few sensitive and reliable biomarkers that can assist in predicting whether a mutation carrier will develop PD. The current biomarkers for PD include those based on early premotor clinical symptoms (e.g., REM sleep behavioral disorder and hyposmia), and imaging of the dopaminergic system (e.g., FDOPA PET CT and DAT-SPECT). However, these biomarkers are either expensive (brain imaging), invasive (e.g. CSF obtained by lumbar puncture) are of yet unproven value or lack sensitivity and/or specificity. Patients with PD present with circadian rhythm disturbances, depressed mood and cognitive impairment that are controlled by homeostatic networks. These pathways are influenced by light through the retinohypothalamic tract which is almost exclusively driven by ipRGCs. Previous studies indicated significant differences in PLR recorded in response to white light stimulus between PD patients and healthy controls including longer latency of the PLR and smaller contraction amplitude. A dose-response relationship was observed in PD patients between the maximum pupil diameter and morning L-Dopa dose. However, those studies tested PLR for full-field stimuli (i.e. shining the light stimulus on the entire retina). In another study, using full-field blue and red light stimuli, PD patients presented with normal rod mediated-PLR and reduced cone and melanopsin-mediate PLR. However, no correlation was observed between changes in PLR and clinical symptom severity, sleep quality, RNFL thickness or medication dosage.

According to some embodiments, the condition may be a brain tumor, and the calculated value may be determined based on at least one of: the PPR parameter in the peripheral region of the visual field in response to a high intensity blue light stimuli and the PPC parameter in the peripheral region of the visual field in response to a low intensity blue light stimuli.

Intracranial tumors are a leading cause of morbidity and mortality. Clinical symptoms are caused by mass effect, elevated intracranial pressure or hormonal effects. The PLR, and specifically identification of PLR interocular asymmetry is used in the clinic to as part of neurological evaluation of these patients. Attenuated PLR was demonstrated in patients with brain tumors compressing the mid brain and in patients with postgeniculate lesions using white or orange light stimuli. Automated pupillometry enables sensitive and quantitative measurement of the PLR, and several studies reported its use for detection of elevated intracranial pressure, brain injuries, sport-related concussion and management of analgesia.

Intracranial pressure (ICP) is determined by the volume of its contents brain, blood, and cerebrospinal fluid (CSF). If the volume of one of these components increases, ICP will begin to increase. Increased ICP can cause brain damage and is a life-threatening condition. It can be the result of a brain injury and other pathologies such as pseudotumor cerebri. Currently there is no reliable and sensitive, objective and noninvasive method for diagnosis of ICP elevation.

According to some embodiments, the condition may be being a fragile X carrier and/or a fragile X related cognitive decline, and the calculated value may be determined based at least on one of: the PPR parameter in the peripheral region of the visual field in response to a high intensity blue light stimuli, the LMCA parameter in the peripheral region of the visual field in response to a low intensity blue light stimuli, and the LMCA parameter in the central region of the visual field in response to red light stimuli.

According to some embodiments, the condition may be Multiple Sclerosis (MS), and the calculated value may be determined based at least on one of: the PPC parameter in the peripheral region of the visual field in response to red light stimuli, the PPC parameter in the peripheral region of the visual field in response to low intensity blue light stimuli, the MRV parameter in the peripheral region of the visual field in response to red light stimuli, the MRV parameter in the peripheral region of the visual field in response to low intensity blue light stimuli, and the MCV parameter in the peripheral region and/or the central region of the visual field in response to red and/or blue light stimuli and PPR at central and/or peripheral locations in response to high intensity and/or long duration blue light.

Multiple sclerosis (MS) is a chronic, autoimmune inflammatory demyelinating progressive disease of the central nervous system and a major cause of disability. MS is initiated by T cells targeting self-antigens in the CNS. The first lesions are typically focal areas of demyelination in the white matter known as plaques. Depending on the locations of these plaques, the resulting clinical neurological manifestations are notoriously variable, and usually result from immune cell invasion across the blood-brain barrier. This process eventually leads to continuous activation of CNS-homing and CNS-resident innate immune cells (macrophages and microglia) in the brain parenchyma, with ensuing demyelination and neurodegeneration. About 75% of patients with MS develop optic neuritis (ON), an inflammatory optic neuropathy associated with demyelination and RGC degeneration. The relationships between the inflammatory lesions, demyelination, and the neurodegenerative changes that correlate best with clinical disability are poorly understood. In recent years, there has been a significant increase in the number of available treatments for MS mainly targeting the brain inflammation, and new treatments are at different stages of development. Due to the large variability in disease presentation between patients, treatment strategy is usually based on a personalized approach determined by the individual patient's prognosis and treatment risks. It has been that demonstrated reduced melanopsin-mediated PLR in MS patients was significantly associated with thinning of the GCIP layers sector of the retina in MS patients, particularly in patients with a history of acute ON.

According to some embodiments, the condition may be optic neuritis (ON), and the calculated value may be determined based on at least one of: the PPC parameter in the peripheral region and/or the central region of the visual field in response to red and/or blue light stimuli and the PPR parameter in the peripheral region of the visual field in response to blue light stimuli, and/or the calculated value is the number of test targets with aberrant PPC in response to blue and red light.

Optic Neuritis (ON) is an acute inflammation of the optic nerve. It is a common manifestation of multiple sclerosis and the clinical symptoms thereof include: sudden onset of painful visual loss, decreased sensation of light brightness, decrease in color vision, central visual field defects. Visual field assessment is important for diagnosis and follow-up. Current perimetry testing bears significant limitations as the test is subjective and relies heavily on subject cooperation and attention.

According to some embodiments, the condition may be intracranial lesions, and the calculated value may be determined based on at least one of: a parameter in the peripheral region and/or the central region of the visual field in response to high intensity blue light stimuli, the PPC parameter in the nasal region of the visual field in response to low intensity blue light, the PPR parameter in the nasal region of the visual field in response to low intensity blue light.

According to some embodiments, the condition may be pseudotumor cerebri, and the calculated value may be determined based on at least one of: the PPC parameter in the peripheral region and/or the central region of the visual field in response to red and/or blue light stimuli, and the MRV parameter in the peripheral region and/or the central region of the visual field in response to red and/or blue light stimuli.

According to some embodiments, the condition may be stroke, and the calculated value may be determined based on at least one of: the PPR parameter in the peripheral region and/or the central region of the visual field in response to high intensity blue light stimuli, the PPC parameter in the peripheral region of the visual field in response to low intensity blue light stimuli, and the MRV parameter in the peripheral region of the visual field in response to low intensity blue light stimuli.

According to some embodiments, the discrimination performance (i.e., the diagnostic performance) of the classification model, or its ability to discriminate between the different conditions, may be obtained by AUC which is the area under the receiver operating characteristic curve (ROC). According to some embodiments, the method may include calculating the ROC AUC of values of one or more of the parameters in relation to a brain condition. According to some embodiments, the method may include calculating the ROC AUC of values of one or more of the parameters for a specific location and/or region in the visual field, a wavelength of the light stimuli, and/or intensity of the light stimuli of the one or more chromatic beam emitters. According to some embodiments, the confidence interval (CI) may be based, at least in part, on the AUC. According to some embodiments, confidence interval (CI) may be an AUC confidence interval.

According to some embodiments, the classification algorithm may include an AdaBoost algorithm. According to some embodiments, the classification algorithm may be trained on a training set including a plurality of models and labels. According to some embodiments, the training set models may include arrays of pupil response to red light stimuli. According to some embodiments, the training set models may include arrays of pupil response to blue light stimuli. According to some embodiments, the training set models may include arrays of pupil response of the left eye and/or right eye. According to some embodiments, the training set models may include arrays of pupil responses associated with one or more combinations of parameters. According to some embodiments, missing data of the training set may be imputed using the mean substitution strategy that assigns the overall respondent mean to all missing responses. According to some embodiments, the method may include predicting the accuracy of different parameters. According to some embodiments, predictive accuracy of different parameters was determined using machine learning algorithm. According to some embodiments, training of the algorithm may include training such that each model may be introduced to a single feature type (or in other words, a single parameter) in the training set. According to some embodiments, the same hyperparameters and training protocol may be used in all models.

According to some embodiments, each model may be tested to quantify how well it can discriminate between different labels. According to some embodiments, the labels may include one or more of a subject having a brain condition, an offspring of a parent with a brain condition, an offspring of a parent with a specific type of brain condition, and an offspring of a parent with a probable brain condition. According to some embodiments, the labels may include one or more of medical records of the subject, medical records of at least one parent of the subject, questionnaire administered to the subject and/or at least one of the parents of the subject. According to some embodiments, the labels may include one or more diagnostic tests administered to the subject. For example, cognitive assessments may be effected for early Alzheimer Disease such as, for example, The Rey Auditory Verbal Learning Test, tests for immediate and delayed recall and recognition, The Digit Symbol test, parts A and/or B of the trail Making test, and/or Forward and backwards Digit Span.

According to some embodiments, as exemplified herein, aberrant retinal structure and PLR measures are significantly associated with cognitive decline and early changes in brain structure in healthy subjects at high risk to develop dementia. According to some embodiments, such measurements can serve as biomarkers for early detection of brain neurodegenerative diseases.

According to some embodiments, the systems, devices and methods may utilize chromatic multifocal pupillometry and various machine learning (ML) and artificial intelligence (AI) algorithms (such as, for example, AdaBoost) to allow determining or predicting the risk of a subject to develop a brain related condition, detect or identify the condition, assess the condition and/or monitor the progression of the condition.

According to some embodiments, there are provided methods for predicting the existence of verified AD family history of a person with no clinical cognitive impairment. According to some embodiments, as exemplified herein, the method for predicting AD may be based, at least in part, on parameters pertaining to latency of PLR and in particularly pupil response latency, as measured by the multifocal pupillometer. According to some embodiments, as exemplified herein, and without wishing to be bound by any theory or mechanism, there is a connection between AD and the afferent pathway of the pupil.

According to some exemplary embodiments, the methods disclosed herein, and the devices and systems executing the same, can allow identifying a subject at risk for AD, even years before the onset of the condition.

According to some embodiments, for the ML analysis of the parameters, each tested parameter can produce any number of independent features, based on the values of the respective parameter measured at each of the different illumination spots in the retina, which will be inputted into the algorithm and may be part of the analysis.

In some embodiments, each parameter may be comprised by any number of independent features (such as, for example, in the range of 1-228), depending on the values measured/determined at the various illumination spots. In one example, each parameter may comprise 54 independent features based on the parameter values measured/determined at 54 different illumination spots in the retina. According to some embodiments, the predictive accuracy of different parameters may be determined using a suitable algorithm, such as, for example, but not limited to, Adaboost algorithm. According to some embodiments, multiple classifiers may be trained, with each classifier receiving a distinct set of features (for example, 54 features), corresponding to a single parameter. According to some embodiments, for each eye, any number of models (for example, in the range of 1-35) may be trained based on red light illumination. Alternatively or additionally, any number of models may be trained based on blue light illumination.

In some exemplary embodiments, in the training of an AD model (as exemplified in Example 1 herein), 17 models were trained for red light and 18 models were trained for blue light, resulting in a total of 35 different models. In some embodiments, missing data may be imputed using suitable tools, such as, for example, the mean substitution strategy. According to some embodiments, the features may be scales, or gradients, for example using min-max normalization, to a range of [0,1].

In some embodiments, such a prediction as to the existence of AD family history, may exhibit an Area under the ROC curve (AUC) of about 89±6, at 95% Confidence Interval (CI), as exemplified herein.

According to some embodiments, melanopsin mediated MCV (i.e., MCV determined in response to strong blue light) is significantly lower at the central retina ($p=0.015$, adjusted for age and sex) but not the peripheral retina, with ROC AUC=85% ($p=0.00001$) in subjects at risk of having AD (based on familial history (FH+)). According to some embodiments, this PLR parameter significantly and directly correlated with the following features: 1. Thickness of the inner retinal layers (mGCL & mIPL, $p<0.015$); 2. Hippocampus volume (Pearson's correlation $r=0.245$, $p=0.001$ for the entire population; FH+: $p=0.333$, $p=0.0001$, FH–: $r=0.319$, $p=0.048$) and; 3. Cognitive function test scores for executive functions (where lower score reflects better function: $r=-0.230$, $p=0.001$ for the entire population; FH+: $p=-0.319$, $p=0.0001$, FH–: $r=-0.252$, $p=0.034$, adjusted for age and sex) and memory ($r=0.273$, $p=0.00004$ for the entire population; FH+: $p=0.278$, $p=0.001$, FH–: $r=0.302$, $p=0.01$).

According to some embodiments, as exemplified hereinbelow, the B_PRL (pupil response latency determined in response to blue light stimulation) and R_PRL (pupil response latency determined in response to red light stimulation) are predictive parameters for high risk of AD. According to some embodiments B_PRL and R_PRL provide a very high discriminative (diagnostic) performances with AUC of 0.89±0.03, CI of [0.83, 0.95] (eye-0), 0.83±0.03, CI of [0.77, 0.89] (eye-1) for B_PRL (and of 0.89±0.03, CI of [0.81, 0.93] (eye-0), 0.86±0.03, CI of [0.81, 0.91] (eye-1) for R_PRL. According to some embodiments, additional parameters exhibiting high discriminative diagnostic values with respect of AD, for both eyes may include B_LMCA, R_LMCA, B_LMCD, R_LMCD and B_LMP. According to some embodiments, additional parameters exhibiting high discriminative values for eye-1 is R_LMP.

According to some embodiments, for the prediction of risk of AD, one or more of the following parameters may be used: B_PRL, R_PRL, B_LMCA, R_LMCA, B_LMCD, R_LMCD, B_LMP, R_LMP, B-MCV, or any combination thereof. Each possibility is a separate embodiment. According to some embodiments, deviation or alterations in the values of one or more of the parameters, e.g. under designated conditions, such as stimulation wavelength, stimulation intensity, duration, location on the VF, and the like, in one or both eyes, may be predictive of increased risk of developing AD, AD state and/or AD progression. According to some embodiments, the chromatic pupilloperimetry parameters that are associated with the contraction stage of the PLR are more discriminative than parameters associated with the relaxation stage.

According to some embodiments, there are provided cost effective and non-invasive biomarkers for PD, based on determined PLR parameters, that can be used to detect the earliest premotor signs of impending disease, predict development of motor symptoms and PD in subjects at high risk. Furthermore, such biomarkers can be used in assessing PD condition and/or progression of PD pathology during all stages thereof.

According to some embodiments, as exemplified hereinbelow, an attenuated PPC, AC and/or MCA in central VF and/or peripheral VF as determined in response to dim blue light stimulation are predictive for PD condition.

According to some embodiments, as exemplified hereinbelow, an attenuated PPC and/or MCV in central VF as determined in response to red light stimulation are predictive for PD condition.

According to some embodiments, as exemplified hereinbelow, an attenuated PPR in central VF in response to bright blue light is predictive for PD condition.

According to some embodiments, for the prediction of risk of PD, detecting PD and/or assessing the progression of PD condition, one or more of the following parameters may be used: attenuated PPC in response to dim blue light in central and/or peripheral VF, attenuated (reduced) AC in response to dim blue light in central and/or peripheral VF, attenuated (reduced) MCA in response to dim blue light in central and/or peripheral VF, attenuated PPC in response to red light in central VF, attenuated MCV in response to red light in central VF, attenuated PPR in response to bright blue light in central VF, or any combination thereof. Each possibility is a separate embodiment. According to some embodiments, deviation or alterations in the values of one or more of these parameters may be predictive as to increased risk of developing PD, PD state and/or PD progression.

According to some embodiments, there are provided cost effective and non-invasive biomarkers for MS, based on determined PLR parameters. Such biomarkers can be used in assessing MS condition and/or progression of MS pathology.

According to some embodiments, for the prediction of risk of MS condition, detecting MS and/or assessing the progression or monitoring of MS condition, one or more of the following parameters may be used: attenuated (reduced) PPC in response to red light in peripheral VF, attenuated (reduced) MRV in response to red light in peripheral VF, attenuated (reduced) PPC in response to dim blue light in peripheral VF, attenuated (reduced) MRV in response to dim blue light in peripheral VF, attenuated (reduced) MCV in response to red light in the entire VF, attenuated (reduced) MCV in response to bright blue light in the entire VF, or any combination thereof. Each possibility is a separate embodiment. According to some embodiments, deviation or alterations in the values of one or more of the parameters may be predictive of increased risk of developing MS, MS state and/or MS progression.

According to some embodiments, for detecting ON and/or assessing the progression or monitoring of the ON condition, one or more of the following parameters may be used: attenuated PPC in response to bright blue light in peripheral VF, attenuated PPC in response to red light in the visual field, attenuated PPC in response to dim blue light in the visual field, or any combination thereof. Each possibility is a separate embodiment.

According to some embodiments, attenuated melanopsin-mediated PPR (in response to bright blue light) in the peripheral VF in optic neuritis eyes compared to controls having an ROC AUC of about 91% (p=0.001). According to some embodiments, the rod and cone-mediated percentage of pupil contraction (PPC) in response to red and blue light may be lower by more than 2 standard errors (SEs) from the mean of controls in majority of visual field test targets in ON eyes, even in patients with normal best-corrected visual acuity (BCVA).

According to some embodiments, melanopsin-mediated pupil response (i.e. response to bright blue light) at the peripheral retina may serve as a biomarker for detection of ON and/or for assessing the progression thereof, or treatment efficacy thereto.

According to some embodiments, the systems, devices and methods can be used to detect or diagnose cognitive decline associated with fragile X carriers, based on PLR response to different light stimulation.

According to some embodiments, for detecting cognitive decline associated with fragile X carriers and/or for assessing the progression or monitoring their condition, one or more of the following parameters may be used: attenuated PPR in response to bright blue light in peripheral VF, attenuated LMCA in response to red light in the visual field, attenuated LMCA in response to dim blue light in the visual field, or any combination thereof. Each possibility is a separate embodiment.

According to some embodiments, the systems, devices and methods can be used to detect or diagnose brain tumors or symptoms associated therewith. In some embodiments, the systems, devices and methods can allow noninvasive objective diagnosis and monitoring of patients with focal brain tumors, having intracranial pathology, the tumor can be brain tumors with no apparent contact with the optic apparatus or brain tumors that contacted the optic apparatus.

According to some embodiments, for detecting brain tumor and/or assessing the progression or monitoring of the tumor condition, one or more of the following parameters may be used: mean normalized pupil size at 3.7 sec following blue light offset is significantly higher compared with control subjects in central and peripheral locations, with ROC analysis exhibiting that this PLR parameter had the largest area under the curve (AUC) in the central retina in brain tumors with no apparent contact with the optic apparatus and in the peripheral retina in brain tumors that contacted the optic apparatus (90.8%, p=0.003 and 89.3%, p=0.003, respectively). As exemplified hereinbelow, in brain tumors that contacted the optic apparatus, exemplary ROC analysis show that the maximal contraction velocity recorded in response to the red light stimulus in the peripheral superior test target had the largest AUC (96.4%, p=0.006).

According to some embodiments, for detecting brain tumor and/or assessing the progression or monitoring of the tumor condition (with no contact to the ocular system), the parameter of maximal contraction velocity (MCV) in response to the red light stimulus in the Central Nasal (CN) target region may be used. As exemplified below, this parameter exhibited the largest AUC (84.1%, p=0.007), with a cutoff value (threshold) that provided the most reliable predictions 11.97 pixel/sec. (Sensitivity=0.778, 1-Specificity=0.143).

According to some embodiments, for detecting brain tumor and/or assessing the progression or monitoring of the tumor condition (with contact with ocular system), one or more of the following parameters may be used: normalized pupil size measured 3.7 sec following blue light offset in the peripheral VF test target, reduced Percentage of Pupil Contraction (PPC), reduced Maximal Contraction Velocity (MCV), reduced Maximal relaxation velocity (MRV) in response to blue and red light in the superior VF, or any combination thereof. Each possibility is a separate embodiment.

According to some embodiments, for detecting brain tumor and/or assessing the progression or monitoring of the tumor condition for brain tumors contacting the optic tract and/or mid-brain, one or more of the following parameters may be used: significantly lower PPC values in nasal and central-temporal VF test targets in the right eye in response to dim blue light, significantly lower PPC values in the nasal and central-nasal test target in the left eye in response to dim blue light, faster pupil recovery (larger PPR values) in response to bright blue light across the VF in the right eye, larger PPR values in response to bright blue light in nasal and central VF locations in the left eye, or any combination thereof. Each possibility is a separate embodiment.

According to some embodiments, for detecting brain tumor and/or assessing the progression or monitoring of the tumor condition for intra-axial brain tumors involving the optic radiation, one or more of the following parameters may be used: significantly larger PPR values in response to bright blue light stimulus at all VF test points in the right eye, significantly lower PPC in nasal, central-temporal and/or temporal locations in the right eye in response to dim blue light, or any combination thereof. Each possibility is a separate embodiment.

According to some embodiments, for detecting brain tumor and/or assessing the progression or monitoring of the tumor condition for brain tumors with no apparent contact with the vision or PLR systems, the following parameters may be used: significantly larger PPR values compared with controls in the right eye in the nasal VF test target in response to bright blue light stimulus.

According to some embodiments, as exemplified herein, the systems, devices and methods disclosed herein allow the objective and non-invasive diagnosis and monitoring of various brain lesions. According to some embodiments, the PLR for red light (mainly mediated by cones) is not significantly affected in tumor patients. According to some embodiments, significantly attenuated rod-mediated PLRs are indicative of patients with tumors contacting the PLR and vision pathways. According to some embodiments, aberrant sustained melanopsin-mediated PLR are indicative of tumor patients. According to some embodiments, normal MCV and LMCV parameters in brain tumor patients, as compared to control subjects.

According to some embodiments, the systems, devices and methods disclosed herein allow identification or detection of focal intracranial lesions by determining localized melanopsin-mediated sustained PLR for high intensity blue stimulus. In some embodiments, detection of brain tumors involving the visual pathway may further include identifying a decline (attenuation) in the rod-mediated PLR (i.e., response to dim blue light).

According to some embodiments, the systems, devices and methods can be used for detecting, diagnosing and/or assessing of the function of visual pathways mediating the PLR in PTC patients, as well as treatment response. According to some embodiments, analysis of the PLR for focal blue and red light stimuli provides diagnosis and/or assessment of the function of visual pathways mediating the PLR in PTC patients. According to some embodiments, analysis of the PLR for focal blue and red light stimuli provides diagnosis and/or assessment of the treatment response in PTC patients.

According to some embodiments, for detecting pseudotumor cerebri (PTC) and/or assessing the progression or monitoring of the PTC condition, one or more of the following parameters may be used: attenuated PPC, attenuated MRV, or both. Each possibility is a separate embodiment. In some embodiments, such parameters may be significantly lower in PTC subjects as compared to control (for example, ≥4 SD lower than mean of controls).

According to some embodiments, for detecting PTC response to treatment and/or assessing the progression or monitoring of the treatment efficacy, improvement in pupil responses to blue stimuli (but not red), mostly in the center of the visual fields are exhibited following treatment (for example, with acetazolamide).

According to some embodiments, the systems, devices and methods can be used for detecting, diagnosing and/or assessing stroke condition in s subject.

According to some embodiments, for detecting stroke and/or assessing the progression or monitoring the stroke condition, one or more of the following parameters may be used: lower PPR in response to high intensity (for example, about 6000 cd/m^2) and long duration (for example, about 8 sec) blue light in the center and peripheral VF, lower PPC and lower MRV in peripheral locations in response to low intensity (for example, about 170 cd/m^2) blue light, or any combination thereof. Each possibility is a separate embodiment. In some embodiments, in stroke condition, in response to red light (intensity of about 100 cd/m^2), normal PPC, normal MCV, normal LMCV and/or normal MRV are detected across the VF. In this condition, normal refers to a control subject, not having a stroke.

In the description and claims of the application, the words "include" and "have", and forms thereof, are not limited to members in a list with which the words may be associated.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

As used herein, the term "about" may be used to specify a value of a quantity or parameter to within a continuous range of values in the neighborhood of (and including) a given (stated) value. According to some embodiments, "about" may specify the value of a parameter to be between 80% and 120% of the given value. According to some embodiments, "about" may specify the value of a parameter to be between 90% and 110% of the given value. According to some embodiments, "about" may specify the value of a parameter to be between 95% and 105% of the given value.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

EXAMPLES

Example 1-Early Detection of Alzheimer Disease (AD) Using Multifactorial Analysis of PLRs to Chromatic Light Stimuli Materials and Methods:

Participants: The study included 186 participants, of which 125 were offspring of AD patients (FH+) and 61 age-matched controls (FH−), ages 44-71. FH+ is defined as an offspring of a parent, with a diagnosis of probable AD, having the onset of disease before age of 70 in the father, or before age 75 in the mother. FH− is defined to be an offspring of a father aged over 70 and a mother aged over 75, who are cognitively normal (on participant acceptance, or at the age of death). Parental AD was determined based on medical records and the Dementia Questionnaire. The DQ questionnaire was administered to potential participants regarding their parents. The diagnosis of probable AD was given by a review of both the medical records and the questionnaire, according to NINCDS-ADRDA criteria. If the diagnosis of parental probable AD or defining that the parent had normal cognition (i.e; does not suffer from dementia and its subtypes, MCI, subjective cognitive impairment or decline, or use of dementia related medication) could not be made, because of partial information, the offspring was excluded from the study. The study included only participants that do not show symptoms of AD or cognitive impairment themselves, using cognitive assessment tests as detailed below.

Each participant was tested using multifocal chromatic pupillometer in both eyes, left (eye-0) and right (eye-1), resulting in a sum of 372 eyes, of which 250 eyes were FH+ and 122 were FH−.

Participants cognitive assessment: All patients went through a cognitive evaluation, which included the following tests: (1) The Rey Auditory Verbal Learning Test (RAVTL), testing for immediate and delayed recall and recognition, (2) The Digit Symbol test, (3) parts A and B of the trail Making test, and (4) Forward and backwards Digit Span.

Pupillometer: PLR was tested using a chromatic multifocal pupillometer that enables early detection and mapping of functional defects in iPRGCs and in rod and cone photoreceptors in different locations of the retina and differential identification of the affected visual pathways (i.e., rod, cone photoreceptor or intrinsic ipRGC activation).

Chromatic Multifocal Pupillometry: The pupillometer included a Ganzfeld dome apparatus with 76 LEDs (2 mm$^2$ diameter). Each eye is tested separately, and non-tested eye is occluded to prevent PLR due to light perception in the contralateral eye. Participants are asked to fixate on a dim white fixator at the center of the dome. Red (624 nm) and blue (485 nm) light stimuli are presented from individual LEDs for 1 second. Pupil diameter is captured for 4 sec by a computerized infrared high-resolution video camera. The software automatically measures pupil diameter for each stimulus and calculates the pupil constriction percentage, maximal constriction and dilation velocity, and latency of maximal constriction and dilation velocity in response to each stimulus at each location. The pupillometer outcome is the pupil constriction percentage in response to low intensity blue and red-light stimuli.

Multiple pupil response parameters were calculated and analyzed for both eyes of each participant: (1) area of curve (AC), (2) maximal contraction acceleration (MCA), (3) maximal contraction deceleration (MCD), (4) maximal contraction velocity (MCV), (5) latency of MCA (LMCA), (6) latency of MCD (LMCD), (7) latency of MCV (LMCV), (8) maximal relaxation acceleration (MRA), (9) maximal relaxation deceleration (MRD), (10) maximal relaxation velocity (MRI), (11) latency of MRA (LMRA), (12) latency of maximal relaxation deceleration (LMRD)), (13) latency of MRV (LMRV), (14) Latency of maximal pupil response (from light flash to max contraction, LMP), (15) Max_Pupil_Contraction (Max_PC), (16) Min_Pupil_Size (Min_PS—for blue light only), (17) pupil response latency (PRL), and (18) percentage of pupil maximal relaxation (PPR or PRP).

Each one of the above parameters was calculated using red and blue light independently, resulting in a total of 35 independent parameters.

Retinal assessments: All subjects went through a complete ophthalmologic examination to exclude ocular pathologies (e.g., Glaucoma) including assessment of best-corrected visual acuity (BCVA), color vision (Farnsworth D15 test), pupillary reflexes, intraocular pressure (Goldmann applanation tonometry) and slit lamp biomicroscopy of the anterior and posterior segment and dilated fundus examination. Eyes with BCVA of 20/50 or lower, or ocular pathologies were excluded.

Statistical Analysis and Machine Learning Algorithms

Using the chromatic multifocal pupillometer, the significance of each of the 34 pupillometer parameters was analyzed for the purpose of classification of AD family history.

Each pupillometer parameter produced 54 independent features (variables), based on the pupillometer values triggered at 54 different illuminated spots in the retina.

Reference is now made to FIG. 8, which shows a schematic illustration of a feature vector extraction process of parameters, from a patient's eye. In the Example shown in FIG. 8, a pupil response latency to red light (R_PRL) vector is generated. The process is repeated for both eyes of each patient.

Next, using the AdaBoost algorithm, multiple classifiers were trained, where each classifier received a distinct set of 54 features corresponding to a single pupillometer parameter. The process was repeated for each eye independently.

For each eye, 17 models were trained based on red light, and 18 models were trained based on blue light, resulting in a total of 35 different models. It is noted that a classifier may be trained using a combination of inter parameter features.

Missing data was imputed, using the mean substitution strategy that assigns the overall respondent mean to all missing responses and is the deterministic degenerate form of the linear function with no auxiliary variables. All features were rescaled using min-max normalization to a range of [0,1].

Discrimination performance of the classification model was measured by AUC which is the area under the receiver operating characteristic curve (ROC).

To assess the AUC confidence interval, non-parametric resampling was used. The general algorithm for a non-parametric bootstrap applied includes: (1) Sample n observations randomly with replacement from the 186 samples (n=186*80%=149) to obtain a bootstrap dataset; (2) Train a classifier using the bootstrap version of the data, test it on the observations that are not part of the bootstrap dataset, to conclude an AUC measure; (3) Repeat steps 1 and 2 100 times, to obtain an estimate of the confidence interval.

Reference is made to FIG. 9, which shows an illustration of producing a confidence interval (CI) for a single pupilometer parameter (in this case, R_PRL). Given the full set of samples, a training set is created by sampling with replacement, whereas the test set is comprised of all the samples that were not picked in the training set. The model is evaluated is evaluated on the test set (average size of 88 distinct samples) using the AUC the metric. The process is repeated N=100 times to infer a 95% CI. as detailed above herein.

Results:

The AUC of the ROC curve and the curves themselves for each one of the 70 trained models are presented in Table 1B below.

Confidence Interval (CI), Mean±STD AUC values of ROC over, using 100 iterations, for each one of the trained models. Each row in the table 1B indicates one pupillometer parameter. Each parameter appears twice, for dim Blue or Red light, respectively.

TABLE 1B

| | | Left Eye | | Right Eye | |
|---|---|---|---|---|---|
| | PLR parameter | AUC-ROC 95% CI | AUC-ROC: Mean ± SD | AUC-ROC 95% CI | AUC-ROC: Mean ± SD |
| Dim blue | AC | [0.41, 0.68] | 0.548 ± 0.069 | [0.34, 0.60] | 0.473 ± 0.065 |
| | LMCA | [0.66, 0.90] | 0.790 ± 0.061 | [0.60, 0.85] | 0.728 ± 0.065 |

TABLE 1B-continued

|  | PLR parameter | Left Eye | | Right Eye | |
|---|---|---|---|---|---|
|  |  | AUC-ROC 95% CI | AUC-ROC: Mean ± SD | AUC-ROC 95% CI | AUC-ROC: Mean ± SD |
|  | LMCD | [0.68, 0.91] | 0.809 ± 0.058 | [0.63, 0.87] | 0.756 ± 0.063 |
|  | LMCV | [0.35, 0.62] | 0.491 ± 0.070 | [0.35, 0.63] | 0.491 ± 0.070 |
|  | LMP | [0.54, 0.81] | 0.682 ± 0.069 | [0.55, 0.82] | 0.702 ± 0.068 |
|  | LMRA | [0.49, 0.76] | 0.627 ± 0.069 | [0.45, 0.71] | 0.586 ± 0.068 |
|  | LMRD | [0.48, 0.76] | 0.626 ± 0.072 | [0.46, 0.72] | 0.596 ± 0.068 |
|  | LMRV | [0.41, 0.69] | 0.558 ± 0.070 | [0.37, 0.63] | 0.505 ± 0.067 |
|  | MCA | [0.35, 0.61] | 0.483 ± 0.067 | [0.34, 0.60] | 0.471 ± 0.065 |
|  | MCD | [0.37, 0.62] | 0.495 ± 0.065 | [0.36, 0.63] | 0.506 ± 0.071 |
|  | MCV | [0.39, 0.65] | 0.525 ± 0.065 | [0.32, 0.58] | 0.451 ± 0.066 |
|  | MRA | [0.39, 0.65] | 0.520 ± 0.066 | [0.40, 0.68] | 0.543 ± 0.069 |
|  | MRD | [0.42, 0.70] | 0.567 ± 0.070 | [0.36, 0.63] | 0.493 ± 0.069 |
|  | MRV | [0.36, 0.62] | 0.490 ± 0.066 | [0.33, 0.59] | 0.466 ± 0.067 |
|  | PPC | [0.41, 0.68] | 0.549 ± 0.067 | [0.35, 0.62] | 0.486 ± 0.069 |
|  | PRL | [0.79, 0.98] | 0.903 ± 0.051 | [0.77, 0.95] | 0.873 ± 0.048 |
|  | PRP | [0.36, 0.64] | 0.502 ± 0.070 | [0.36, 0.63] | 0.500 ± 0.068 |
| Dim | AC | [0.36, 0.63] | 0.489 ± 0.068 | [0.38, 0.65] | 0.519 ± 0.067 |
| Red | LMCA | [0.61, 0.84] | 0.735 ± 0.061 | [0.54, 0.80] | 0.683 ± 0.067 |
|  | LMCD | [0.65, 0.89] | 0.782 ± 0.060 | [0.58, 0.84] | 0.720 ± 0.065 |
|  | LMCV | [0.34, 0.59] | 0.466 ± 0.065 | [0.36, 0.62] | 0.490 ± 0.066 |
|  | LMP | [0.49, 0.77] | 0.639 ± 0.072 | [0.63, 0.90] | 0.782 ± 0.072 |
|  | LMRA | [0.49, 0.76] | 0.639 ± 0.068 | [0.44, 0.71] | 0.585 ± 0.068 |
|  | LMRD | [0.49, 0.76] | 0.635 ± 0.069 | [0.41, 0.69] | 0.553 ± 0.069 |
|  | LMRV | [0.35, 0.62] | 0.488 ± 0.069 | [0.38, 0.65] | 0.522 ± 0.070 |
|  | MCA | [0.37, 0.64] | 0.510 ± 0.068 | [0.36, 0.63] | 0.497 ± 0.068 |
|  | MCD | [0.39, 0.65] | 0.526 ± 0.068 | [0.38, 0.65] | 0.517 ± 0.066 |
|  | MCV | [0.41, 0.69] | 0.564 ± 0.072 | [0.37, 0.62] | 0.497 ± 0.068 |
|  | MRA | [0.37, 0.63] | 0.501 ± 0.065 | [0.39, 0.67] | 0.531 ± 0.073 |
|  | MRD | [0.40, 0.67] | 0.540 ± 0.070 | [0.35, 0.61] | 0.482 ± 0.065 |
|  | MRV | [0.33, 0.59] | 0.462 ± 0.065 | [0.36, 0.62] | 0.489 ± 0.066 |
|  | PPC | [0.35, 0.61] | 0.478 ± 0.065 | [0.37, 0.63] | 0.501 ± 0.067 |
|  | PRL | [0.73, 0.95] | 0.852 ± 0.056 | [0.69, 0.90] | 0.813 ± 0.056 |
|  | PRP | [0.38, 0.66] | 0.528 ± 0.071 | [0.38, 0.64] | 0.513 ± 0.069 |

As detailed in Table 1B, and as shown in FIGS. 10A-B, FIGS. 11A-B and FIG. 12, the models of B_PRL and R_PRL achieved very high discriminative performances with AUC of 0.90±0.051, CI of [0.81, 0.98] (left eye), 0.87±0.048, CI of [0.77, 0.95] (right eye) for B_PRL (PRL parameter measured using dim blue light) and of 0.85±0.05, CI of [0.75, 0.93] (left eye), 0.81±0.06, CI of [0.68, 0.91] (right eye) for R_PRL (PRL parameter measured using red light).

Other models that achieved high discriminative values (AUC ROC≥0.7) for both eyes were B_LMCA, R_LMCA, B_LMCD, and R_LMCD. B_LMP and R_LMP achieved high discriminative values only for the right eye.

FIG. 10 shows the mean AUC for each pupilometer parameters (bars) and the STD values (black lines) for each one of the pupilometer parameters for the left eye (top) and right eye (bottom), measured using the bootstrapping process (depicted in FIG. 9).

The parameters that showed the highest AUC values are parameters related to the latency of the pupil light reflex, suggesting an effect on the afferent arm of the pupil response.

In FIG. 11A, the two most prominent parameters (B_PRL, R_PRL) were focused on, and the weights given by the machine-learning model to each one of the 54 eye spots are visualized. The relative weight given by the machine-learning model to each one of the 54 eye spots. The weights are averaged over the 100 trials that were used to produce the 95% CI, as depicted above. Upper, bottom rows show the weights for B_PRL, R_PRL parameters, respectively, whereas left, right columns show results for left and right eyes, respectively. Color coding indicates higher weights using darker values.

FIG. 11B shows the relative weight given by the machine-learning model to each one of the 54 retinal test-targets for Pupil Response Latency (PRL) in the left (a,c) and right eye (b,d) for dim blue (a,b, B_PRL) and dim red light stimuli (c,d, R_PRL). The weights were averaged over the 2000 trials that were used to produce the 95% CI, as depicted. Color-coding indicates higher weights in darker colors. White asterisks indicate the targets with highest weight for the dim blue light (a,b). The transient pupil response latency (PRL) for dim blue light achieved Area Under the Curve Receiver Operating Characteristic (AUC-ROC) of 0.90±0.051 (left-eye) and 0.87±0.048 (right-eye). Parameters associated with the contraction arm of the rod and cone-mediated PLR were more discriminative compared to parameters associated with the relaxation arm and melanopsin-mediated PLR. Significantly shorter PRL for dim blue light was measured in the FH+ group in two peripheral test targets in the temporal visual field in right eye that had highest relative weight in the machine learning algorithm (mean±standard error, SE 0.449 s±0.007 s vs. 0.478 s±0.010 s, $p=0.038$).

FIG. 12 shows the distribution of the different AUC values within the confidence interval for the most prominent parameter (B_PRL), in the left eye CI [80.63,97.97] mean+−std: 90.51+−4.87, and right eye CI [76.84,94.48] mean+−std: 88.11+−4.91. CI: 95% Confidence Interval based on 100 iterations. For each eye there are 95 horizontal lines, each one corresponds to a different AUC value that is a result of an independent experiment (a total of 100 experiments for each eye).

Thus, the results presented above demonstrate that chromatic pupilloperimetry based learning models were able to predict the existence or non-existence of AD family history with performance of ROC AUC of 0.903±0.051, 95% CI of [0.79, 0.98] (left eye) and 0.873±0.048, 95% CI of [0.77, 0.95] (right eye). It is to note that Chromatic pupilloperimetry parameters associated with the contraction arm of the PLR were more discriminative than parameters associated with the relaxation arm.

Collectively, the results show that AD family history status can be predicted with high discriminative values using chromatic pupilloperimetry PLR parameters. This demonstrates that subtle changes in pupil contraction, associated with AD could be detected decades before the onset of Alzheimer Disease clinical symptoms using a simple non-invasive test.

Example 2—Early Detection of Parkinson Disease (PD) Using Multifactorial Analysis of Chromatic Light Stimuli Presented at Central and Peripheral Retinal Locations Typically, the major pathological findings in the brain of PD patients are a selective loss of dopaminergic neurons in substantia nigra pars compacta and the presence of cytoplasmic eosinophilic inclusions immunoreactive to α-synuclein, called Lewy bodies. Loss of dopamine in the nigrostriatal pathway is responsible for the majority of the motor symptoms that are the hallmark of the disease. However, the pathological process is not restricted to the substantia nigra but involves additional brain regions such as olfactory bulbs, lower brainstem and nuclei and more structures outside of the brain. As the disease progresses, the cardinal motor symptoms of PD as well as a myriad of nonmotor nondopaminergic symptoms including cognitive decline, psychiatric disturbances, autonomic failure and sleep and sensory disturbances, severely reduce the patient's quality of life and functioning. In addition to α-synuclein-associated neurodegeneration, cerebrovascular mechanisms may be involved in PD pathophysiology, contributing to disease progression. Dopamine is a key neuromodulator in the retina. It is released by a unique set of amacrine cells present in the inner retinal layers and activates dopamine receptors distributed throughout the retina including the retinal pigment epithelial cells, photoreceptors, Mueller glial cells, bipolar cells, horizontal cells, and ganglion cells. Dopamine modulates the receptive fields of the retinal ganglion cells and thus affects spatial contrast sensitivity and color vision, and plays a key role in light adaptation and regulation of circadian rhythm by regulating melatonin production. Multiple dopamine-dependent mechanisms result in an increased signal flow through the cone pathway and suppression of rod circuits during day time. At night time, dopamine enhances the rod visual pathway, facilitating dim-light vision. Dopamine also has multiple trophic roles in retinal function related to cell survival. Post-mortem studies demonstrated low levels of retinal dopamine and apoptosis of dopaminergic retinal neurons (DACs), as well as accumulation of phosphorylated α-synuclein in the retina. Dopamine depletion is accompanied by decreased color vision, reduced light sensitivity, and reduced contrast sensitivity. Optical Coherence Tomography (OCT) imaging suggested retinal structural changes. Some studies reported thinning of the retinal inner layers including the retinal nerve fibre layer (RNFL, containing the axons of the retinal ganglion cells that form the optic nerve), ganglion cell layer (GCL, containing the ganglion cell bodies) and Inner plexiform layer (IPL, containing the ganglion cell dendrites, amacrine cells and bipolar cell exons) in PD patients. Others reported swelling of photoreceptors and retinal ganglion cell layers.

Methods: PD patients (mean age±standard deviation: 61.29±11.54 years) and age-similar healthy controls (65.07±11.22 years, p=0.29) were tested. The pupillary responses (PLR) for small) (0.43° red and blue light stimuli presented at central) (4.2° and peripheral) (21° visual field locations were measured using a chromatic pupilloperimeter under mesopic light adaptation conditions, as detailed in Example 1.

Subjects underwent a complete neurological evaluation along with the MDS-Unified Parkinson's Disease Rating Scale (MDS-UPDRS), Montreal Cognitive Assessment (MoCA), sleep evaluation according to PD sleep scale (PDSS-2), a complete ophthalmic exam, color vision test, best-corrected visual acuity, refraction and Spectral-Domain Optical Coherence Tomography (SD-OCT) imaging.

Seventeen PD patients (mean age±standard deviation: 61.29±11.54 years) and 26 age-similar healthy controls (65.07±11.22 years, p=0.29) were tested for PLR.

The results indicated that the rod-mediated maximal percentage of pupil contraction (PPC) was significantly lower at central and peripheral retinal locations in PD patients compared with controls (all p<0.04). Cone-mediated PPC was less affected. The sustained, intrinsic melanopsin-mediated pupil response recovery (PPR) in the central retina was significantly faster in PD compared to controls (p=0.01).

Additionally, the focal PLRs of 3 mild PD patients (69.6±3.1 years) and 19 age-similar controls (69.6±7.5) were tested. A significantly lower percentage of pupil contraction (PPC) was recorded in the central retina in response to focal blue light stimulus (rod-mediated PLR) in PD patients compared with controls (7.0±3.0% vs. 17.7±1.7%, p=0.03).

By contrast, the PLR for red light (cone-mediated) measured in this location did not significantly differ between groups (11.9±2.7% vs. 17.1±1.7%, p=0.25).

Next, 17 PD patients and 30 Controls (age- and gender-similar), at age of 34-72 years were tested for PLR by stimulation with dim and bright Red (624 nm) and blue (485 nm) light and blue light, in both eyes, at four central and four peripheral targets of the visual field.

The results presented in FIG. 13 and in Table 2 show that attenuated melanopsin-mediated PPR is observed in PD patients in central VF in response to bright blue light.

TABLE 2

Group Statistics

|  |  | N | Mean | Deviatio | p value |
|---|---|---|---|---|---|
| B-PRP | Control | 23 | .750 | .081 |  |
|  | PD | 13 | .820 | .068 | 0.01* |
| R-PRP | Control | 24 | .866 | .079 |  |
|  | PD | 12 | .894 | .055 | .230 |

The results presented in FIG. 14A, FIG. 14B and in Table 3 below show that attenuated cone-mediated PPC and MCV in central VF (i.e., response to red light) is observed in PD patients.

TABLE 3

|  |  | Mean | SD | p-value |
|---|---|---|---|---|
| R_PPC | Control | 13.0 | 6.0 | |
|  | PD | 6.6 | 3.9 | 0.0001*** |
| R_MCV | Control | 20.8 | 9.7 | |
|  | PD | 12.2 | 7.1 | 0.0016*** |

The results presented in FIG. 15A, FIG. 15B, FIG. 15C and in Table 4 below show that attenuated rod-mediated PPC, AC and MCA in central VF and peripheral VF (i.e., response to dim blue light) is observed in PD patients.

TABLE 4

|  |  | Mean | SD | p-value |
|---|---|---|---|---|
| B_PPC | Control | 14.5 | 7.1 | |
|  | PD | 9.6 | 5.4 | 0.016* |
| B_AC | Control | 0.13 | 0.07 | |
|  | PD | 0.07 | 0.05 | 0.001** |
| B_MCA | Control | 3.4 | 1.9 | |
|  | PD | 2.4 | 1.7 | 0.013* |

The results indicate that the intrinsic and extrinsic light responses in ipRGCs are differentially affected at central and peripheral retinal locations in PD patients and are further differentiated between rods and cones.

Collectively, the results clearly demonstrate that various PLR parameters are indicative of PD condition and can thus serve as early sensitive biomarkers for PD.

Example 3—Differential PLR Parameters in Multiple Sclerosis (MS) Patients

Three chronic MS patients (3F & 1M, mean±SD: 33.5, 12.2 YO) and 26 healthy age-matched controls (15F & 11M, 35.4±12.4 YO) were tested for PLR under different conditions, as detailed in Example 1, as primary end point.

The subjects were further tested (second endpoint) by Humphrey 24-2 Visual fields, BCVA, SD-OCT, Color vision and VEP tests.

The results are presented in FIGS. 16-24. FIGS. 16-18 show the results with respect of the PPC parameter as measured in various locations of the visual field in the left eye (OD) or right eye (OS) of control subjects (FIG. 16), or MS patients (FIGS. 17-18).

FIGS. 19-21 show the results with respect of the MRV parameter as measured in various locations of the visual field in left eye (OD) or right eyes (OS) of control subjects (FIG. 19), or MS patients (FIGS. 20-21) in response to blue or red light irradiation.

FIGS. 22-24 show the results with respect of the MCV parameter as measured in various locations of the visual field in left eye (OD) or right eyes (OS) of control subjects (FIG. 22), or MS patients (FIGS. 23-24) in response to blue or red light irradiation.

The results clearly show that the PPC and MRV for red (intensity of about 1000 cd/m^2) and dim blue (intensity of about 170 cd/m^2) are significantly lower at the peripheral visual field targets/locations in MS patients as compared with controls. The results further show that that MCV for both red and blue colors is reduced across the entire VF (and not only in periphery).

Chronic MS patients presented with attenuated rod and cone-mediated PLR at mid-peripheral retinal locations even though their Humphrey perimetry results were normal, suggesting a possible chronic damage to retinal circuits at those locations that are undetected by conventional perimetry.

The results clearly demonstrate that differential PLR parameters can be used to identify MS is subjects and may be used as predictors of the condition.

Example 4 Chromatic Pupilloperimetry for Objective Diagnosis and Monitoring of Optic Neuritis The purpose of the study was to characterize rod-, cone- and melanopsin-mediated pupil responses (PLR) for small focal chromatic light stimuli presented in peripheral and central retinal locations in optic neuritis patients.

Methods: Eleven acute optic neuritis (ON) patients (8F and 3M, mean age±standard deviation: 31±9 years) 7 females and 3 males, and 26 age-similar healthy controls (35.4±12.4 years, p=0.42) 15 females and 11 males, were tested at several visits: V1 (ON attack (within 48 h of diagnosis), V2 (End of steroid treatment (+5 d), V3 (+1 mo), V4 (+3 months).

The pupil light responses (PLR) for small (0.43°) red and blue light stimuli (peak 485 nm and 625 nm, respectively) presented at 54 locations of a 24-2 visual field were recorded. In addition, the melanopsin-mediated sustained pupil responses (percentage of pupil recovery, PPR) were evaluated at central and peripheral VF locations. All patients underwent Optical Coherence Tomography (OCT) imaging, standard perimetry (Humphrey SITA Standard protocol) and their best corrected visual acuity (BCVA) was determined.

Results: The results are presented in FIGS. 25-30, FIGS. 31A-F and FIG. 32 which show an attenuated rod- and cone-mediated PPC during an ON attack (FIG. 25), Pupil response for blue light is reduced in ON patients and correlates with the severity of perimetry defect (FIG. 26), Progression analysis of the PLR and visual function in a representative patient with ON following treatment (FIG. 27), Progression analysis of the PLR and visual function in a representative patient with ON following treatment with methylprednisolone (Solu-Medrol) (FIG. 28) and a ROC analysis of the results (FIG. 29). FIGS. 30A-B show a ROC analysis of the results of the PPR for high intensity blue light in ON subjects; FIG. 30A shows that Significantly higher PRP in eyes with optic neuritis and fellow eye (NON) or healthy eyes (control). The ON eye is more affected than fellow eye. FIG. 30B shows ROC analysis with AUC of 100% for detection of ON using PPR for high intensity blue light.

FIGS. 31A-F shows an Assessment of changes in focal PLR at various retinal locations during ON and following treatment. This representative 18 year-old male was tested during an acute ON episode (FIG. 31A, FIG. 31C, FIG. 31E) and following 5 days of SOLU-MEDROL treatment (FIG. 31B, FIG. 31D, FIG. 31F). The patients had visual acuity of 0.3 during the ON episode which improved following treatment to 0.18 (logMAR ETDRS). Diminished PLR for blue light throughout the VF (FIG. 31C) correlated with Humphrey perimetry during the ON (FIG. 31A) improved following treatment (FIG. 31D). PLR for red light was less affected (FIG. 31E) and did not substantially change following treatment (FIG. 31F). Each number in the pupilloperimeter "map" represents the percentage of pupil contraction (PPC) measured in that retinal location. Color coding was set to resemble the Humphrey perimeter's output, with a white color for "normal" values (based on the mean of age-matched controls in each test point location) and darker grey colors for values that were lower than normal. Darkest color was used for test points in which the PPC was lower than 5 SEs away from the mean of controls in those points. Yellow color, denotes targets with higher PPC than the mean of controls.

It is to note that, during an ON episode, significantly diminished melanopsin-mediated PLR was recorded in peripheral retina in eyes with ON (n=8) compared with healthy eyes (n=23, p=0.00015). The melanopsin-mediated PLR at peripheral retina differentiated between eyes with ON and controls with high sensitivity and specificity (ROC AUC=91.3%, p=0.01). In addition, substantially attenuated rod-mediated PLR was recorded during ON episodes in the affected eyes in areas with VF defects identified by Humphrey perimetry (a representative patient is presented in FIGS. 31A, and 31C). Recovery of the rod-mediated pupil responses was observed, mostly in central retinal locations but not in mid-peripheral locations, following SOLU-MEDROL® (methylprednisolone sodium succinate) treatment (FIG. 31D). The cone-mediated PLR was reduced in mid-peripheral retinal locations during the ON episode, but it was less severely affected compared to the rod-mediated PLR (FIG. 31F). The cone-mediated PLR did not significantly change following SOLU-MEDROL treatment (FIG. 31E).

Furthermore, chromatic pupilloperimetry measures correlated with severity of VF loss during ON attack, as shown in FIG. 32, which presents Chromatic pupilloperimetry measures correlated with severity of VF loss during ON attack. Four subjects (3 males, M and 1 female, F) at indicated ages (years old, YO) were tested. Top row-chromatic pupilloperimetry maps for the PPC parameter. Bottom row-Humphrey perimetry results.

Thus, as shown, attenuated melanopsin-mediated PPR (in response to bright blue light) was recorded in the peripheral VF in ON eyes compared to controls, with ROC AUC=91.1% (p=0.001). The rod and cone-mediated percentage of pupil contraction (PPC) in response to red and blue light) was lower by more than 2 standard errors (SEs) from the mean of controls in majority of visual field test targets (mean±SE: 60%±12% and 55%±10% of test targets, respectively) in optic neuritis eyes, even in patients with normal BCVA. Furthermore, even though normal BCVA and VEP P100 were recorded in the fellow eyes, substantially lower rod- and cone-mediated PPC values (lower than 2SEs from the mean of controls) were identified in the fellow eyes of all patients (mean±SE: 33%±9% and 30%±7% of test targets, respectively). Peripapillary OCT of both eyes was within normal limits.

Collectively, the results clearly demonstrate that substantially lower rod-cone- and melanopsin-mediated PLR are recorded in ON and fellow eyes of patients, even in eyes with normal BCVA. The melanopsin-mediated pupil response for blue light at the peripheral retina thus can be used as highly sensitive surrogate functional biomarker for detection of ON.

Example 5—Diagnosis of Brain Pathology in Fragile X Carries

5 Female, healthy controls (63-79 YO, Mean±SD: 70±5 YO, p=0.62) and 6 Female carriers (of which n=3 were analyzed, 67-70, Mean±SD: 69±2 YO, 3 others were younger <47YO) were tested by pupillometry analysis, as detailed in Example 1. The subjects were further subjective tested by visual contrast sensitivity and vernier threshold measurements.

The results are presented in FIG. 33A and FIG. 33B. As shown, attenuated PPR response to bright blue in peripheral region of the visual field is observed in fragile X carrier. In other words, attenuated melanopsin PPR is found in fragile X-carriers. Further, the results show that attenuated LMCA in response to blue and red light in central and peripheral field is observed in fragile X-carriers. In other words, attenuated LMCA in rods and cones is observed in fragile X-carriers.

Collectively, the results suggest that cognitive decline associated with fragile x carriers can be early diagnosed by mapping the retinal circuit function mediating the pupil light responses at various retinal locations in response to stimuli presented at various wavelengths.

Example 6—Diagnosis and Monitoring of Patients With Brain Tumors and/or Focal Intracranial Pathology The purpose of the study was to identify rod-, cone- and melanopsin-mediated pupil light responses (PLR) for small focal chromatic light stimuli presented in peripheral and central retinal locations in patients with brain tumors.

To this aim, 18 patients and 32 age matched controls were tested.

The brain edema group [6 females, 12 males ages 56.94±13.12 (mean±SD)] was recruited based on a clinical diagnose of Brain tumor made by a board-certified Neurosurgeon based on Pathology clinically and radiologically expected to affect ICP or compress the optic pathway. Exclusion criteria were a concurrent ocular disease and any other condition affecting the pupil response. Data were recorded for all patients including gender, genetic mutation, Snellen BCVA, and 24-2 Humphrey perimetry.

Study Protocol

Each patient was examined within 72 hours before surgical procedure, and within 1 week, 6 weeks and 3 months following surgery.

Pupil Response Measurement:

The light stimuli were presented 330 mm from the patient's eye. The study was performed in a dim lit room (0.04 cd/m2). The non-tested eye was covered with an eye patch. For mesopic background conditions, a uniform, white background light at intensity of 0.04 cd/m2 was used. Following 2-minute adaptation for either metopic conditions, small chromatic light stimuli (Goldmann size III, 0.43°) were presented from LEDs in different VF test points within the 30° VF. To determine the optimal stimulus light intensity and duration required for focal eliciting rod-, cone- and melanopsin mediated pupil light reflex (PLR), the PLR was recorded at 3 light intensities, in different locations and 2 wavelengths. The PLR for red light (625±15 nm) was tested first at each of the VF locations, followed by testing the PLR for blue light (485±20 nm) at the same light intensity using the same sequence. Light intensities were determined by measurement with LS-100 luminance meter (Konica Minolta). All stimulus light intensities tested were well below the recommendations of outlined in IEC 62471 on photobiological safety of lamps and lamp systems, and ICNIRP Guidelines on limits of exposure to incoherent visible and infrared radiation. Pupil diameter was recorded in real time by a computerized infrared high-resolution camera at a frequency of 30 Hz. A custom software was used to analyze the PLR parameters.

Rod- and Cone-Mediated PLR Examination Conditions

To assess the rod- and cone-mediated PLR, stimulus duration was between 1 second, and the inter-stimulus interval was 4 seconds, respectively. Stimulus intensity was 1000 cd/m2 for red light stimulus and 170 cd/m2 for blue light stimulus.

Melanopsin-Mediated PLR Examination Conditions

To assess the melanopsin-mediated PLR, red and blue light stimuli (6000 cd/m2) were presented for 8 seconds and the inter stimulus interval was of 16 seconds.

Brain Edema Protocol

Subjects were adapted for mesopic light conditions for two minutes prior to testing and the test was performed in a dark room. Light stimuli (0.43 degree, Goldmann size III) were presented in a 30 degrees VF from 6 VF targets using rod and Cone-mediated PLR examination conditions. To assess the melanopsin-mediated PLR, three VF targets were examined with blue light intensity. Both of the eyes were examined separately. The non-tested eye was occluded. Based on our previous studies, several PLR parameters were examined including: Percentage of Pupil Contraction (PPC); Maximal Contraction Velocity (MCV); Latency of MCV (LMCV); Maximal relaxation velocity (MRV); Latency of MRV (LMRV), PPR.

SD-OCT-Spectral Domain Optical Coherence Tomography

Spectral optical coherence tomography (SD-OCT) enables in vivo, real-time, noncontact scanning of the eye and provides cross-sectional and volumetric images with a resolution approaching of histology. SD-OCT testing was performed to exclude retinal diseases in controls and quantify evaluate retinal and optic nerve structure in the patients. Retinal nerve fiber layer thickness, optic nerve head, and macular ganglion cell layer thickness were obtained using a Heidelberg Spectralis SD-OCT (Heidelberg Engineering, Germany). The measurements were taken using a 3.4 mm circular scan around the optic nerve with the device's standard protocol and segmentation algorithm. All scans were acquired by an experienced operator and were reviewed for correct centering and segmentation by an independent operator.

Statistical Analysis

Statistical analysis was performed using the IBM SPSS Statistics for Windows, Version 24.0. Armonk, NY: IBM Corp. Age and gender of the study groups were compared using t-test and fishers' exact test, respectively. Test points in which the device failed to record the pupil response due to blinking were not included in the analysis.

Paired t-test was performed to compare between controls and patients at different VF targets and parameters with Bonferroni correction for multiple comparisons. The area under the ROC curve (AUC) and p-value were calculated for PPR, PPC, MRV, MCV in response to blue and red light for each test points.

Results

Pupil Light Response Measurements in Patients With Brain Tumors

Eighteen patients (mean age 56.94±13.12, 6 females, 12 males) and 32 age-similar controls (mean age 53.62±12.21, 19 females, 13 males) were enrolled. The mean age and gender of the subjects in the two groups were statistically insignificant (p=0.385, and p=0.140, respectively). Patients were divided to two groups, based on tumor location: The first group included patients in whom the tumor(s) had no contact with optic apparatus. The second group included patients with contact with optic apparatus. The measurements of the ganglion cell and inner plexiform layer (GCL-IPL) and retinal nerve fiber layer (RNFL) thickness by SD-OCT in all patients were within normal limits compared with published data (refs 18,19): Group 1 (mean±SD: 74.54±6.18, and 108.75±22.54, respectively); Group 2 (mean±SD: 79.79±5.25, and 97.57±9.88, respectively).

Group 1—Patients with Tumors with No Contact with Optic Apparatus

Ten patients with brain tumors without apparent contact with the optic apparatus (Table 2, mean age 58.5±14.37, 4 females, 6 males) and 32 age-similar controls (mean age 53.62±12.21, 19 females, 13 males) were enrolled. The mean age and gender of the subjects in the two groups were statistically insignificant (p=0.35, and p=0.468, respectively).

Vast majority of those patients completed only the first visit (up to 24 hours before brain surgery) due to the severity of their condition.

Analysis of the Sustained PLR in Patients with Tumors without Contact with the Optic Apparatus Table 5 presents the mean normalized pupil size measured 3.7 sec following blue light offset in the right eye of patients and controls in 3 VF test targets (illustrated in FIG. 34). In the control group, the normalized pupil size was ≤0.75 pixels in all VF targets. By contrast, in the patients, the pupil size was significantly and substantially larger (>0.8 pixels).

TABLE 5

|  | Control | Patients |
| --- | --- | --- |
| Number of subjects | 14 | 7 |
| Mean Normalized Pupil | | |
| Central retina | 0.7 ± 0.02 | 0.81 ± 0.02 (p = 0.004) |
| Mid-peripheral retina | 0.74 ± 0.02 | 0.85 ± 0.03 (p = 0.03) |
| Peripheral retina | 0.75 ± 0.02 | 0.88 ± 0.02 (p = 0.0005) |

Table 5 presents the normalized pupil size measured 3.7 sec following blue light offset. Data are presented as mean±SE. Student two tailed T-test p values for the comparison between patients and controls with bonferroni correction are presented in parentheses.

The ROC analysis of the results shown in FIG. 35, revealed that the normalized pupil size measured 3.7 sec following blue light offset in the central retina test target had the largest AUC (90.8%, p=0.003). The cutoff value (threshold) of the normalized pupil size that provided the most reliable predictions was 0.757 (Sensitivity=0.857, 1-Specificity=0.143).

Analysis of the Transient PLR in Patients with Tumors without Contact with the Optic Apparatus.

Table 6 presents analysis of the 3 parameters of the transient PLR (Percentage of Pupil Contraction (PPC), Maximal Contraction Velocity (MCV), Maximal relaxation velocity (MRV) that were recorded in target CN. As Significantly lower transient PLR parameters were recorded in the patients compared with control before surgery (Table 6).

Data in Table 6 is presented as mean±SE. Student two tailed t-test p values for the comparison between patients and controls with bonferroni correction are presented in parentheses.

TABLE 6

|  |  | Control | Patients |
|---|---|---|---|
| Blue | Number of subjects | 15 | 9 |
|  | Pupil response amplitude (%) | 17 ± 1.1 | 10.6 ± 1 (p = 0.001) |
|  | Maximal relaxation velocity (pixel/sec) | 11 ± 1 | 6.2 ± 0.8 (p = 0.009) |
|  | Maximal pupil contraction velocity (pixel/sec) | 29 ± 2.6 | 20 ± 2.66 (p = 0.14) |
| Red | Pupil response amplitude (%) | 12 ± 1 | 6.0 ± 1.87 (p = 0.08) |
|  | Maximal relaxation velocity (pixel/sec) | 7.3 ± 0.7 | 3.4 ± 0.63 (p = 0.003) |
|  | Maximal pupil contraction velocity (pixel/sec) | 19 ± 2.4 | 8.2 ± 2 (p = 0.01) |

The VF test points used for assessment of the transients PLR in patients with tumors without contact with the optic apparatus and controls are shown in FIG. 36. The CN test target is highlighted in red; Temporal (T); Central-nasal-CN); Central-temporal-(CT); Nasal (N), Superior(S); Inferior (I).

ROC analysis presented in FIG. 37 revealed that the maximal contraction velocity recorded in response to the red light stimulus in the CN target had the largest AUC (84.1%, p=0.007). The cutoff value that provided the most reliable predictions was 11.97 pixel/sec. (Sensitivity=0.778, 1-Specificity=0.143).

Individual Case—Patient #1

Patient #1 (female, age 52) was diagnosed with olfactory grove meningioma. Her MRI scan revealed a frontal brain tumor with no direct contact between the tumor and the chiasma or optic nerve (FIG. 38). Before the surgery, pupilloperimetry testing revealed a diminished transient PLR mainly for red light, in the central VF test point CN in the right eye. PPC, MCV and MRV recorded in response to the red light stimulus were over 2SEs away from the mean of controls (Table 7). PLR parameters recorded in response to the blue light stimulus were within 2SEs from the mean of controls. Three months following surgery, the PLR values were substantially higher compared with the baseline measurement. Specifically, the PLR parameters in response to red light were withing 2 SEs from the mean of control at 3 months following surgery. The patient's mean normalized pupil size following blue light onset recorded in the central VF target before the surgery was 0.83 which was substantially higher compared with the mean value of controls (0.7±0.02), suggesting a defect in the sustained melanopsin-mediated PLR. At 3 months following surgery, the value of this parameter was 0.79, within 2SE away from the mean of controls.

TABLE 7

|  |  | Control | Patient #1 Before surgery | Patient #1 3 month following tumor removal |
|---|---|---|---|---|
| Blue | Number of subjects | 15 | 1 | 1 |
|  | Pupil response amplitude (%) | 17 ± 1.1 | 15.6 | 24.09 |
|  | Maximal relaxation velocity (pixel/sec) | 11 ± 1 | 8.98 | 11.18 |
|  | Maximal pupil contraction velocity (pixel/sec) | 29 ± 2.6 | 24.5 | 35.69 |
| Red | Pupil response amplitude (%) | 12 ± 1 | 1.4 | 11.17 |

TABLE 7-continued

|  | Control | Patient #1 Before surgery | Patient #1 3 month following tumor removal |
|---|---|---|---|
| Maximal relaxation velocity (pixel/sec) | 7.3 ± 0.7 | 1.94 | 6.83 |
| Maximal pupil contraction velocity (pixel/sec) | 19 ± 2.4 | 3.38 | 16.71 |

Group 2—Patients with Tumors that Contact the Optic Apparatus

Eight patients (mean age 55±12.02, 2 females, 6 males) and 32 age-similar controls (mean age 53.62±12.21, 19 females, 13 males) were tested. The mean age and gender of the subjects in the two groups were statistically insignificant (p=0.78, and p=0.12, respectively). Vast majority of these patients completed only the first visit (up to 24 hours before brain surgery) due to the severity of their condition.

Analysis of the Sustained PLR in Patients with Tumors that Contact the Optic Apparatus Table 8 presents the mean normalized pupil size measured 3.7 sec following blue light offset in the right eye of patients and controls in 3 VF test targets (detailed in FIG. 39). In the control group, the normalized pupil size was ≤0.75 in all VF targets. By contrast, in the patient group, the pupil size was significantly larger (>0.8, all p<0.021)).

Table 8—Data are presented as mean±SE. Student two tailed T-test p values for the comparison between patients and controls with bonferroni correction are presented in parentheses.

TABLE 8

|  | Control | Patients |
|---|---|---|
| Number of subjects | 14 | 8 |
| Mean Normalized Pupil | | |
| Central retina | 0.7 ± 0.02 | 0.83 ± 0.03 (p = 0.021) |
| Mid-peripheral retina | 0.74 ± 0.02 | 0.85 + 0.02 (p = 0.007) |
| Peripheral retina | 0.75 ± 0.02 | 0.87 + 0.02 (p = 0.002) |

ROC analysis presented in FIG. 40 revealed that the normalized pupil size measured 3.7 sec following blue light offset in the peripheral VF test target had the largest AUC (89.3%, p=0.003). The cutoff value of the normalized pupil size that provided the most reliable predictions was 0.817 (Sensitivity=0.875, 1-Specificity=0.214).

Analysis of Transient PLR in Patients with Tumors that Come into Contact the Optic Apparatus Table 9 presents the parameters analyzed for the transient PLR (Percentage of Pupil Contraction (PPC), Maximal Contraction Velocity (MCV), Maximal relaxation velocity (MRV) that were recorded in the right eye in the superior (MS) and central (CN) VF test targets (Highlighted in red in FIG. 41). Significantly lower PLR values were recorded only in the superior VF test target in patients before surgery compared with control (Table 9). Other parameters of the transient PLR recorded in the central VF target and in the other VF test targets were statically insignificant from controls.

Table 9—Data are presented as mean±SE. Student two tailed t-test p values for the comparison between patients and controls with bonferroni correction are presented in parentheses.

TABLE 9

|  |  | Superior target | | Central target | |
| --- | --- | --- | --- | --- | --- |
|  |  | Control | Patients | Control | Patients |
|  | Number of subjects | 15 | 4 | 15 | 8 |
| Blue | Pupil response amplitude (%) | 11.5 ± 1.6 | 4 ± 1.2 (p = 0.015) | 17 ± 1.1 | 13.2 ± 2.15 (p = 0.571) |
|  | Maximal pupil contraction velocity (pixel/sec) | 21 ± 2.75 | 7.6 ± 2.4 (p = 0.021) | 29 ± 2.6 | 19.3 ± 3.4 (p-0.259) |
|  | Maximal relaxation velocity (pixel/sec) | 8 ± 0.9 | 3.7 ± 1.24 (p = 0.155) | 11 ± 1 | 7.5 ± 1.2 (p = 0.278) |
| Red | Pupil response amplitude (%) | 7 ± 1.2 | 1.7 ± 0.63 (p = 0.012) | 12 ± 1 | 9.1 ± 2.8 (p = 0.883) |
|  | Maximal pupil contraction velocity (pixel/sec) | 11.6 ± 2.5 | 3.6 ± 0.8 (p = 0.052) | 19 ± 2.4 | 15.8 ± 4.73 (p = 3) |
|  | Maximal relaxation velocity (pixel/sec) | 5 ± 0.75 | 2.5 ± 0.3 (p = 0.032) | 7.3 ± 0.7 | 5.4 ± 1 (p = 2) |

ROC analysis revealed that the maximal contraction velocity recoded in response to the red light stimulus in the superior VF test target had the largest AUC (96.4%, p=0.006). The cutoff value that provided the most reliable predictions was 11.97 pixel/sec. (Sensitivity=1, 1-Specificity=0.143)

Individual Case—Patient #7

Patient #7 was clinically diagnosed as suffering from glioblastoma at the right temporal brain, with a radiation to the right eye (see FIG. 42). Pupilloperimetry testing revealed a diminished pupil response to blue and red light, in the superior VF test point presented in FIG. 41 in visit 1 in the right eye. PPC, MCV and MR V values were lower from the mean of controls in the superior VF target (Table 10). The PLR parameters recorded in the central VF test target were within 2SEs from the mean of controls (Table 10). Three months following surgery, the patient's PLR parameters recorded in response to red light in the superior VF test target were higher than baseline, and were within 2SEs from the mean of the controls range. By contrast, the response to blue light was lower than at baseline.

Analysis of the sustained PLR of this patient revealed a substantially larger normalized pupil size at 3.7 sec following blue light offset in the right eye compared with the mean of controls in the 3 VF test targets (Table 11). Three months following surgery, the patient's normalized pupil size was ≤0.74.

TABLE 10

|  |  | Superior target | | | Central target | | |
| --- | --- | --- | --- | --- | --- | --- | --- |
|  |  | Control | Patient #7 Before surgery | Patient #7 3 month following tumor removal | Control | Patient #7 Before surgery | Patient #7 3 month following tumor removal |
|  | Number of subjects | 15 | 1 | 1 | 15 | 1 | 1 |
| Blue | Pupil response amplitude (%) | 11.5 ± 1.6 | 6.75 | 13.99 | 17 ± 1.1 | 13.61 | 7.15 |
|  | Maximal pupil contraction velocity (pixel/sec) | 2.1 ± 2.75 | 7.3 | 26.98 | 29 ± 2.6 | 25.27 | 15.9 |
|  | Maximal relaxation velocity (pixel/sec) | 8 ± 0.9 | 13.76 | 7.15 | 11 ± 1 | 7.45 | 4.11 |
| Red | Pupil response amplitude (%) | 7 ± 1.2 | 1.73 | 5.27 | 12 ± 1 | 11.08 | 16.53 |
|  | Maximal pupil contraction velocity (pixel/sec) | 11.6 ± 2.5 | 3.23 | 12.08 | 19 ± 2.4 | 15.84 | 23.42 |
|  | Maximal relaxation velocity (pixel/sec) | 5 ± 0.75 | 4.3 | 5.67 | 7.3 ± 0.7 | 5.4 | 9.46 |

TABLE 11

|  | Control | Patient #7 Before surgery | Patient #7 3 month following tumor removal |
|---|---|---|---|
| Number of subjects | 14 | 1 | 1 |
| Mean Normalized Pupil | | | |
| Central retina | 0.7 ± 0.02 | 0.81 | 0.65 |
| Mid-peripheral retina | 0.74 ± 0.02 | 0.80 | 0.68 |
| Peripheral retina | 0.75 ± 0.02 | 0.90 | 0.74 |

The results presented demonstrate the feasibility of assessing the central-peripheral gradient of pupil response kinetics for noninvasive objective diagnosis and monitoring of brain tumors. The multifactorial analysis of PLR for various stimuli presented in various retinal locations revealed that the PLR defects differed between the two brain tumor groups. Thus, both groups demonstrated aberrant sustained melanopsin-mediated PLR in the three VF test targets tested. By contrast, significantly lower transients PLRs were recorded in the central retina in the patients with tumors with no contact with the optic apparatus, whereas in the patients with tumors contacting the optic apparatus, significantly lower transient PLRs were recorded in the peripheral (superior retina) but not in the central retina.

It is to note that all patients had a normal eye examination and normal values for SD-OCT RNFL and GCL-IPL thickness, suggesting that the defects measure in the PLR were derived from changes in the brain and not in the retina.

The results imply that the PLR was affected mostly in the right eye of the patients is associated with the clinical diagnosis of these patients that revealed tumors on the right side of the brain that affected the right eye.

Conclusions: Focal intracranial pathologies may be detected by localized melanopsin-mediated sustained PLR for central blue stimulus. Patients with brain tumors involving the visual pathway had an additional defect in the cone-mediated PLR. Quantification of the PLR for focal central and peripheral chromatic stimuli may serve as a novel noninvasive objective diagnostic tool for focal intracranial pathologies.

Example 7—Diagnosis and Monitoring of Patients with Intracranial Lesions

The aim of the study was to characterize the pupil light responses (PLR) for small focal chromatic light stimuli presented in peripheral and central retinal locations in patients with intracranial lesions. To this aim, eighteen patients with brain tumors and 32 age-similar controls were enrolled. Patients were divided into 3 groups: group I included patients with brain tumors that contacted the optic tract and/or mid-brain, group II included patients with brain tumors involving the optic radiation, and group III included patients with brain tumors with no apparent contact with the vision or PLR systems (n=6 each group). The PLR for small (0.43°) blue and red light stimuli presented at peripheral) (21° and central) (4.2° visual field locations was measured using chromatic pupilloperimetry under mesopic light adaptation conditions. All subjects underwent a complete ophthalmic exam, standard Humphrey automated perimetry (24-2), color vision test, best-corrected visual acuity, and refraction as well as Spectral-Domain Optical Coherence Tomography (SD-OCT) imaging. All patients underwent brain MRI.

Inclusion criteria for the control group were normal eye examination with no history of ocular disease, normal color vision (Farnsworth/Lanthon D-15 Test), best-corrected visual acuity (BCVA) of 20/20, no use of topical or systemic medications that could adversely affect the PLR and normal Humphrey 24-2 perimetry testing (Humphrey Field Analyzer II, SITA 24-2; Carl Zeiss Meditec, Inc., Jena, Germany).

The patients were recruited based on a diagnosis of brain lesions and a good performance status (ability to sit and follow technician instructions for PLR and perimetry testing). All patients underwent standard MRI brain protocol (T1 without and with gandolinuim, T2, FLAIR) before inclusion. Patient's neurological status was determined by certified neurosurgeons. Patients' ophthalmic and brain exclusion criteria were a concurrent ocular disease and any other condition affecting the PLR. Controls were tested in a single visit. All patients were examined within 72 hours before surgical procedure. Three patients in group I were re-tested within 3-5 days and 3 month following surgery. Two patients in group II completed the 3-5 days and 3 month post OP testing visits. All other patients did not feel well enough or were reluctant to return for follow-up ophthalmic testing.

At each visit, participants were tested for BCVA, Humphrey perimetry (Humphrey Field Analyzer II, SITA 24-2 protocol), Spectral Domain Optical Coherence Tomography (SD-OCT) and chromatic pupilloperimetry.

SD-OCT

Macular and peripapillary scans were performed using Heidelberg Spectralis SD-OCT (Heidelberg Engineering, Heidelberg, Germany). Horizontal high-resolution transfoveal line scans were obtained using automated real-time tracking (ART) with an average of 8 images. Each volume scan was comprised of 25 horizontal b-scans in high-resolution mode with 237 μm distance between b-scans and 512 a-scans per b-scan. Parapapillary measurements were taken using a 3.45 mm circular scan centered in the optic disc with 1536 A-scan points.

All scans were acquired by an experienced operator and were reviewed for correct centering and segmentation.

Chromatic Pupilloperimetry

The PLR was measured using chromatic pupilloperimetry under mesopic conditions (0.04 cd/m$^2$)[20,23]. Patients were adapted to ambient light conditions for two minutes before testing and the non-tested eye was covered with a black patch. Participants were asked to fixate on fixator white light (6 cd/m2) located at the center of the device. Focal chromatic light stimuli (0.43°, Goldmann size III) were sequentially presented at two central) (4.24°, nasal and temporal) (21.21° VF locations. First, the red light stimuli was presented (624 nm±5 nm, 1000 cd/m$^2$, 1 second stimulus duration), followed by dim (170 cd/m$^2$) blue (485 nm #5 nm) light stimuli (1 second stimulus duration, FIG. 43A, FIG. 43D). Inter-stimulus interval was 3 seconds. Following completion of this sequence, bright (6000 cd/m²) blue light stimuli were presented for 8 seconds at a central) (4.24°, nasal and temporal) (21.21° VF locations (FIG. 43B, FIG. 43C), with an inter-stimulus interval of 8 seconds. Nasal and temporal locations were selected to match the Humphery 24-2 locations in each eye.

Light intensities were determined using LS-100 luminance meter (Konica Minolta, Tokyo, Japan) and were well below the recommendations of outlined in IEC 62471 on photobiological safety of lamps and lamp systems, and ICNIRP Guidelines on limits of exposure to incoherent visible and infrared radiation.

Patients were tested on both eyes. Except patient #4 who was tired and completed only the testing of the left eye. Controls were tested only on one eye, with 16 subjects randomly allocated to right eye testing and 16 subjects to left eye testing.

Pupil diameter was automatically recorded at a frequency of 30 Hz. For each stimulus the percentage of pupil contraction (PPC, in %) was determined automatically by the software following normalization, based on the initial pupil size measured at the beginning of each stimulus, using the formula:

$$PPC = \frac{\text{Initial Pupil Diameter} - \text{Minimum Pupil } Diamater}{\text{Initial Pupil Diameter}}$$

Maximal contraction velocity (MCV in pixel/sec) and the latency of MCV (LMCV in sec) were determined as previously described (Haj Yahia S, et. al., Invest Ophthalmol Vis Sci 2018; 59:6027-6035).

Percentage of pupil recovery (PPR, in %) for the bright blue light stimuli was determined at 3.7 second following light onset based on the initial pupil size measured at the beginning of each stimulus, using the formula:

$$PPR = \frac{\text{Pupil Diameter at 3.7}sec}{\text{Initial Pupil Diameter}} \times 100$$

Normalized Minimal Pupil Size (NMPS, in %) was determined at maximal pupil contraction stage, based on the initial pupil size measured at the beginning of each stimulus, using the formula:

$$NMPS = \frac{\text{Pupil Diameter at maximal contraction}}{\text{Initial Pupil Diameter}} \times 100$$

Tests in which the subject blinked during the pupil contraction phase were automatically excluded and the test target was automatically retested.

Statistical Analysis

Statistical analysis was performed using the IBM SPSS Statistics for Windows, Version 25.0. Armonk, NY: IBM Corp. Test points in which recording of the PLR failed more than 4 times were not included in the analysis. Age and gender of patients groups were compared to controls using t-test and fishers' exact test, respectively. Left and right eye pupilloperimetry data of controls were mirrored to right and left eye, respectively for statistical analysis.

General Lineal Models to compare mean values of pupilloperimetry measures among the groups adjusted for age and sex. Simple contrasts with controls as reference group were calculated. The robustness of using the PPC and PPR for discrimination between control and patient groups was examined by calculating ROC AUC for adjusted data by age and sex. Differences were considered significant if $P<0.05$.

Results

Attenuated PLR for Focal Dim Blue Light Stimuli in Patients with Brain Lesions:

Patients with brain tumors that contacted the midbrain or optic apparatus (group I), brain tumors that did not contact the midbrain or optic apparatus but contacted other parts of the visual pathway (group II) and patients with lesion with no apparent contact with midbrain or vision pathways (group III) were recruited.

SD-OCT thickness measurements of the ganglion cell layer and inner plexiform layer (GCL-IPL) as well as the retinal nerve fiber layer (RNFL) were within normal limits in all patients.

The PPC for red light did not significantly differ between study groups in vast majority of VF test point locations. In contrast, in response to dim blue light, significantly lower PPC values were recorded in group I patients in nasal and central-temporal VF test targets in the right eye and in the nasal and central-nasal test target in the left eye (Table 12). In group II, significantly lower PPC was recorded in nasal, central-temporal and temporal locations only in the right eye. No significant differences in PPC for dim blue light stimuli were observed in both eyes of group III in any VF test target. In addition, no significant differences were observed in the PLR parameters MCV or LMCV in both patient groups in response to the dim blue light stimuli.

ROC analysis demonstrated a good diagnostic accuracy for group I patients compared to controls, using PPC values for dim blue light in the nasal VF target in both eyes and in the central-temporal test target in the right eye (ROC AUC>82%). In group II, ROC AUC >78% was obtained in all VF test targets in which significantly lower PPC was measured in patients compared with controls (Table 12).

TABLE 12

| VF location | group | Right eye | | | | Left eye | | | |
|---|---|---|---|---|---|---|---|---|---|
| | | N | Mean# (SD) | p-Contrast Results£ | ROC AUC€ (p-value) | N | Mean# (SD) | p-Contrast Results£ | ROC AUC€ (p-value) |
| Nasal | Control | 24 | 13 (6) | reference | | 24 | 13 (6) | reference | |
| | Group I | 6 | 6 (5) | 0.023* | 86.8 (0.006)** | 6 | 5 (4) | 0.009** | 90.3 (0.003)** |
| | Group II | 6 | 7 (3) | 0.036* | 84.0 (0.011)* | 5 | 9 (5) | 0.178 | ND |
| | Group III | 6 | 12 (7) | 0.957 | ND | 6 | 12 (7) | 0.965 | ND |
| Central-Nasal | Control | 31 | 16 (5) | reference | | 31 | 16 (5) | reference | |
| | Group I | 6 | 11 (6) | 0.061 | ND | 6 | 10 (8) | 0.048* | 75.8 (0.048)* |
| | Group II | 6 | 13 (5) | 0.344 | ND | 5 | 15 (6) | 0.989 | ND |
| | Group III | 6 | 11 (4) | 0.028* | 86.6 (0.005)** | 6 | 16 (8) | 0.97 | ND |

TABLE 12-continued

|  |  | Right eye | | | | Left eye | | | |
| --- | --- | --- | --- | --- | --- | --- | --- | --- | --- |
| VF location | group | N | Mean# (SD) | p-Contrast Results£ | ROC AUC€ (p-value) | N | Mean# (SD) | p-Contrast Results£ | ROC AUC€ (p-value) |
| Central-Temporal | Control | 31 | 16 (6) | reference | | 31 | 16 (6) | reference | |
| | Group I | 6 | 10 (4) | 0.039* | 82.8 (0.012)* | 6 | 11 (8) | 0.164 | ND |
| | Group II | 6 | 10 (4) | 0.04* | 84.4 (0.008)** | 5 | 15 (3) | 0.763 | ND |
| | Group III | 6 | 13 (7) | 0.367 | ND | 6 | 15 (8) | 0.710 | ND |
| Temporal | Control | 26 | 14 (6) | reference | | 26 | 14 (6) | reference | |
| | Group I | 5 | 9 (6) | 0.083 | ND | 4 | 15 (7) | 0.907 | ND |
| | Group II | 6 | 8 (4) | 0.029* | 85.9 (0.007)** | 6 | 15 (5) | 0.714 | ND |
| | Group III | 6 | 12 (6) | 0.334 | ND | 6 | 16 (8) | 0.681 | ND |

VF—visual field, N—number of subjects with PLR measured at the indicated test point,
Mean percentage of pupil contraction (PPC, in %),
£p-value contrast for patient groups vs. controls, adjusted for sex and age.
€ROC AUC (presented in %) was calculated only for test targets with significant difference between patient groups and controls.
*p <0.05.

As detailed above, a bright blue light stimulus was presented for 8 seconds to induce a sustained PLR. The percentage of pupil recovery (PPR) was recorded at 3.7 seconds following light onset. This time point was selected based on the findings that the mean PPR was ≥96% in the control group at 3.7 seconds following dim blue light stimuli onset (Table 13). In contrast, the mean PPR at this time point was substantially lower following bright blue stimulus presentation in control group (mean PPR≤76%, Table 13).

TABLE 13

|  | | Dim* | | Bright# | |
| --- | --- | --- | --- | --- | --- |
| VF location | N | NMPS£ Mean (SD) | PPR€ Mean (SD) | N | NMPS£ Mean (SD) | PPR€ Mean (SD) |
| Nasal | 24 | 77 (6) | 98 (3) | 25 | 66 (6) | 76 (9) |
| Temporal | 26 | 86 (6) | 96 (5) | 26 | 65 (7) | 74 (8) |
| Central | 31 | 84 (5) | 96 (4) | 26 | 63 (7) | 71 (9) |

*Dim blue light stimulus: light intensity-170 cd/m², presented for 1 second;
Bright blue light stimulus: light intensity-6000 cd/m², presented for 8 second; VF—visual field, N—number of subjects with PLR measured at the indicated test point,
£NMPS—Normalized Minimal Pupil Size (measured at maximal pupil contraction stage and presented as mean and standard deviation, in %),
€PPR—Percentage of Pupil Recovery, measured at 3.7 seconds following light onset (presented as mean and standard deviation, in %).

Group I patients presented with significantly faster pupil recovery (larger PPR values) for bright (strong/high intensity) blue light stimulus compared with controls, at all VF locations tested in the right eye and in nasal and central VF locations in the left eye (Table 14). ROC analysis demonstrated good diagnostic accuracy (≥85.9%) for this parameter at all VF locations tested in the right eye, and an excellent diagnostic accuracy in the nasal test point in the left eye (ROC AUC-96.8%, p=0.001). Patients in group II presented significantly larger PPR values for bright blue light stimulus compared with controls, with ROC AUC (≥85.6%) at all VF test points in the right eye. Group III patients presented significantly larger PPR values compared with controls in the right eye in the nasal VF test target (88±5% vs. 76±9%, p=0.005) and this parameter differentiated between group III patients and controls with excellent sensitivity and specificity (ROC AUC=95.3%, p=0.001).

TABLE 14

|  |  | Right eye | | | | Left eye | | | |
| --- | --- | --- | --- | --- | --- | --- | --- | --- | --- |
| VF location | group | N | Mean# (SD) | p-Contrast Results£ | ROC AUC€ (p-value) | N | Mean# (SD) | p-Contrast Results£ | ROC AUC€ (p-value) |
| Nasal | Control | 25 | 76 (9) | reference | | 25 | 76 (8) | reference | |
| | Group I | 5 | 88 (7) | 0.009** | 89.6 (0.006)** | 5 | 91 (5) | 0.001** | 96.8 (0.001)** |
| | Group II | 4 | 88 (6) | 0.009** | 87.0 (0.019)* | 3 | 89 (7) | 0.016* | ND |
| | Group III | 6 | 88 (5) | 0.005** | 95.3 (0.001)** | 6 | 83 (7) | 0.097 | ND |
| Central | Control | 26 | 71 (10) | reference | | 26 | 71 (10) | reference | |
| | Group I | 6 | 85 (10) | 0.003** | 85.9 (0.007)** | 6 | 86 (7) | 0.006** | 87.2 (0.005)** |
| | Group II | 4 | 82 (6) | 0.030* | 86.5 (0.007)** | 3 | 80 (11) | 0.135 | ND |
| | Group III | 6 | 80 (5) | 0.066 | ND | 6 | 77 (14) | 0.338 | ND |
| Temporal | Control | 26 | 74 (8) | reference | | 26 | 74 (9) | reference | |
| | Group I | 5 | 87 (8) | 0.005** | 90.0 (0.005)** | 5 | 77 (16) | 0.606 | ND |
| | Group II | 4 | 85 (5) | 0.014* | 85.6 (0.024)** | 3 | 85 (6) | 0.09 | ND |
| | Group III | 6 | 83 (4) | 0.056 | ND | 6 | 77 (11) | 0.62 | ND |

Individual Case—Patient #4

Figure 44:
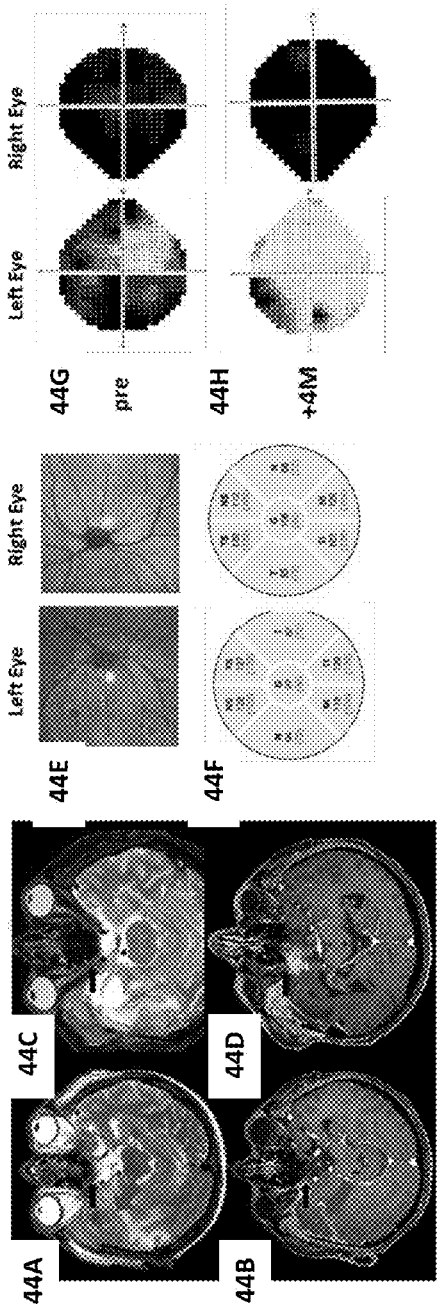
Figure 44:
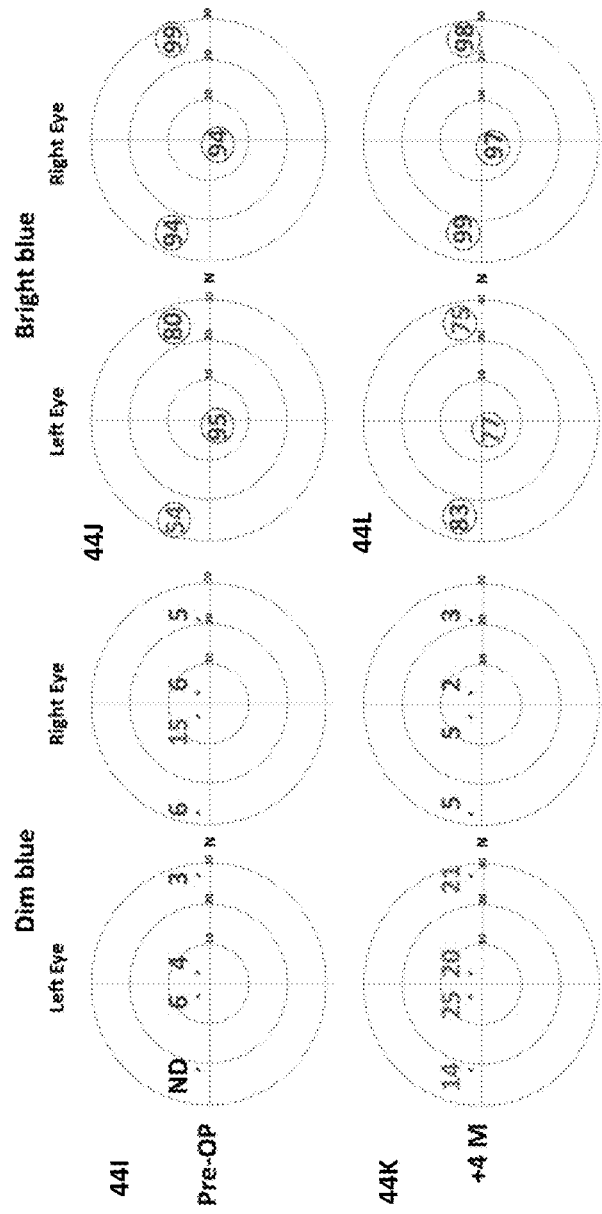

Patient #4, 59 YO male, presented with headaches and complains of vision problems. He was clinically diagnosed with a supratentorial right temporal brain metastasis of lung carcinoma. MRI scans indicated a brain edema in right frontal and temporal lobes with direct pressure on right optic nerve and right optic tract (red arrow in FIG. 44 panels A-B). Vision was 20/20 in left eye and 20/25 in the right eye with normal SD-OCT and fundus imaging (FIG. 44 Panel E). Perimetry testing (Humphrey SITA-Standard algorithm) revealed a substantial VF loss with MD=−19.54 dB and PSD=10.30 dB in the left eye and MD=−29.74 dB and PSD=3.29 dB in the right eye (FIG. 44 Panel F,G). Maximal percentage of pupil contraction (PPC) for dim (low intensity) blue light was lower by more than 2 standard errors (SEs) from mean of controls in majority of testing points in both eyes (FIG. 44 Panel I). Percentage of pupil recovery (PPR) for bright blue light stimuli was higher (faster pupil recovery) by more than 2 SEs from mean of controls in all test targets in the right eye and in the central and temporal targets in the left eye. The PPR was within 2SEs of the mean of controls in the nasal test target in the left eye (FIG. 44 Panel J).

Four months post OP MRI scan demonstrated significant improvement of brain edema and mass effect on right optic nerve (FIG. 44 Panel C). T1 MRI with gadolinium revealed recurrent tumor in right frontal lobe with direct pressure on right optic nerve (FIG. 44 Panel D). Vision was 20/20 in left eye and no light perception in the right eye. A peripheral VF loss, mainly in the superior temporal area was observed in the left eye using the Humphrey SITA-Standard algorithm, with MD=−4.58 dB and PSD=6.67 dB. No light perception was observed in the right eye using Humphrey SITA-Standard and FASTPAC stimulus V algorithms (FIG. 44 Panel H). The PPC for dim blue light was lower by more than 2 standard errors (SEs) from mean of controls in all testing points in the right eye. By contrast, the PPC for dim blue light in the left eye substantially improved, and PPC values were within 2SEs of the mean of controls in all VF test targets in the left eye, correlating with alleviation of pressure on the left eye following tumor removal (FIG. 44 Panel K). The PPR for bright blue light stimuli remained higher by more than 2 SEs from mean of controls in all test targets in the right eye. In the left eye PPR was within 2 SEs from mean of controls in the central and nasal targets in the left eye, but was lower than 2 SEs from mean of controls in the temporal VF (FIG. 44 Panel L), correlating with the superior-temporal defect in this area by Humphrey perimetry.

Individual Case—Patient #10 (Group II)

Figure 45:
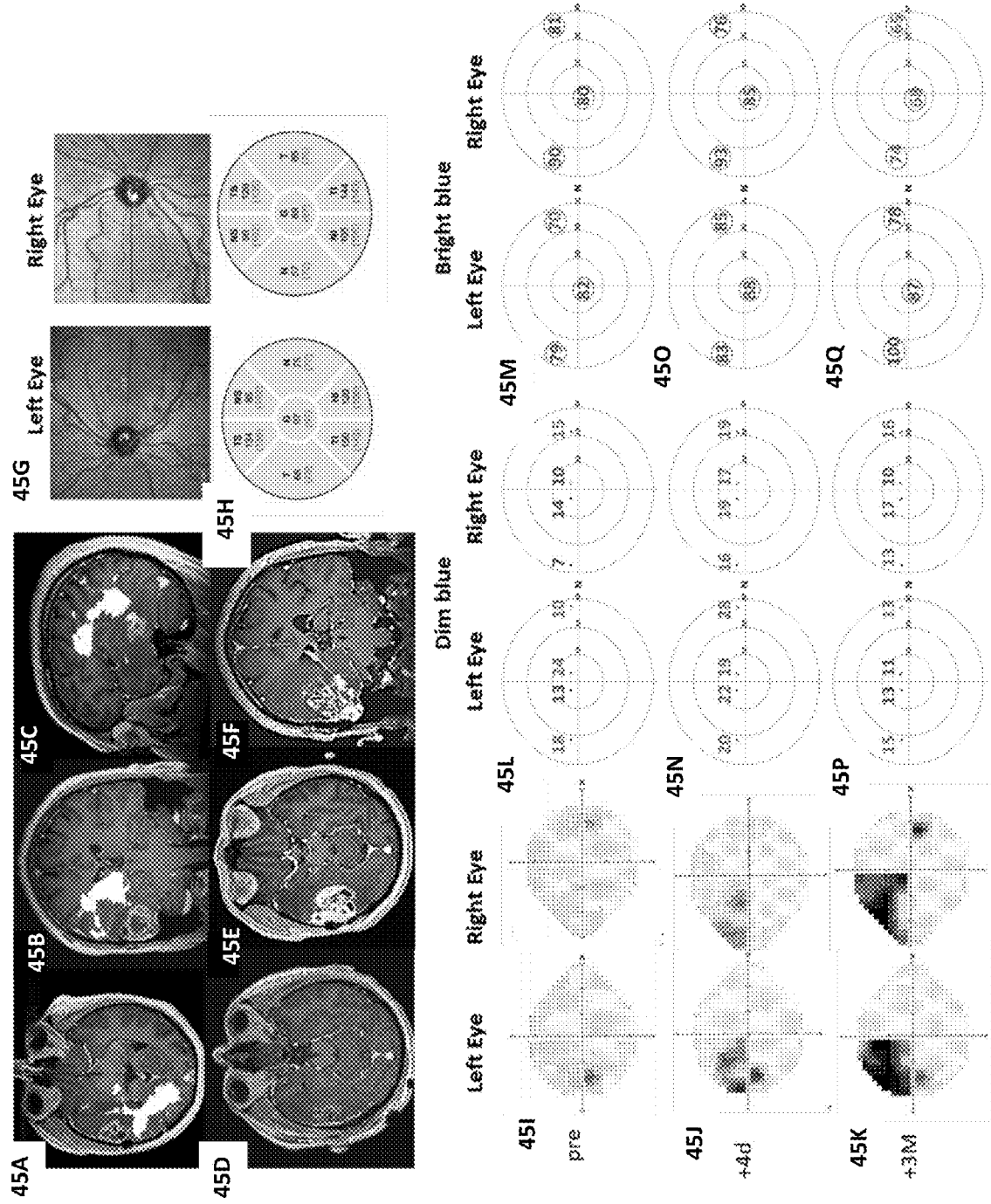

Patient #10, 38 YO, was clinically diagnosed with right temporal glioblastoma. Functional MRI T1 with gadolinium showed brain edema around the right temporal enhanced lesion involving right optic radiation (red arrow in FIG. 45 panel A-C). Vision was 20/20 in both eyes and nearly normal Humphrey perimetry (left eye MD=−0.85 dB and PSD=2.11 dB and right eye MD=−0.28 dB, and PSD=1.91 dB, FIG. 45 panel I). Fundus imaging and SD-OCT demonstrated normal optic nerve head and RNFL thickness (FIG. 45 panel G, H). Pupilloperimetry testing in response to dim blue light revealed a diminished PPC, lower than 2 standard errors (SEs) from the mean of controls in three of the four VF test points in the right eye and only in a single (central) test pint in the left eye (FIG. 45 panel L). By contrast, the PPR for bright blue light was higher by more than 2 SEs from mean of controls in all test targets in the right eye and in two of the three test points in the left eye (FIG. 45 panel M). Immediate post OP MRI scan showed improvement of mass effect and brain edema in right temporal lobe and complete tumor removal (FIG. 45 panel D). Four days following surgery, visual acuity was 20/16. Humphrey perimetry demonstrated reduced sensitivity in left upper quadrant with MD=−1.69 and PSD=5.4 in the right eye and MD=−1.55 and PSD=6.65 in the left eye (FIG. 45 panel J). Pupilloperimetry testing revealed complete recovery of PPC for dim blue light in both eyes with all recorded PPC values within 2SEs from the mean of controls (FIG. 45 panel N). By contrast, attenuated PLR for bright blue light was recorded in both eyes with PPR higher by more than 2 SEs from mean of controls in all test targets (FIG. 45 panel O). Three months after surgery, because of neurological deterioration, MRI scan was done showing recurrence of the tumor in right temporal lobe and a surrounding brain edema involving right optic radiation and mass effect on the right mid brain (FIG. 45 panel E, F). Vision was 20/20 in both eyes. Fundus imaging and OCT demonstrated normal optic nerve head and RNFL thickness. Perimetry testing demonstrated incomplete upper left quadranopsia bilaterally (FIG. 45 panel K) with MD=−4.76 and PSD=11.7 in the right eye and MD=−4.97 and PSD=11.44 in the left eye. PPC for dim blue light was lower than 2 SEs from the mean of controls in central VF test points in both eyes (FIG. 45 panel P). Normal PPR values (with 2SES from mean of controls) for the bright blue light was recorded in the right eye in all VF test points, but PPR in the left eye remained higher than normal in all test targets (FIG. 45 panel Q), correlating with mass effect in left brain.

Individual Case—Patient #18 (Group III)

Figure 46:
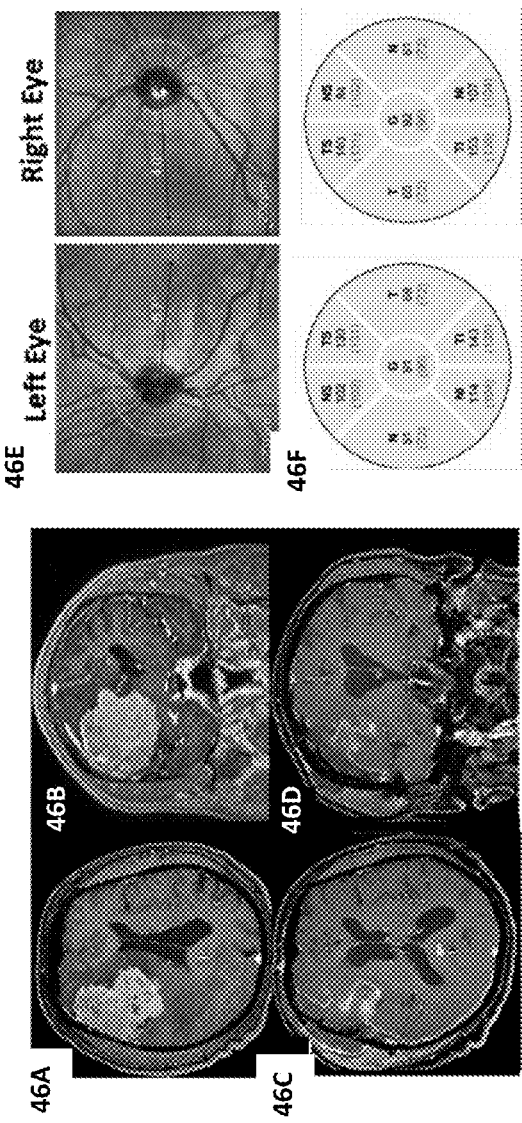
Figure 46:
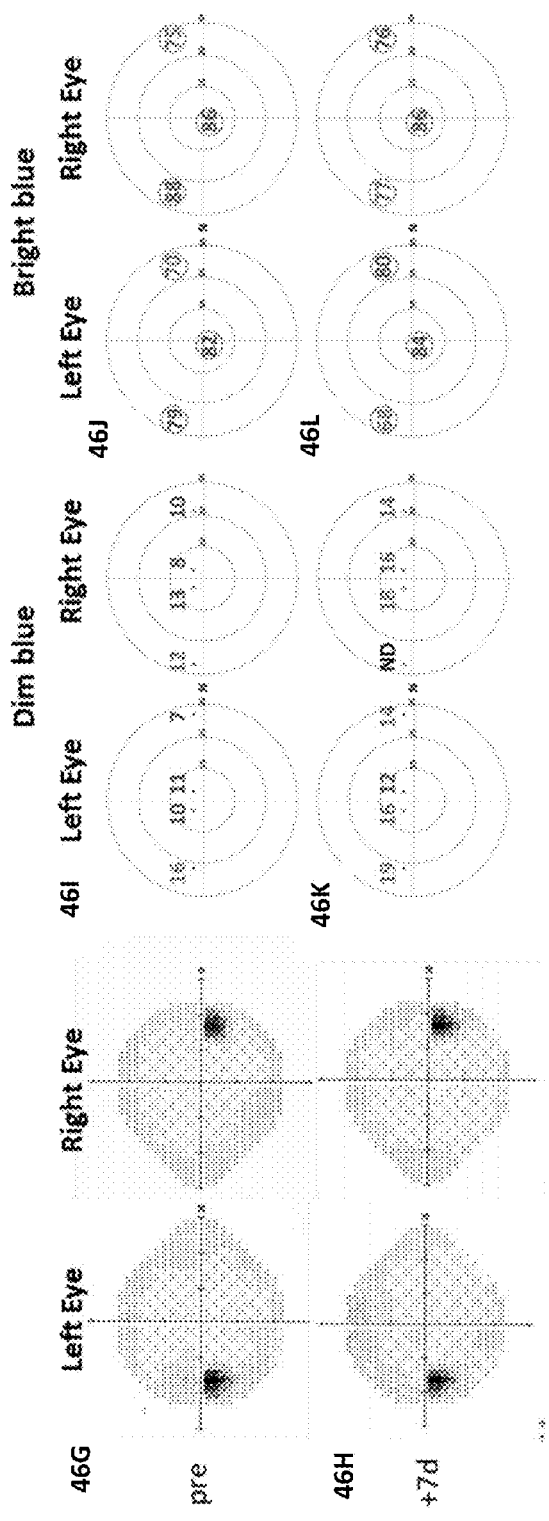

Patient #18, 61 YO, presented with headaches and confusion status but without complains of vision problems. Functional MRI T1+GAD scans showed revealed a large right frontal convexity meningioma (red arrows in FIG. 46 panel A-B) and brain edema in frontal and right temporal lobes with signs of increased ICP. Four weeks after tumor removal, MRI scans show improvement of brain edema and mass effect (FIG. 46 panel C-D). Before surgery, vision was 20/20 in both eyes. Fundus imaging and SD-OCT demonstrated normal optic nerve head and RNFL thickness (FIG. 46 panel E, F). Humphrey perimetry was normal in both eyes (FIG. 46 panel G). By contrast, chromatic pupilloperimetry testing pre OP demonstrated substantially lower PPC for dim blue light in the right and central visual field test targets in both eyes (FIG. 46 panel I), correlating with the mass on the right side of the brain. In addition, PPR in response to bright blue light was substantially lower than normal in two of the three test targets in both eyes (FIG. 46 panel J). Seven days following tumor removal, BVCA remained 20/20 and Humphrey perimetry was normal in both eyes (FIG. 46 panel H). Fundus imaging and SD-OCT demonstrated normal optic nerve head and RNFL thickness (data not shown). Chromatic pupilloperimetry demonstrated improved PLR with normal PPC in vast majority of test targets in both eyes in response to dim blue light stimuli (FIG. 46 panel K). PPR for bright blue light was substantially lower than normal in the center and left test targets in both eyes (FIG. 46 panel L).

The results indicate that SD-OCT thicknesses of macular ganglion cell and inner plexiform layers, as well as peripapillary retinal nerve fiber layer, were within normal limits in all patients. Patients in groups I and II presented with attenuated rod-mediated PLR in the right eye. The highest ROC AUC was measured in the nasal test target with (AUC=86.8%, p=0.006 and AUC=84.0%, p=0.011 for groups I and II, respectively). By contrast, rod-mediated PLR did not significantly differ between patient group III and controls. Patients presented with significantly faster pupil recovery in response to bright blue light stimuli in the right eye, with high (>85%) ROC AUC measured in all test targets for group I and II, and in the nasal test target in group III (AUC=95.3%, p=0.001). Differences in cone-mediated PLR were statistically insignificant from controls in all patient groups in vast majority of test targets.

The results suggest the feasibility of chromatic pupilloperimetry for noninvasive objective diagnosis and monitoring of brain lesions. The multifactorial analysis of PLR for blue and red stimuli presented in various retinal locations at different light intensities revealed that the PLR defects differed between the three patient groups. Thus, whereas the PLR for red light, which is mainly mediated by cones was not significantly affected in the patients, significantly attenuated rod-mediated PLRs were recorded in patients with tumors contacting the PLR and vision pathways. Furthermore, all patient groups demonstrated aberrant sustained melanopsin-mediated PLR. All patients presented with normal SD-OCT RNFL and GCL-IPL thickness, suggesting that PLR defects were derived from changes in the brain and not at the retina level.

The results indicate that patients with brain tumors have normal MCV and LMCV. These findings highlight the advantage of analyzing various PLR parameters to identify diagnosis-specific PLR biomarkers.

Interestingly, even in patients with no apparent visual loss, chromatic pupilloperimetry enables sensitive detection of focal PLR defects in patients with brain tumors. In spite a relatively small sample size, ROC AUC of ≥85% was obtained for PLR measures in all patient groups, including groups group III, who had tumors with no apparent contact with the PLR of vision pathways and presented with normal BCVA and Humphrey perimetry.

Collectively, the results indicate that focal intracranial lesions may be detected by localized melanopsin-mediated sustained PLR for high intensity blue stimulus. Patients with brain tumors involving the visual pathway had an additional defect in the rod-mediated PLR. Quantification of the PLR for focal central and peripheral chromatic stimuli may serve as a novel noninvasive objective diagnostic tool for focal intracranial lesions.

Example 8—Assessment of the Pupil Reflex in Response to Focal Chromatic Light Stimuli in Acute Pseudotumor Cerebri (PTC)

Four Pseudotumor cerebri (PTC) patients (all females, age: 26.2±4.3, mean±SD) and eight healthy age-matched controls (5 females, 3 males age 29.2±6.3) were tested. Ophthalmic assessments included complete ophthalmic examination, color vision, optic coherence tomography (SD-OCT), Pupil responses (PR) to focal blue (485 nm, 170 cd/m2) and red (624 nm, 1000 cd/m2)—light stimuli presented at 54 targets in a 24-2 VF were recorded by chromatic pupilloperimeter. The percentage change of pupil size (PPC) and the maximal relaxation velocity (MRV) of the patients was compared to the PR of controls. Patients were tested within 48 h of diagnosis, then at 1 week and 2 months following acetazolamide intervention.

The results which are presented in FIG. 47 and FIG. 48 indicate that in three of the patients, substantially lower PPC and MRV (≥4 SD lower than mean of controls) were recorded in the first visit. Pupil responses to blue but not red stimuli improved with acetazolamide treatment, suggesting a residual effect on the cone-mediated PLR. The pupil responses improved mostly in the center of the visual fields. Thus, Rod- and cone-mediated PLR are affected in PTC.

Collectively, the results indicate that the multifactorial analysis of the PLR for focal blue and red light stimuli can allow objective noninvasive sensitive assessment of the function of visual pathways mediating the PLR in PTC patients as well as their response to treatment.

What is claimed is:

1. A non-invasive method for monitoring the progression of, determining and/or assessing a brain related condition of a subject, based on pupil light response (PLR) to chromatic light stimuli, under mesopic light conditions, the method comprising:
   determining, for each stimuli, a baseline pupil size of an eye of the subject;
   applying high intensity blue light, low intensity blue light and red light stimuli to one or more regions of the visual field of the eye, the light stimuli configured to induce a response in the pupil;
   obtaining a value for parameters related to induced changes in the pupil size in response to the light stimuli, said parameters comprise Maximal Contraction Velocity (MCV) of the pupil, Latency of MCV (LMCV) of the pupil and Percentage of Pupil Relaxation (PPR);
   normalizing, based on the determined baseline pupil size, the value of the parameters; and
   classifying the PLR based on the parameters values;
   wherein said classifying results in monitoring the progression of, determining and/or assessing the brain related condition.

2. The method of claim 1, wherein the brain related condition comprises: brain tumor, optic neuritis, neurodegenerative conditions, traumatic brain injury, stroke, intracranial lesions, intracranial pressure or pseudotumor cerebri.

3. The method of claim 2, wherein the neurodegenerative conditions are selected from the group consisting of: Alzheimer's disease (AD), Multiple Sclerosis (MS), Parkinson disease (PD), and fragile-X related cognitive decline.

4. The method of claim 1, wherein the parameters further comprise one or more of: Percent of Pupil Contraction (PPC), Pupil Response Latency (PRL), Maximal Relaxation Velocity (MRV), Latency of MRV (LMRV), Maximal Contraction Acceleration (MCA), Latency of MCA (LMCA), Maximal Relaxation Acceleration (MRA), Latency of MRA (LMRA), Maximal Relaxation Deceleration (MRD), Latency of Maximal Relaxation Deceleration (LMRD), Area of Curve (AC), Latency of Maximal Pupil Contraction (LMP), Maximal Contraction Deceleration (MCD), Latency of MCD (LMCD), Max Pupil Size (Max_PS), or Min Pupil Size (Min_PS).

5. The method of claim 1, further comprising applying curve fitting to data associated with pupil size in response to light stimulation.

6. The method of claim 1, wherein the classification comprises applying at least one algorithm to one or more selected parameter values and obtaining a brain related condition.

7. The method of claim 1, wherein each light stimuli comprises between 1 and 228 individual light stimuli, each applied to a different location of the visual field.

8. The method of claim 1, wherein the light stimuli are presented for a period of time of between about 0.1 to 10 seconds.

9. The method of claim 1, wherein the regions of the visual field comprise a central visual field ranging between about 0-10 degrees; and/or wherein the regions of the visual field comprise a peripheral visual field greater than about 10 degrees.

10. The method of claim 1, further comprising providing an initial pre-determined light stimuli at an initial illumination, duration and visual field locations, configured to determine a possibility of the subject having a brain related condition, prior to applying the blue and red light stimuli, wherein applying the blue and red light stimuli to one or more regions of visual field of the eye is based, at least in part, on the determined possibility of the subject having a brain related condition.

11. The method of claim 1, wherein applying the blue and/or red light stimuli to one or more regions of the visual field of the eye comprises selecting a subset of light stimuli based on a location of the light stimuli in relation to the visual field; and/or one or more of: selecting the wavelength of each individual light of the light stimuli, selecting the intensity of each individual light of the light stimuli, selecting the ratio of blue to red light stimuli, or selecting the duration of illumination of each individual light of the light stimuli.

12. The method of claim 1, wherein applying the blue and/or red light stimuli to one or more regions of visual field of the eye comprises applying blue and/or red light stimuli in at least two intervals, said at least two intervals are about 2 to 120 seconds apart.

13. The method of claim 12, wherein each interval comprises a different subset of light stimuli, different wavelengths of light stimuli, and/or different intensities of light stimuli.

14. The method of claim 1, wherein the method comprises determining a risk for developing Alzheimer's disease, and the risk is determined based on at least one of: the MCV parameter in the central region of the visual field in response to a high intensity blue light stimuli, the PRL parameter in response to low intensity blue light in the periphery, the PRL parameter in response to blue light, the PRL parameter in response to red light, the LMCA parameter in response to blue light, the LMCA parameter in response to red light, the LMCD parameter in response to blue light, the LMCD parameter in response to red light, the LMP parameter in response to blue light, the LMP parameter in response to red light, or the MCV parameter in response to blue light.

15. The method of claim 1, further comprising inputting one or more selected values of at least one of the parameters to a machine learning algorithm(s) configured to classify the subject as having a brain related condition or not having a brain related condition.

16. The method of claim 15, further comprising classifying, using the machine learning algorithm, the brain related condition into types and/or levels of severity and/or progression of the condition based, at least in part, on the parameters and selected values thereof.

17. A pupillometer device for monitoring the progression of, determining and/or assessing a brain related condition of a subject, based on pupil light response to chromatic light stimuli, under mesopic light conditions, the pupilometer device comprising:
  a plurality of chromatic beam emitters configured to generate red and/or blue light stimuli at predetermined locations of the visual field;
  at least one camera configured to detect pupil response; and
  a control unit in communication with the plurality of chromatic beam emitters and the at least one camera, wherein the control unit is configured to apply high intensity blue light, low intensity blue light and red light stimuli to one or more regions of the visual field of the eye;
  for each stimuli, determine a baseline pupil size of an eye of the subject;
  determine a value for parameters related to induced changes in the pupil size in response to the light stimuli, said parameters comprise Maximal Contraction Velocity (MCV) of the pupil, Latency of MCV (LMCV) of the pupil and Percentage of Pupil Relaxation (PPR);
  normalize, based on the determined baseline pupil size, the value of the parameters; and
  classify the PLR based on the parameter values, wherein said classifying allows monitoring the progression of, determining and/or assessing the brain related condition.

18. The device of claim 17, wherein the brain related condition comprises: brain tumor, optic neuritis, neurodegenerative conditions, traumatic brain injury, stroke, intracranial lesions, intracranial pressure or pseudotumor cerebri.

19. The device of claim 17, wherein the parameters further comprise: Percent of Pupil Contraction (PPC), Pupil Response Latency (PRL), Maximal Relaxation Velocity (MRV), Latency of MRV (LMRV), Maximal Contraction Acceleration (MCA), Latency of MCA (LMCA), Maximal Relaxation Acceleration (MRA), Latency of MRA (LMRA), Maximal Relaxation Deceleration (MRD), Latency of Maximal Relaxation Deceleration (LMRD), Area of Curve (AC), Latency of Maximal Pupil Contraction (LMP), Maximal Contraction Deceleration (MCD), Latency of MCD (LMCD), Max Pupil Size (Max_PS), Min Pupil Size (Min_PS), or any combination thereof.

20. The device of claim 17, wherein each light stimuli comprises between 1 and 228 individual light stimuli, each applied to a different location of the visual field.

21. The device of claim 17, wherein the regions of the visual field comprise a central visual field ranging between about 0-10 degrees and/or a peripheral visual field is greater than about 10 degrees.

22. The device of claim 17, wherein the control unit is further configured to select a subset of light stimuli based on at least the location of the light stimuli in relation to the visual field.

23. The device of claim 17, wherein the control unit is further configured to select the wavelength of each individual light of the light stimuli, the intensity of each individual light of the light stimuli, the ratio of blue to red light stimuli, and/or the duration of illumination of each individual light of the light stimuli.

24. The device of claim 17, wherein the control unit is in communication with a server or memory module comprising instructions for identifying, assessing and/or monitoring the progression of a brain related condition.

25. The device of claim 17, wherein the control unit is configured to classify, based on a machine learning algorithm, one or more selected values of at least one of the parameters as being associated with a brain related condition and/or a progression of a brain related condition.

26. A system for monitoring the progression of, determining and/or assessing a brain related condition of a subject, based on pupil light response to chromatic light stimuli under mesopic light conditions, the system comprising:
  at least one hardware processor; and
  a non-transitory computer-readable storage medium having stored thereon program code, the program code executable by the at least one hardware processor to:

receive data associated with red and/or blue light stimuli generated at predetermined locations of the visual field of the subject, wherein the red and/or blue light stimuli comprises high intensity blue light, low intensity blue light and red light stimuli applied to one or more regions of the visual field of the eye;

receive data associated with the pupil size of the subject, for each stimuli;

determine a value for parameters related to induced changes in the pupil size in response to the light stimuli, the parameters comprise Maximal Contraction Velocity (MCV) of the pupil, Latency of MCV (LMCV) of the pupil and Percentage of Pupil Relaxation (PPR);

normalize, based on the base line pupil size, a value of the parameters; and input one or more of selected values of at least one of the parameters to an algorithm configured to classify the subject as having a brain related condition or not having a brain related condition based, at least in part, on at least one value of parameters.

27. The system according to claim 26, wherein the algorithm is a machine learning algorithm configured to classify the brain related condition into types and/or levels of severity and/or progression of the condition based, at least in part, on the value of the parameters.

* * * * *